INVENTOR
OLIN L. MacSORLEY
BY Thomas & Crickenberger
ATTORNEYS

June 29, 1965 O. L. MacSORLEY 3,192,364

BINARY DIVIDER

Filed June 13, 1961 55 Sheets-Sheet 7

| SHIFTS-DOUBLE ADDER | | | | | | |
|---|---|---|---|---|---|---|
| SHIFT LENGTH | 1 | 2 | 3 | 4 | 5 | TOTAL |
| NUMBER | 16 | 110 | 66 | 32 | 32 | 256 |
| PERCENT | 6.2 | 43.0 | 25.8 | 12.5 | 12.5 | 100.0 |

| SHIFTS-CODED SELECTION | | | | | | |
|---|---|---|---|---|---|---|
| SHIFT LENGTH | 1 | 2 | 3 | 4 | 5 | TOTAL |
| NUMBER | 34 | 94 | 64 | 32 | 32 | 256 |
| PERCENT | 13.3 | 36.7 | 25.0 | 12.5 | 12.5 | 100.0 |

June 29, 1965 O. L. MacSORLEY 3,192,364

BINARY DIVIDER

Filed June 13, 1961 55 Sheets-Sheet 11

June 29, 1965 O. L. MacSORLEY 3,192,364

BINARY DIVIDER

Filed June 13, 1961 55 Sheets-Sheet 13

June 29, 1965 O. L. MacSORLEY 3,192,364

BINARY DIVIDER

Filed June 13, 1961 55 Sheets-Sheet 16

June 29, 1965 O. L. MacSORLEY 3,192,364

BINARY DIVIDER

Filed June 13, 1961 55 Sheets-Sheet 17

June 29, 1965 O. L. MacSORLEY 3,192,364

BINARY DIVIDER

Filed June 13, 1961 55 Sheets-Sheet 19

June 29, 1965 O. L. MacSORLEY 3,192,364

BINARY DIVIDER

Filed June 13, 1961 55 Sheets-Sheet 21

June 29, 1965 O. L. MacSORLEY 3,192,364

BINARY DIVIDER

Filed June 13, 1961 55 Sheets-Sheet 27

June 29, 1965 O. L. MacSORLEY 3,192,364

BINARY DIVIDER

Filed June 13, 1961 55 Sheets-Sheet 30

BINARY DIVIDER

Filed June 13, 1961

June 29, 1965 O. L. MacSORLEY 3,192,364

BINARY DIVIDER

Filed June 13, 1961 55 Sheets-Sheet 34

June 29, 1965 O. L. MacSORLEY 3,192,364

BINARY DIVIDER

Filed June 13, 1961 55 Sheets-Sheet 36

June 29, 1965 O. L. MacSORLEY 3,192,364

BINARY DIVIDER

Filed June 13, 1961 55 Sheets-Sheet 40

June 29, 1965 O. L. MacSORLEY 3,192,364

BINARY DIVIDER

Filed June 13, 1961 55 Sheets-Sheet 41

June 29, 1965 O. L. MacSORLEY 3,192,364

BINARY DIVIDER

Filed June 13, 1961 55 Sheets-Sheet 42

June 29, 1965 O. L. MacSORLEY 3,192,364

BINARY DIVIDER

Filed June 13, 1961 55 Sheets-Sheet 44

June 29, 1965 O. L. MacSORLEY 3,192,364

BINARY DIVIDER

Filed June 13, 1961 55 Sheets-Sheet 46

June 29, 1965 O. L. MacSORLEY 3,192,364

BINARY DIVIDER

Filed June 13, 1961 55 Sheets-Sheet 49

June 29, 1965 O. L. MacSORLEY 3,192,364

BINARY DIVIDER

Filed June 13, 1961 55 Sheets-Sheet 50

June 29, 1965 O. L. MacSORLEY 3,192,364

BINARY DIVIDER

Filed June 13, 1961 55 Sheets-Sheet 51

June 29, 1965 O. L. MacSORLEY 3,192,364

BINARY DIVIDER

Filed June 13, 1961 55 Sheets-Sheet 52

June 29, 1965 O. L. MacSORLEY 3,192,364

BINARY DIVIDER

Filed June 13, 1961 55 Sheets-Sheet 53

June 29, 1965 O. L. MacSORLEY 3,192,364

BINARY DIVIDER

Filed June 13, 1961 55 Sheets-Sheet 55

United States Patent Office 3,192,364

Patented June 29, 1965

3,192,364
BINARY DIVIDER

Olin L. MacSorley, Wappingers Falls, N.Y., assignor to International Business Machines Corporation, New York, N.Y., a corporation of New York Filed June 13, 1961, Ser. No. 117,259
18 Claims. (Cl. 235—164)

This invention relates to an arithmetic device and more particularly to a high speed binary divider.

There are several methods of varying complexity and speed by which division may be performed in a data processing device. The time required to perform a division is proportional to the number of additions required to complete the division. The term "addition" is used to include both addition and subtraction. In some dividers the divisor is complemented and repeatedly added to successive portions of the dividend until the division is complete. The successive additions of the complemented divisor are continued until the dividend becomes negative which may be termed overdrawing. The overdrawing may be compensated for by adding the divisor back into the dividend and subtracting one from the quotient. The number of additions required to perform the division is related to the number of bits in the dividend and the divisor.

The speed of a divide operation is increased by the divider of the present invention. The number of additions required to perform a division is dependent upon the bit distribution of the dividend. Following an addition cycle, the dividend is shifted and the next addition cycle is begun. These addition and shifting operations are continued until the division is complete. However, the length of the shift is not fixed but it is variable to allow successive like dividend bits to be shifted across during a shift operation. Hence, the length of the shift following an addition cycle is dependent upon bit distribution and, therefore, the speed of the division process is increased.

According to a feature of the present invention the true or the complement form of the divisor may be utilized as is or altered before being added to the dividend in order to increase the number of bits to be shifted across. This is accomplished by performing the addition with the divisor one positon to the left of the normal position or one position to the right of the normal position. The divisor used in the normal position is designated as the one times divisor, left of normal position as the two times divisor, and right of the normal position as the one-half times divisor.

The divider of the present invention includes a means to store the dividend, a means to store the divisor and adders for adding a multiple of the divisor to successive portions of the dividend. A decoding arrangement is employed to control the length of shifts, and to select the particular multiple of the divisor (one times, two times or one-half times) that will result in the greatest shift in the following add cycle. A quotient generator generates the quotient bits as the division progresses.

According to another aspect of the present invention two adders are employed in the divider one of which makes successive additions with the one times divisor, and the other of which makes successive additions with either the one-half times divisor or the two times divisor. The use of either the one-half times divisor or the two times divisor in the second adder for any divide problem is determined by the value of the true divisor. Only the result from one of the two adders is utilized during a particular cycle, and the result that is chosen is the one that provides the largest shift during the next succeeding cycle.

In one illustrative arrangement of the present invention, a divider includes a single group of adders which add a portion of the dividend with a multiple of the divisor. A dividend-quotient register is utilized to store the dividend, and to store the quotient bits as they are generated. A divisor register is provided which stores the true value of the one times divisor. Means are connected with the divisor register to make available to the adders the true or the complement value of the one times divisor, the one-half times divisor or the two times divisor. A shifting arrangement is provided for shifting the dividend and the quotient along the dividend-quotient register, and for providing a particular portion of the dividend to the adders, which portion is determined by the length of shift made. A means is provided for storing the total number of positions to be shifted during a divide operation. A decoder senses the output of the adders and, in combination with the means for storing the total number of shift positions available, determines the number of positions to be shifted. A quotient generator senses certain conditions during a cycle and generates a particular group of quotient bits. In certain instances, some of the quotient bits are generated to agree with the bits being shifted across. All of the quotient bits are entered into the dividend-quotient register as the division progresses. An arrangement is provided for selecting the desired multiple, and its selection is determined by which multiple will provide the greatest shift during the next cycle.

In another illustrative arrangement of the present invention a similar dividend-quotient register and shifting arrangement is employed. However, two groups of adders are utilized. The first group of adders which may be designated the A adders, adds the one times divisor with portions of the dividend, and the second group of adders, which may be designated as the B adders, adds either the one-half times divisor or the two times divisor with similar portions of the dividend. In other words, two additions are made with a particular portion of the dividend during a given cycle. One addition is made with the one times divisor, and the other addition is made with either the one-half or the two times divisor. The use of the one-half times divisor or the two times divisor is determined by the value of the one times divisor, i.e., if the one times divisor is equal to or greater than three-fourths the one-half times divisor is used, and if the one times divisor is less than three fourths the two times divisor is used. Only the output from one of the groups of adders is utilized, and this depends upon which output results in the larger shift on the next cycle. The divider illustrated which employs the two groups of adders also includes an arrangement for indicating the amount of shift to be made and the amount of shift available, and a quotient generator to provide quotient bits which are stored in, and shifted along, the dividend-quotient register.

The foregoing and other objects, features and advantages of the invention will be apparent from the following more particular description of preferred embodiments of the invention, as illustrated in the accompanying drawings:

FIGS. 1 through 3, when mechanically arranged as illustrated in FIG. 4*a*, show in block schematic form a divider constructed in accordance with the principles of this invention;

FIGS. 5 and 6 in combination with FIG. 1, when mechanically arranged as illustrated in FIG. 4*b*, show in block schematic form another divider constructed in accordance with the principles of this invention;

Figure 1:
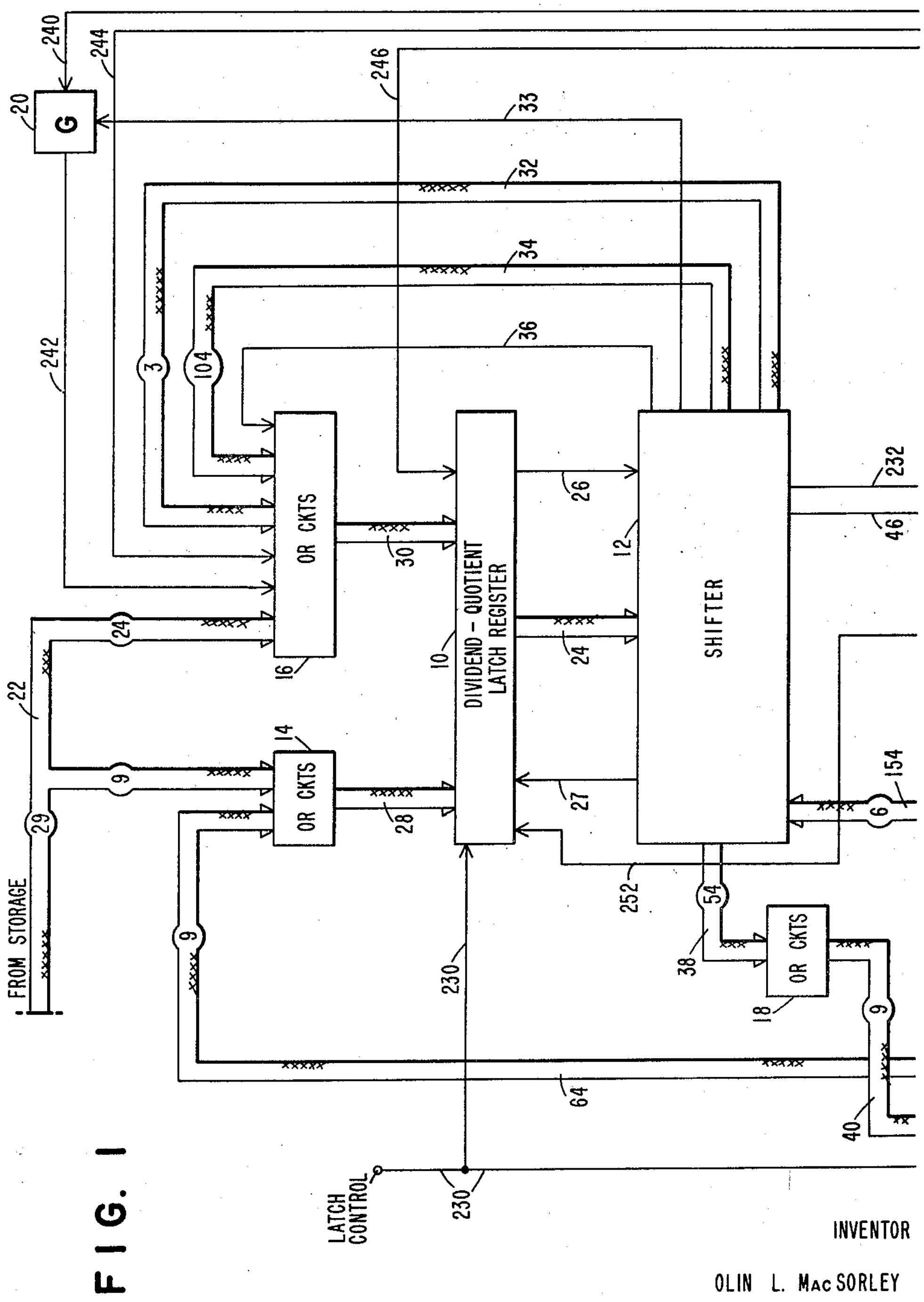
Figure 2:
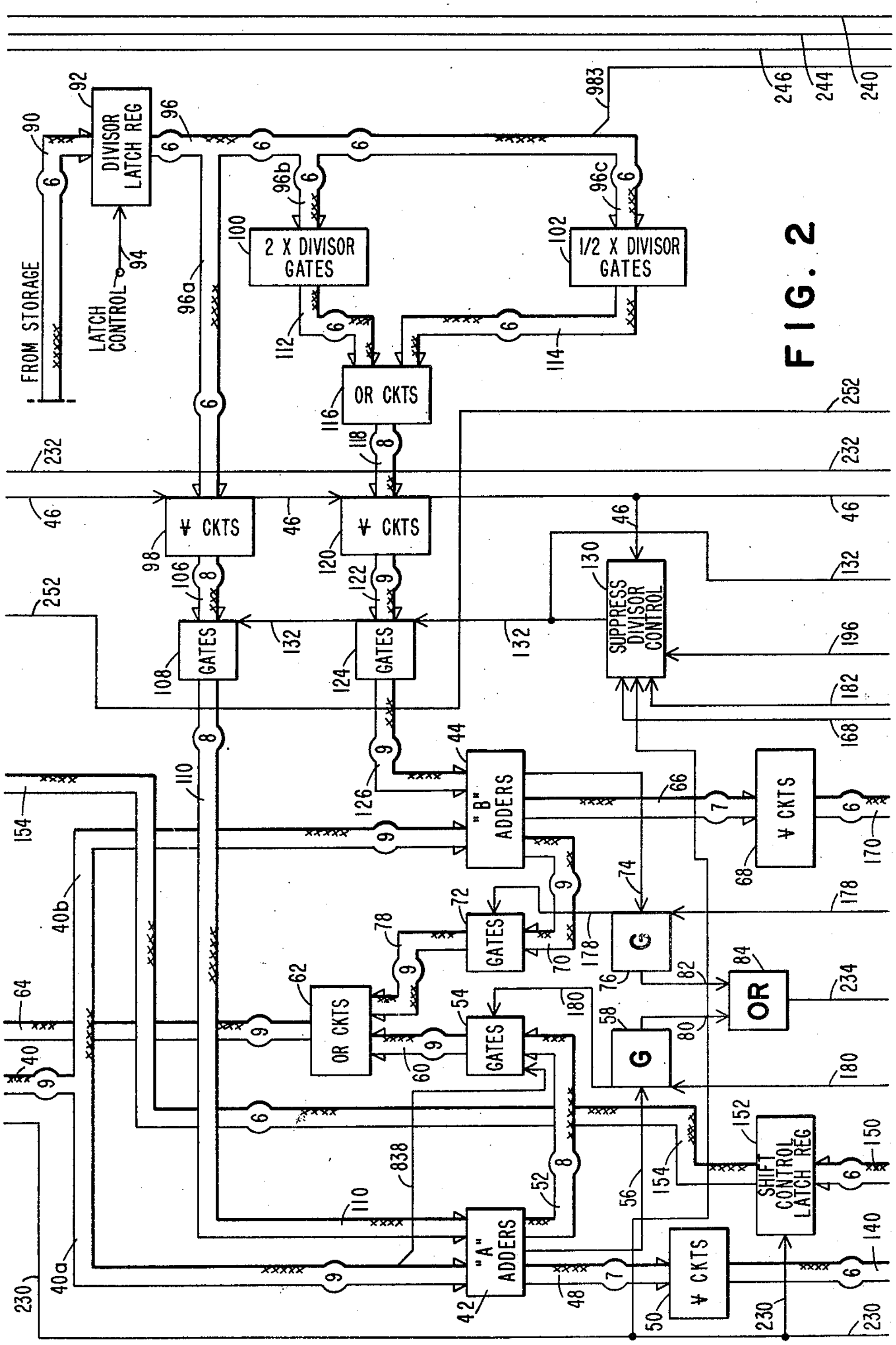
Figure 3:
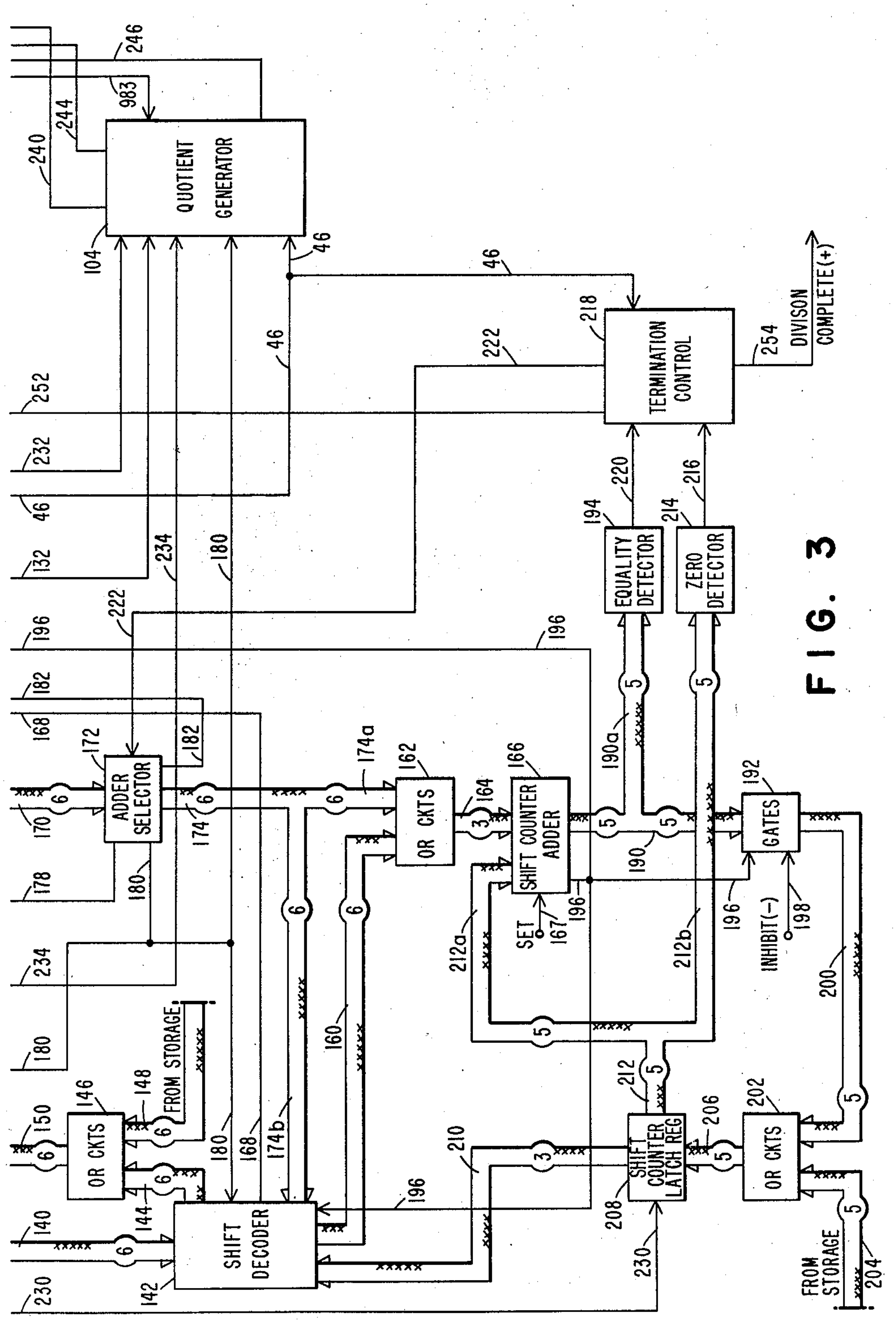
Figure 4A:
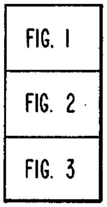
Figure 4B:
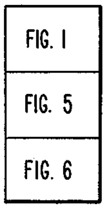
Figure 4C:
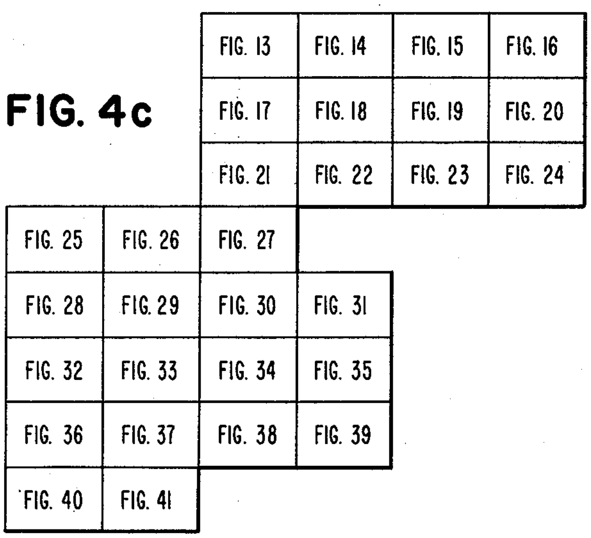
Figure 4D:
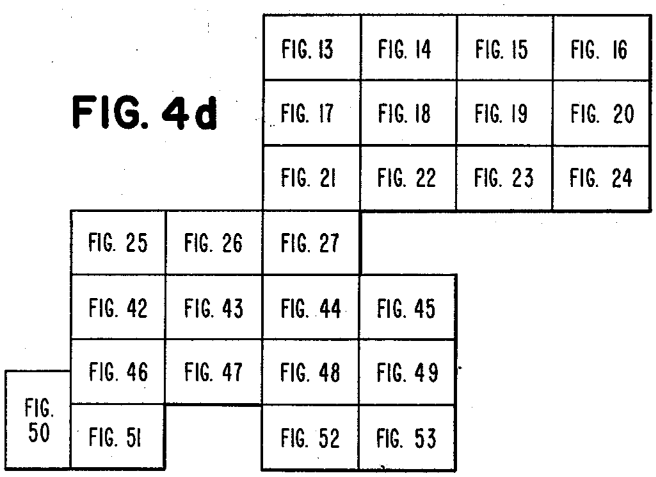
Figure 5:
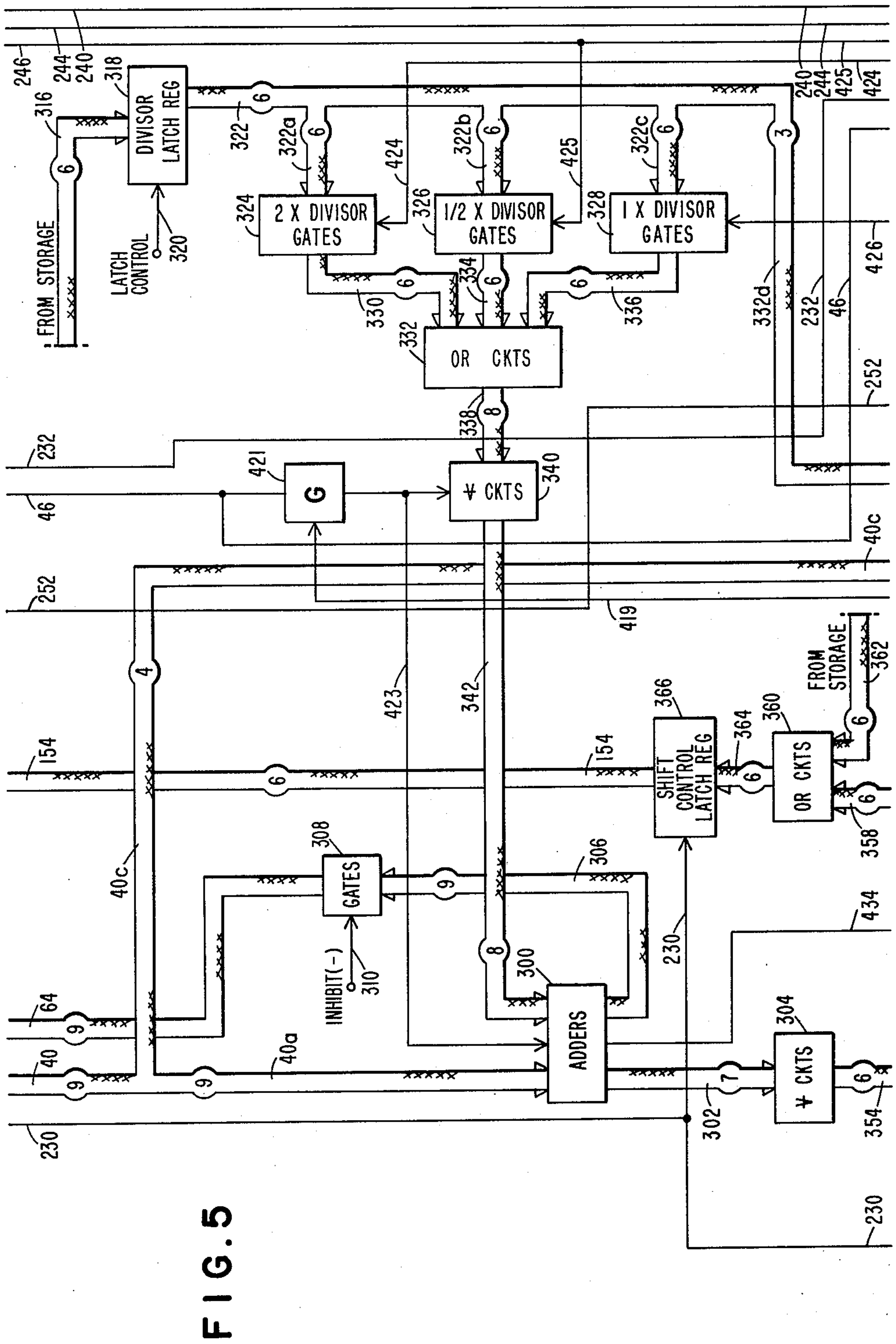
Figure 6:
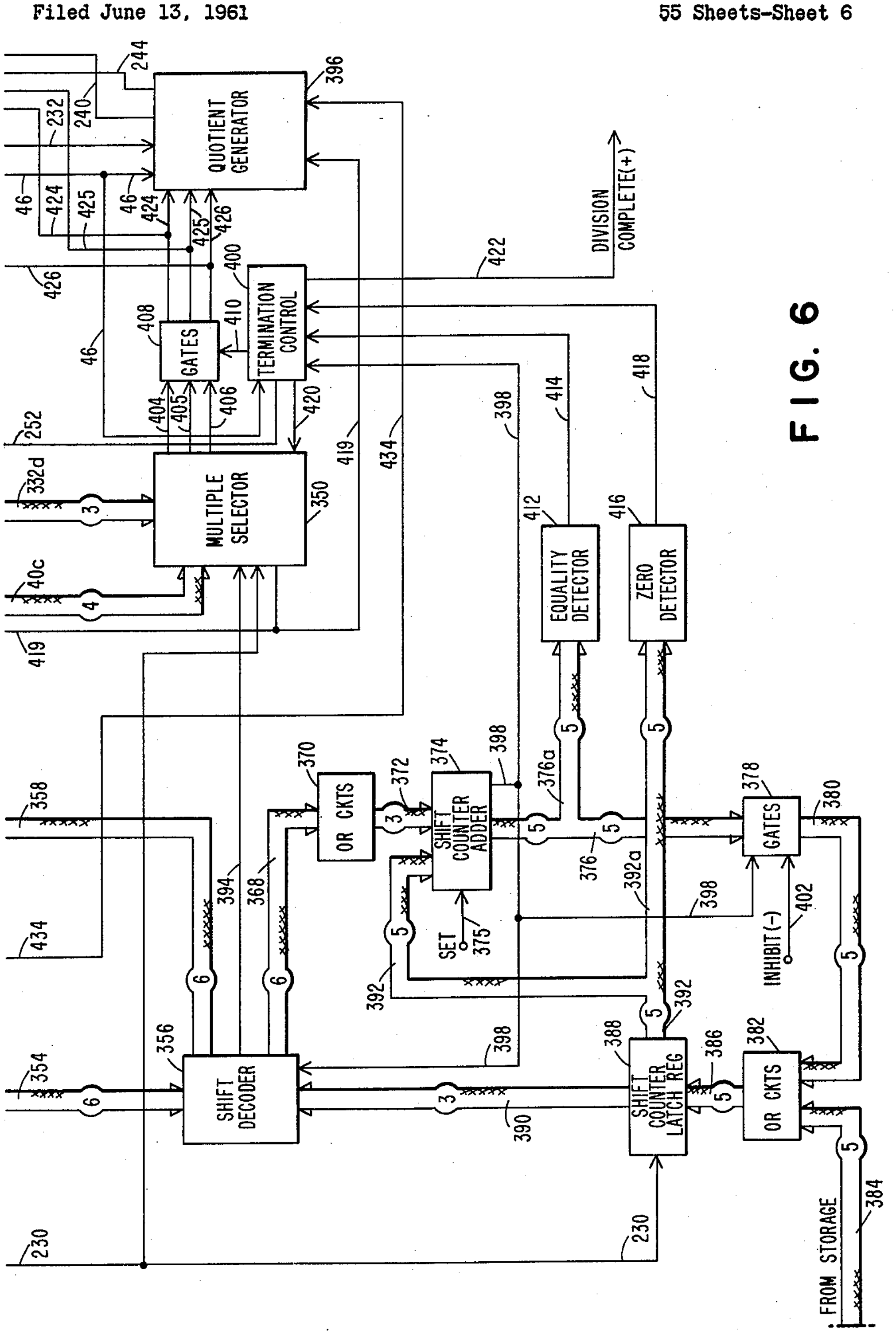
Figure 53:
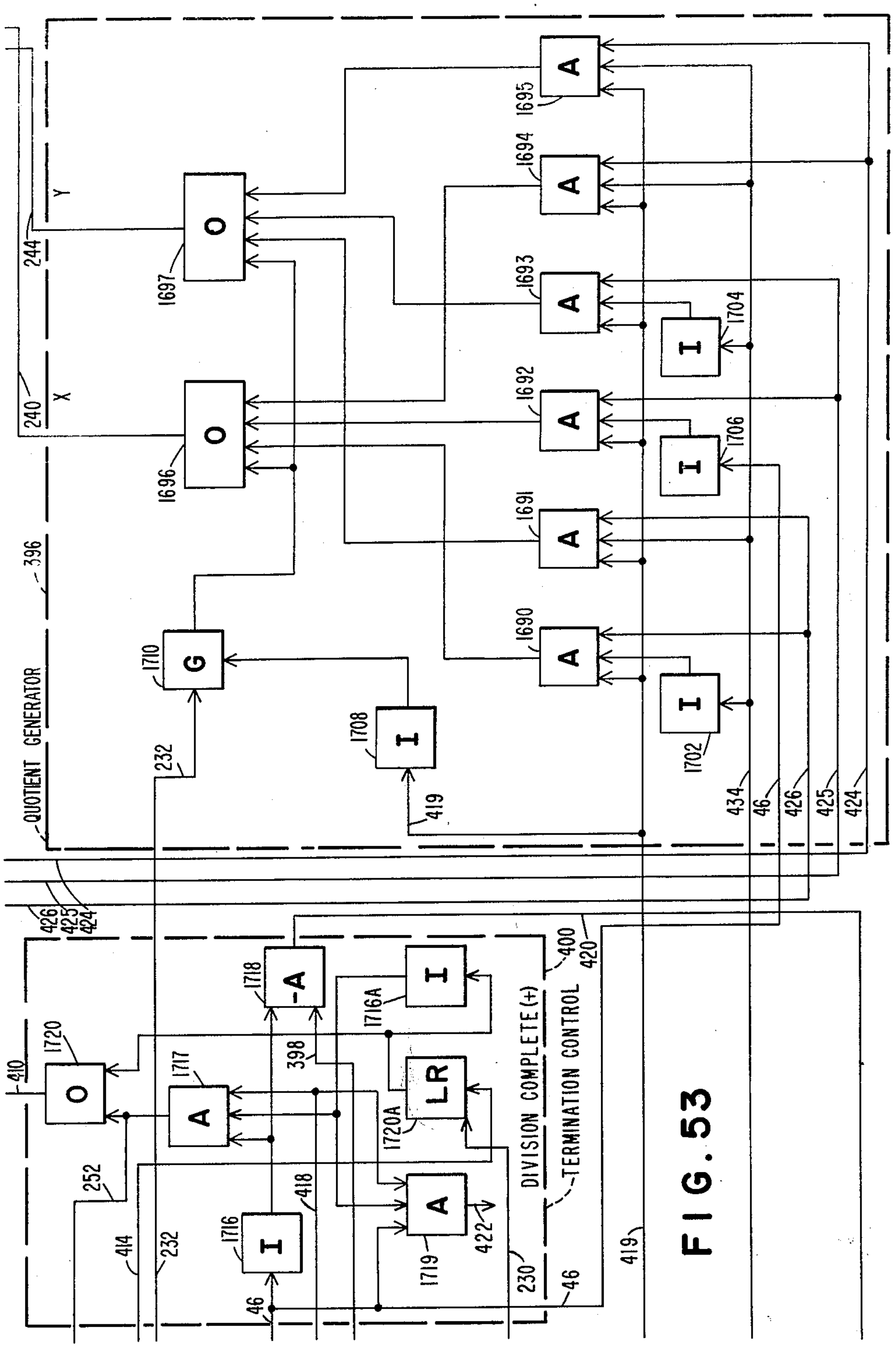
Figure 54A:
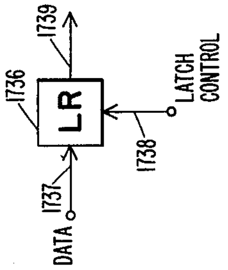
Figure 54B:
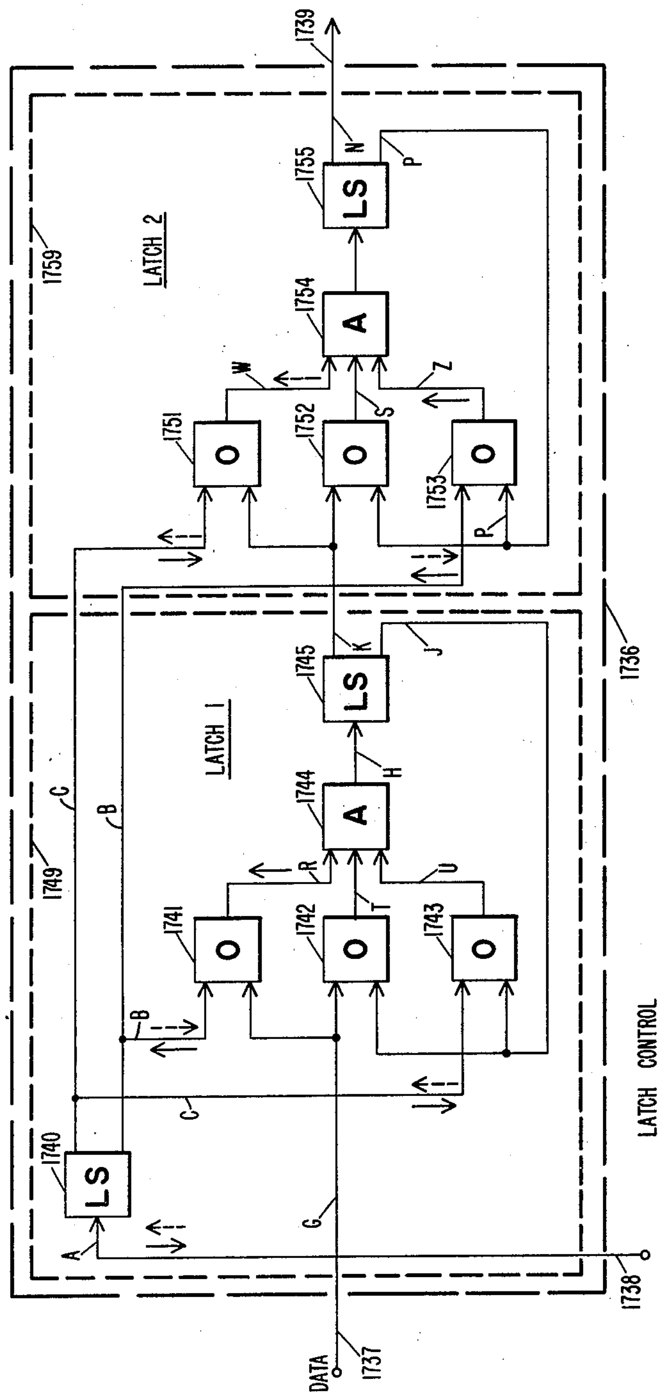
Figure 57:
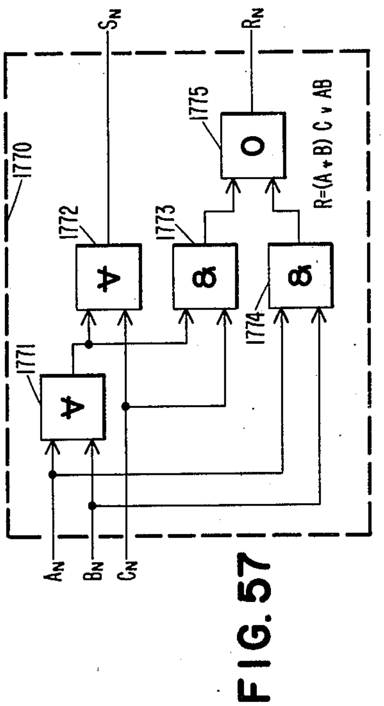
Figure 56:
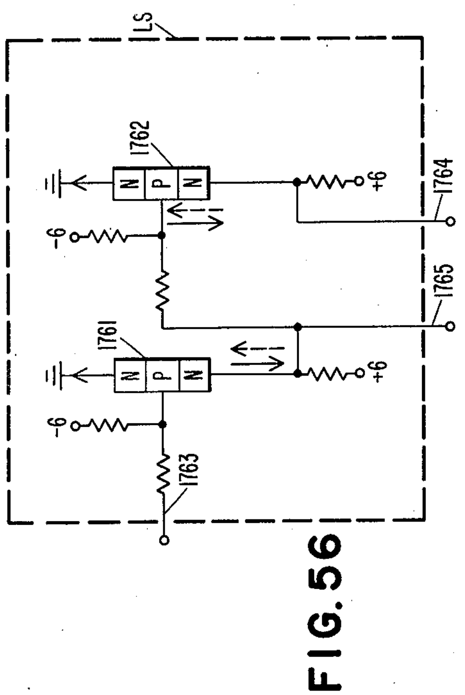
Figure 55:
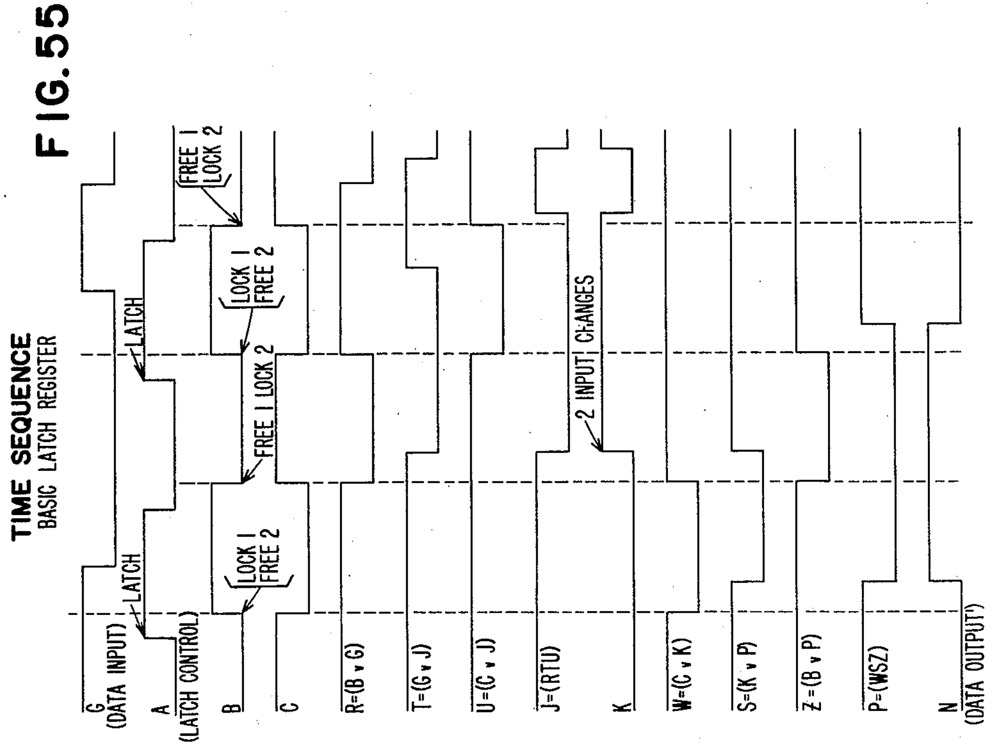

FIGS. 13 through 41, when arranged as shown in FIG. 4*c*, illustrate in detail the divider shown in block schematic form in FIGS. 1 through 3;

FIGS. 42 through 53 taken in combination with FIGS. 13 through 27 and arranged as illustrated in FIG. 4*d* illustrate in detail the divider shown in block schematic form in FIGS. 1, 5 and 6;

FIG. 54*a* is a block diagram of an individual latch register employed throughout the FIGS. 13 through 53;

FIG. 54*b* is a logical block diagram of the latch register in FIG. 54*a*;

FIG. 55 is a timing diagram used in conjunction with the explanation of the latch register illustrated in FIG. 54*b*;

FIG. 56 is a circuit diagram of a level setter employed in the latch register in FIG. 54*b*; and FIG. 57 is a logic diagram of an individual adder utilized throughout the various FIGS. 13 through 53.

In the following discussion of the illustrative dividers of the present invention, D.C. rather than pulse type logic is employed. The term addition is used to include both addition and subtraction, and the same adder, or adders, are utilized for both. Subtraction is performed by the use of the two's complement of the number to be subtracted from the other. The two's complement is obtained by inverting all bits in the number and also forcing an additional one into the carry position of the low order bit position of the adder when performing the addition. The dividend and the divisor are normalized before they are entered into the divider. These numbers are fractions, and they are normalized by shifting the fraction in a register until the high order one in the fraction is located just to the right of the binary point and the exponent (such as, $2^{-2}$, $2^{-3}$, etc.) is adjusted accordingly. Hence, the normalized fraction has a value less than one and equal to or greater than one-half.

Cables are used throughout the drawings to transfer data, and they are illustrated as two parallel lines with arrow heads at one end thereof and at some point intermediate the ends of the cables, the two parallel lines are widened in the form of a circle and numbers appear within the circle. The numbers appearing within the circle indicate the number of conductors within the cable. The input and the output lines of the block symbols are connected to the most convenient side of the block including the same side in some cases. An input line to a corner of a block symbol and an output line from the adjacent corner of that block symbol indicate that the signals are applied to the input of the circuit represented by the block and the input conductor is electrically connected to the output conductor of the adjacent corner. The bold face character symbols appearing within a block symbol identify the common name for the circuit represented, that is, G identifies a gate circuit, O a logical OR circuit, A a logical AND circuit, and so forth.

In the description of the divider of the present invention a general discussion of the theory of operation is set forth, followed by illustrative arrangements of dividers utilizing these principles. The general arrangement of the illustrative dividers is first described in connection with overall block system diagrams with respect both to the manner in which the various circuit components and apparatus are interconnected and in respect the general overall operation which is performed by these components and apparatus. This general description is followed by separate and detailed descriptions of the overall systems, along with descriptions of the various components and apparatus which so require it.

As noted before, the time required to perform a division is proportional to the number of additions required to complete it. The present invention is concerned with increasing the speed of division by reducing the required number of additions. This is accomplished by utilizing a variable length shift across dividend bits, and the number of additions required for any particular division problem is dependent on bit distribution. For purposes of describing the basic concepts of the present invention, it is assumed that the divisor and the dividend are binary fractions with the binary point located just to the left of the high order position. Hence, the divisor always has a numerical value less than one but equal to or greater than one-half. This is accomplished by normalizing the fraction as discussed previously. A shift counter is utilized which is set initially with the number of quotient bits to be developed, and means are provided for comparing the shift called for during a given cycle against the number of positions of shift still allowed by the shift counter.

It is well known that in division when a subtraction of the divisor from the dividend produces more than one high order "zero" there are as many quotient bits determined by that operation as there are adjacent high-order "zeros" in the remainder. The higest order quotient bit determined is a "one" and those that follow it are "zeros." It can also be shown that, if the subtraction of the divisor from the dividend is performed by adding the two's complement of the divisor to the dividend, and if the resulting remainder is a complement number having high order "ones," the number of quotient bits determined by this operation will be equal to the number of adjacent high-order "ones" in the remainder. The highest order quotient bit determined in this case is a "zero," and those that follow it are all "ones."

Using these facts, and assuming a normalized divisor, a divider may be constructed which operates according to the following rules:

(1) When the dividend is true, shift across any leading "zeros," entering a "zero" in the low order end of the quotient for each position shifted across except the last; then add the complement of the divisor.
  (a) If the result is true, enter a "one" in the low order position of the quotient, then shift across "zeros."
  (b) If the result is complement, enter a "zero" in the low order position of the quotient, then shift across "ones."

(2) When the dividend is complement, shift across any leading "ones," entering a one in the low order end of the quotient for each position shifted across except the last; then add the true divisor.
  (a) If the result is true, enter a "one" in the low order position of the quotient; then shift across "zeros."
  (b) If the result is complement, enter a "zero" in the low order position of the quotient; then shift across "ones."

A divider operating on these general principles is described in the patent application Serial Number 104,052, filed April 19, 1961, titled "Arithmetic Device," by Dura W. Sweeney, now Patent 3,145,296. The efficiency of such a device may be measured by dividing the number of bits of quotient developed by the number of additions required to develop it. The result is the average shift size per bit, and it is desired to have this number as large as possible. The result obtained may then be evaluated by considering the inverse operation in which the quotient obtained becomes the multiplier and the divisor becomes the multiplicand and determining the number of additions and subtractions that would be required to perform the multiplication. If more operations are required for the divide operation than are required for the multiply operation, the divide system being used does not produce the maximum operating efficiency obtainable.

The number of operations that would be required for a multiplication may be determined by assuming that the operation was according to the following rules. Examine the multiplier, starting at the low order end, and treating it, for decoding purposes, as though there were additional low-order "zeros" below the low order bit.

(1) When shifting across "zeros," stop at the first "one."
  (a) If this "one" is followed immediately by a "zero," add the multiplicand, then shift across all following "zeros."
  (b) If this "one" is followed immediately by a second "one," subtract the multiplicand, then shift across all following "ones."
(2) When shifting across "ones," stop at the first "zero."
  (a) If this "zero" is followed immediately by a "one," subtract the multiplicand, then shift across all following "ones."
  (b) If this "zero" is followed immediately by a second "zero," add the multiplicand, then shift across all following "zeros."

A multiplication system operating according to these rules is described in patent application Serial Number 112,455, filed May 24, 1961, titled "Multiplier," by Olin L. MacSorley.

If a comparison is made between a divider operating according to the rules previously described, and a multiplier operating as described, it will be found that part of the time groups of "zeros" or "ones" in the quotient will be produced by shifts with no additions within the group, while other times an individual addition will be required for each "zero" or "one" contained in the group. It is the purpose of this invention to describe two versions of a divider which will approach closely or equal the efficiency of the multiplication system.

A divide operation commences by setting the dividend into a dividend-quotient latch register, the divisor into a divisor latch register, and the quotient length into the shift counter, which counts down. The high order bit position of the dividend (assuming a zero shift) and the high order bit position of the divisor normally enter the same column of an adder. The dividend shifting is to the left, which clears the right end of the dividend-quotient register as the division operation proceeds. The term dividend is used to mean both the initial and the partial dividend, while the term remainder is generally used to mean the final remainder after the quotient is completely developed.

A true number with several leading "zeros" is a small positive number, while a complement number with several leading "ones" is a small negative number. Therefore, for a large shift to be produced, it is necessary that the remainder obtained by adding divisor and dividend be as near zero as possible.

Consider the case when the quotient will contain a group of "zeros" followed by a group of "ones" and the "zeros" in the quotient are being developed by shifting across high order "zeros" in the dividend. The last "zero" in the quotient group may be developed in either of two ways. It may be developed by the shifting, in which case a true result will be obtained with one leading "zero." This will place a single "one" in the quotient followed by a shift of one. This condition will result in one addition for each "one" in the quotient group. On the other hand it may be developed by the addition following the shift. In this case a complement result is obtained, which causes a zero to be placed in the quotient, followed by a shift across "ones." The equivalent conditions exist when the quotient contains a group of "ones" followed by a group of "zeros."

For either of these conditions, a group of "ones" followed by a group of "zeros" or a group of "zeros" followed by a group of "ones," the shift obtained by decoding the number of leading "zeros" or leading "ones" will either be correct or one larger than that which will result in a shift greater than one in the next cycle. Since a change in the sign of the dividend is desired in this case, the undesired condition is more likely to occur with a small divisor than with a large divisor.

The other case of interest is that of two groups of "zeros" separated by a single "one" or two groups of "ones" separated by a single "zero." In the case of two groups of "zeros" it is desired that all of the "zeros" in the first group be produced by the first shift, and that the single "one" be determined by the addition, which will leave a true remainder ready to shift across the next group of "zeros." A corresponding condition exists with the two groups of "ones." For these conditions the decoded shift will be either that desired or one less than that desired. Since no change in the sign of the dividend is desired in this case, the undesired condition is more likely to occur with a large divisor than with a small divisor.

When the divisor is added to the dividend in the position resulting from a shift of the dividend by an amount determined by decoding the high order bits of the dividend according to the rules previously given, this is referred to as adding one times the divisor. If the divisor is added in a position corresponding to a dividend shift one greater than the decoded size, it is referred to as adding one-half times the divisor; while if the divisor is added in a position corresponding to a dividend shift one less than the decoded size, it is referred to as adding two times the divisor.

Two illustrative arrangements are illustrated in this application for obtaining the above described improvement in the speed of division. One method is double addition. Two additions are performed simultaneously and the result that produces the largest shift is used. The second method illustrated utilizes a single adder. In this latter case, the selection of which multiple to use is made by examining the high order bits of the divisor and the dividend before each operation.

In the two adder arrangement, one addition always is performed with the one times divisor located with respect to the dividend as called for by the shift decoder. The other addition is performed using twice the divisor if the two high order bits of the devisor in its true form are 10 (value of divisor is less than three-fourths), and one-half the divisor if the two high order bits are 1 1 (value of the divisor is equal to or greater than three-fourths). Thus, a small divisor requires the use of the larger multiple (two times), while a large divisor requires the use of the smaller multiple (one-half times). These additions may be performed by a single adder that is slightly longer than twice the length of the divisor, or with two adders. In the following discussion, two adders are used, and these adders are called adder A and adder B. The adder A adds the one times divisor to the dividend, and the adder B adds the one-half times or the two times divisor to the dividend. If the output of the adder B indicates a shift of two or more, its output is employed. Otherwise the output of the adder A is employed (that is, when the output of the adder B does not call for a shift of two or more).

Figure 7:
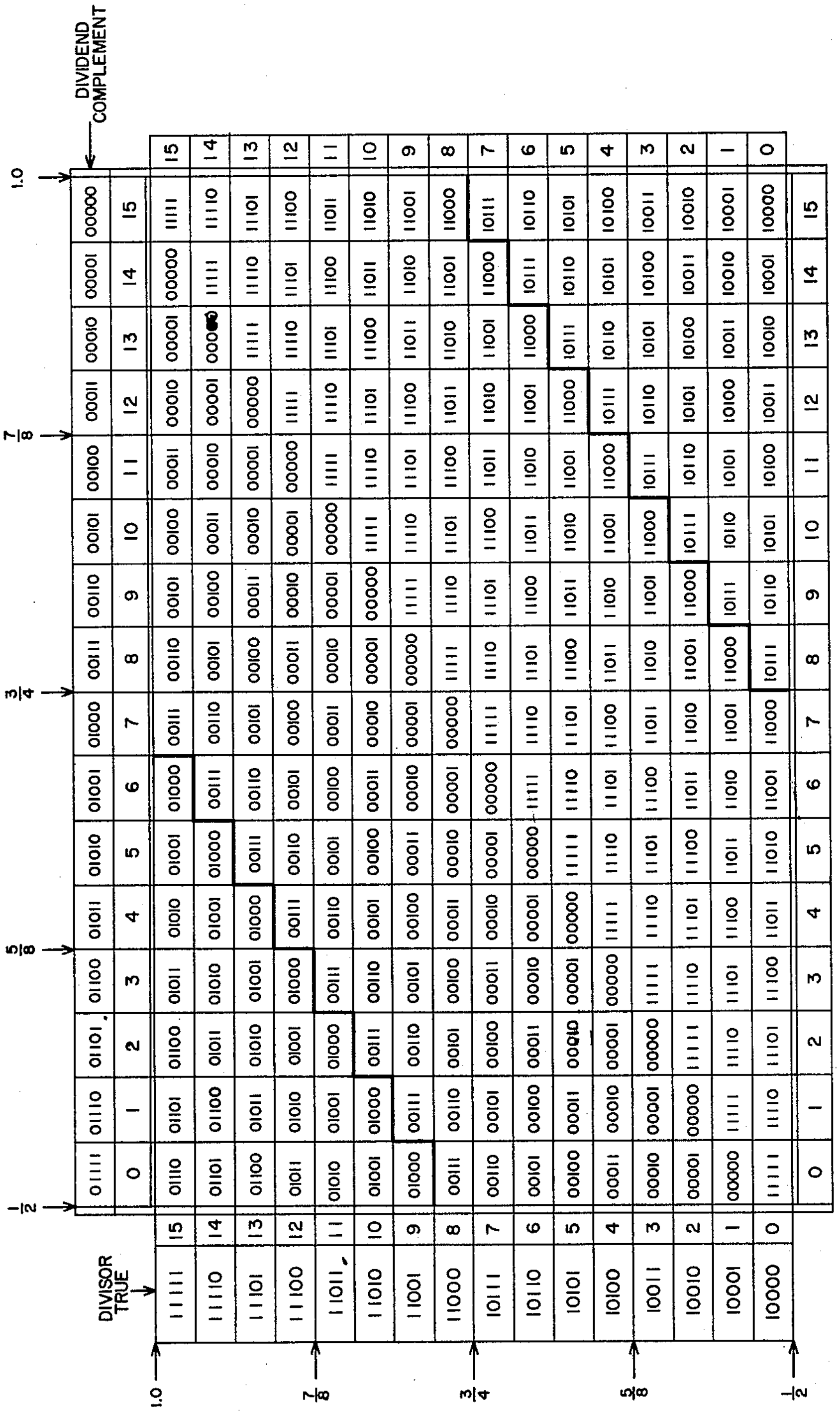
FIGS. 7 through 10 show tables which are employed in explaining certain of the concepts of the present invention.
Figure 8:
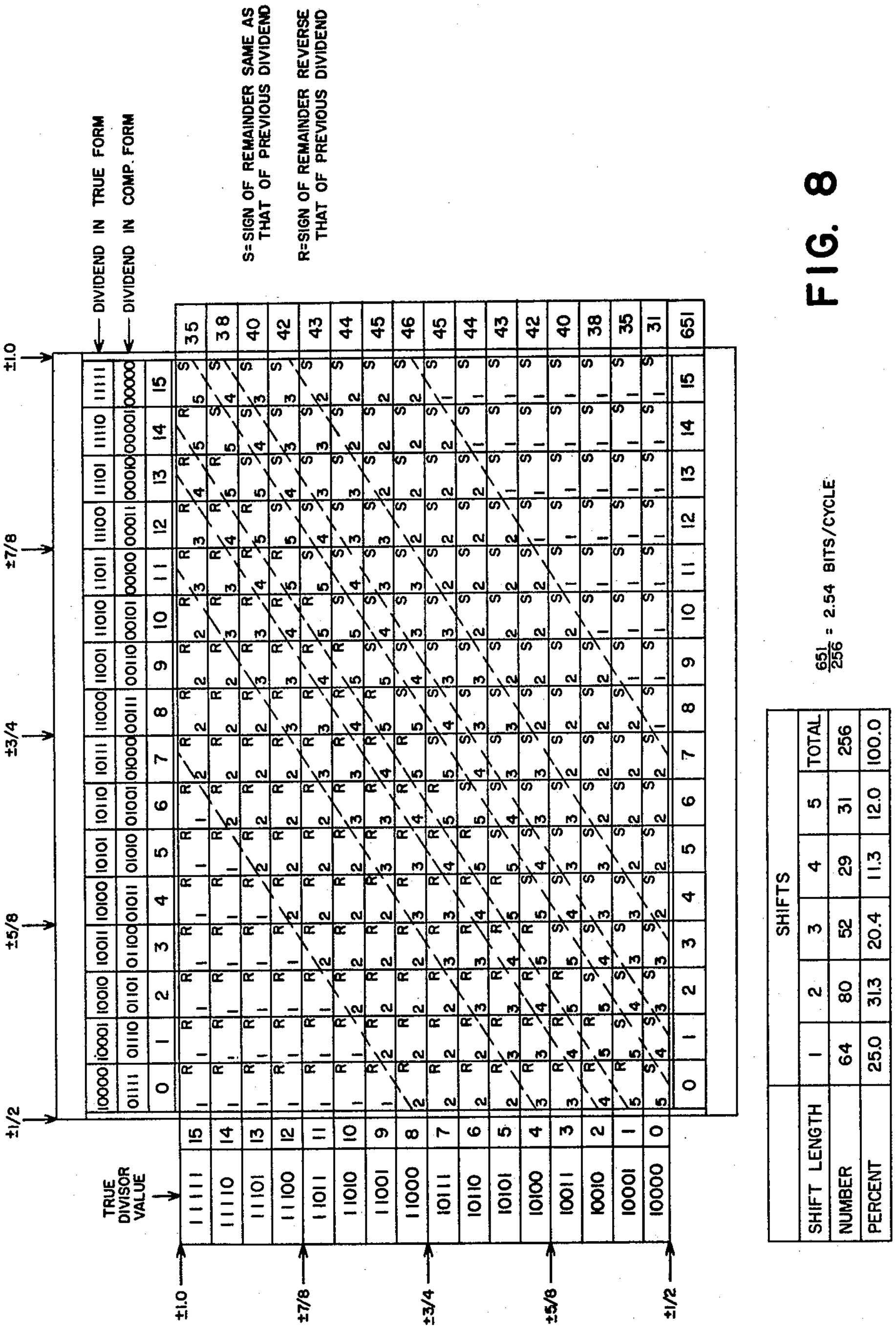

FIG. 7 is a table that shows all possible results that can be obtained for a five-bit true divisor and complement dividend under the restrictions that a true divisor always has a high order one and a complement dividend is always used following shifting across all leading ones, which means that it will always have a high order zero. A corresponding table may be prepared for a complement divisor and a true dividend. If this table were to be compared with the table in FIG. 7, it would be found that for the same position the result on one table would be the exact inverse of that on the other table. For example, at column 3, row 10 of FIG. 7 the result is 00110, while the corresponding position of the other table would be 11001. The number of positions to be shifted across is the same in both cases (the two leading 0's or the two leading, 1's above provide a two bit shift). The information shown in the table in FIG. 8 is derived from the table in FIG. 7. The information of primary interest to be obtained from these two tables is the number of shifts which are set forth in the table in FIG. 8. For example, in FIG. 7, column 3, row 5 there are four leading zeros and, therefore, the numeral 4 which indicates the number of shifts appears in the corresponding position in FIG. 8.

The table in FIG. 8 illustrates that the points of maximum shift lie along a diagonal line representing equal values for divisor and dividend. If random distribution of divisor bits between problems and dividend bits between and within problems is assumed, then the average shift per cycle is 651 divided by 256=2.54 for a five-bit divisor used with a shifter capable of handling shifts of five or less. The letter *s* appearing in the table in FIG. 8 indicates that the sign of the remainder is the same as that of the previous dividend, and the letter *r* in this table indicates that the sign of the remainder is the reverse of that of the previous dividend.

Figure 9:
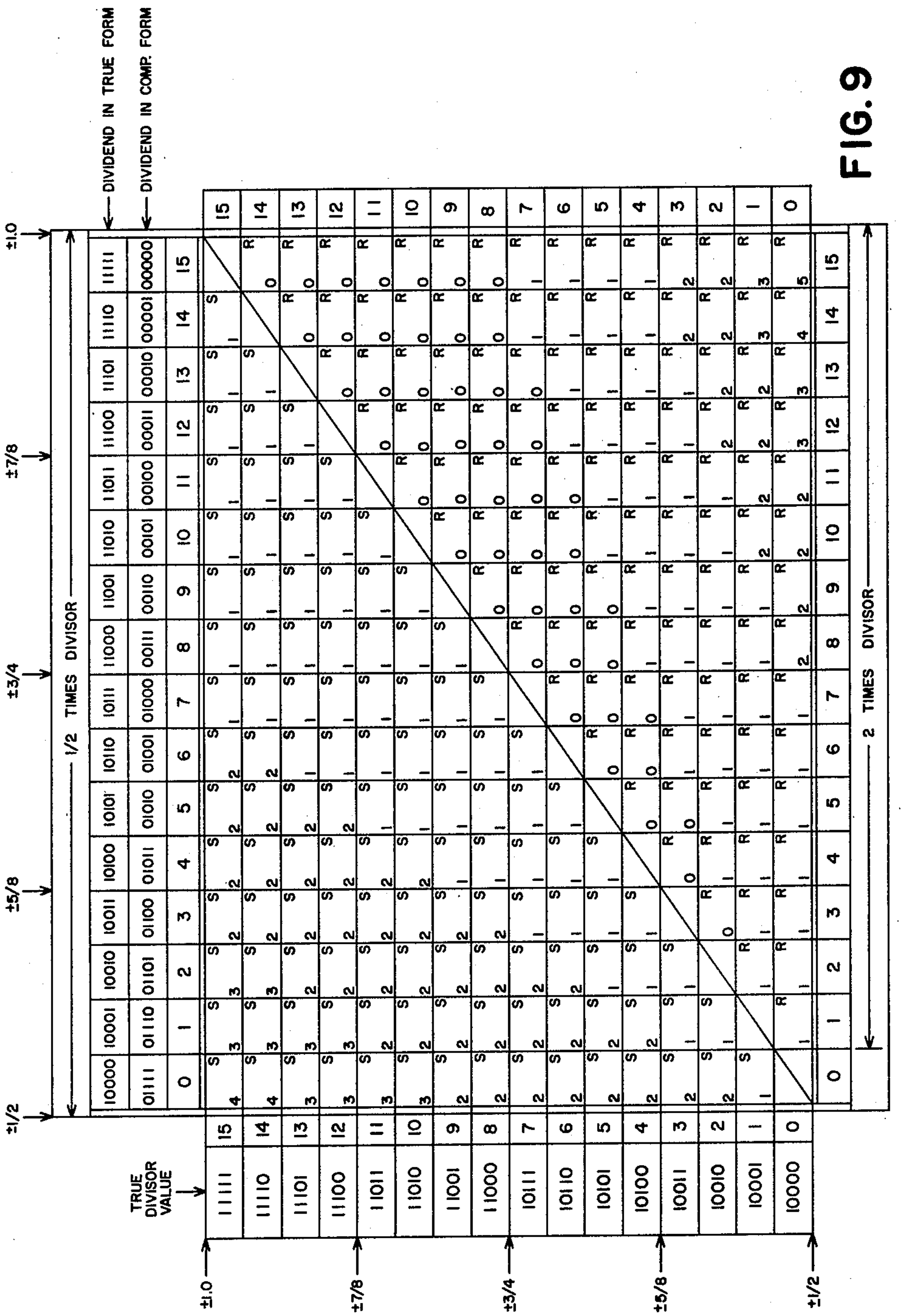

FIG. 9 is a table which illustrates the shifts that may be obtained when using one-half times the divisor or two times the divisor. The results shown in FIG. 9 apply both for a complement dividend with a true divisor and for a true dividend with a complement divisor. The pattern of shifts illustrated in both FIGS. 8 and 9 along any row should be noted as each row contains a section of the pattern.

When one half or two times the divisor is used, the dividend is positioned in the same manner as if one times the divisor were used, and then the divisor is entered into the adder shifted one position to the left or right of where it would have been for one times. The positions of the output of the adder that are examined to determine the next shift are the same ones that would have been examined had one times the divisor been used. When two times the divisor is used, the high order bit of the original divisor is entered into the overflow position of the adder, but for all the combinations for which two times the divisor would be used, this combines with the complement dividend to produce a true divisor with no overflow.

Figure 10:
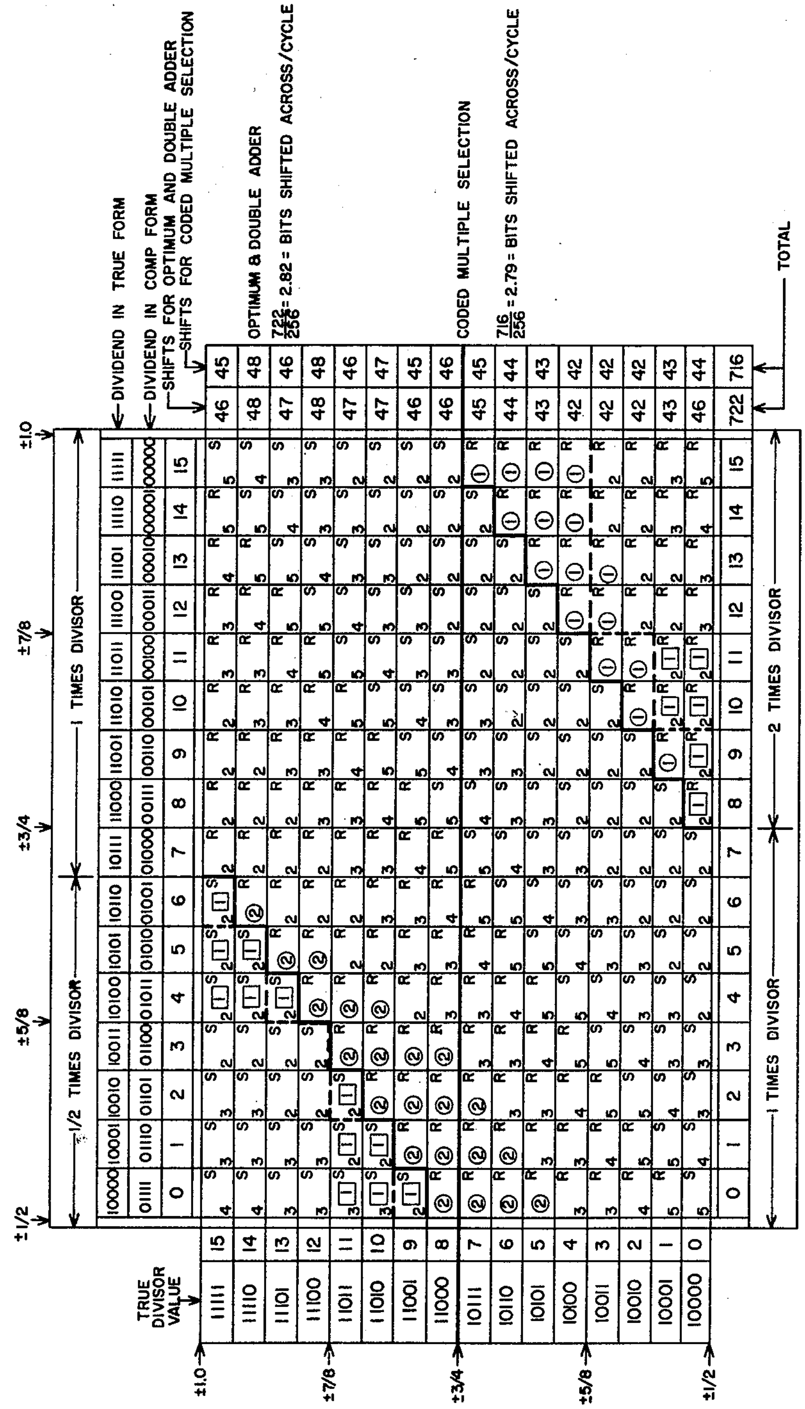

The table in FIG. 10 is obtained by replacing all of the positions calling for a shift of one on the table in FIG. 8 with the shift called for on the corresponding position of the table in FIG. 9. The heavy line between rows 7 and 8 represents the selection that is made between the use of the half times and the two times divisor in the double adder method. The stepped lines represent the selections between the use of these divisor multiples, and it represents the optimum combination that may be obtained using a single adder with one half, one and two times the divisor. The optimum use for each multiple is within these divisions represented by the line between the rows 7 and 8, and this indicates that the double adder method of division gives the same results as are obtained from the optimum use of these particular divisor multiples with a single adder. Both methods give an average of 2.82 bits shifted across per cycle. In the double adder method, as noted above, the output of the B adder is utilized where it indicates a shift of two or more.

Where a single adder is employed, the multiple selection is made by examining, or decoding, the high order bits of the divisor and the dividend for each operation. The efficiency of operation is dependent upon the number of bits included as well as the complexity of the decoding system and the time required by it. The dashed lines on the table in FIG. 10 in the upper left and the lower right corners indicate the operation obtained by the decoder utilized in the illustrative arrangement of a single adder divider which follows subsequently. This illustrated decoding arrangement results in 2.79 bits shifted across per cycle as compared with 2.82 bits shifted per cycle for the two adder arrangement.

The foregoing discussion primarily has dealt with the selection of multiples. In addition to this, the quotient bits must be developed, and certain termination procedures must be followed. When the one, one-half and two times the divisor multiples are used, two low order quotient entry positions in the dividend-quotient register are required. These two positions are designated as X and Y, where position Y is the lowest order position in the register. The position X normally is set by whether the output of the adder is true or complement when one times the divisor is used. In this case, position Y is the inverse of the position X.

When the one-half times divisor is used, it is in the same position with respect to the dividend that the one times divisor would have been had the previous shift been one greater. Hence, the quotient bit determined by the output of the adder when the one-half times divisor is used, must be placed where it enters the quotient position adjacent to the position X, which is a position Y. The quotient bit placed in position X must be the same that would have been placed there had one times the divisor been used, and it is the same as the bits shifted across during the preceding shift. Therefore the position Y is set by whether the dividend is true or complement when the one-half times divisor is used. It should be noted that when the partial dividend resulting from the use of the one-half times divisor multiple is decoded to give the number of bits to shift across, the number is always one greater than would have been obtained had the previous shift been one greater followed by the use of the one times divisor, which puts the end of the shift at the same place in either case.

The two times multiple is selected only when the one times multiple, if used, would not cause a reversal in the sign of the dividend, but the use of the two times multiple will cause a reversal. Therefore, if the original dividend was true, the position X is set to a one, and if it was complement, the position X is set to a zero. The position Y is set to agree with the bits that are to be shifted across as determined by the output of the adder using the two times multiple. The bit placed in the position Y is the same as that placed in the position X when the two times multiple is utilized.

The bits placed in the position X are correct quotient bits. The bits placed in the position Y as a result of the use of the one-half times divisor also are correct quotient bits. In the event that the use of the one-half times divisor is followed by a shift of one, the information that the one-half times divisor is used is stored so that on the next add cycle position X can be set from the data that was in position Y instead of with a generated quotient bit for the X position, i.e., from the condition of the adder output.

The bit placed in the position Y as the result of the use of the one times divisor or the two times divisor is known to be a correct quotient bit if its generation is followed by a shift of two or more; but if its generation is followed by a shift of one, this Y bit may not be correct. However, since the generated X bit in the next cycle always is correct, the bit in position Y which was placed there as a result of the use of the one times divisor or the two times divisor is not shifted into the position X when a shift of one follows the use of the one times divisor or the two times divisor. Instead, the bit placed in the position X is the newly generated X bit. The generation of the quotient bits will be set forth in more detail later in connection with the discussion of the illustrative arrangements of the present invention.

Certain rules may be set forth for terminating the divide operation. These rules affect the generation of the quotient bits and insure that the final remainder will be in true form. The rules stated are based on conditions prevailing during the last cycle of the division operation. If the dividend is true and the shift called for is larger than that allowed by the shift counter, the shift allowed is made, the entery of the divisor into the adder is suppressed, and the low order quotient bits (X and Y) are set to agree with the bits being shifted across. This completes the division operation.

If the dividend is true and the shift called for is equal to that available, the divider is operated in a normal manner with the exception that the addition following the shift must use the one times divisor multiple. If the resulting adder output is in true form, the division operation is complete. If the resulting adder output is in complement form, one additional cycle is required to get the remainder into a true form.

If the dividend is in complement form and the shift called for is equal to or greater than that allowed, the allowed shift is used and the operation proceeds in a normal manner with the restriction that the addition following the shift must use the one times divisor multiple. If the resulting remainder is in true form, the division operation is complete. If the resulting remainder is in a complement form, the resulting quotient is complete, but one additional cycle is required to get the remainder in the true form. This latter condition only occurs when the shift called for and the shift allowed are equal. If the dividend is complement and a shift of zero is allowed, the zero shift is made, the true value of the divisor is added, and the entry of quotient bits is suppressed since the bits there (positions X and Y) already are correct. These termination rules will be discussed in greater detail in connection with the illustrative embodiments of the present invention. A further description of dividers which utilize the concepts of shifting across bits and employing divisor multiples may be found in an article by O. L. MacSorley, entitled "High-Speed Arithmetic in Binary Computers," which appeared in the Proceedings of the IRE, vol. 49, No. 1 (Computer Issue), pages 67 through 91.

According to a feature of the present invention, FIGS. 1, 2 and 3, when arranged as illustrated in FIG. 4*a*, show in block form a divider employing two adders and constructed in accordance with the concepts of the present invention. FIG. 1 shows a dividend-quotient latch register 10 interconnected with a shifter 12, OR circuits 14, 16 and 18, and a gate 20. A cable 22 is connected from a storage device (not shown) to the OR circuits 14 and 16 to supply the initial dividend through these OR circuits to the dividend-quotient latch register 10. The dividend-quotient latch register 10 is connected through a cable 24 and a line 26 to the shifter 12. A line 27 is connected from the shifter 12 to the register 10. The OR circuits 14 are connected to the register 10 through a cable 28, and the OR circuits 16 are connected to the register 10 through a cable 30.

The shifter 12 is connected through the OR circuits 16 and the cable 30 to the register 10 by means of cables 32 and 34, and a line 36. The shifter 12 is connected through a cable 38 to the OR circuits 18.

The OR circuits 18 are connected through a cable 40 and cables **40*a* and 40*b* to A adders 42 and to B adders 44, respectively, in FIG. 2. The A adders 42 are connected through a cable 48 to exclusive OR circuits 50, and through a cable 52 to gates 54. A line 56 is connected from the A adders 42 to a gate 58. The gates 54 are connected through the cables 60 to OR circuits 62. The OR circuits 62 are connected through a cable 64 to the OR circuits 14** in FIG. 1.

The B adders 44 are connected through a cable 66 to exclusive OR circuits 68, and through a cable 70 to gates 72. A line 74 is connected from the B adders 44 to a gate 76. The gates 72 are connected through a cable 78 to the OR circuits 62. The gates 58 and 76 are connected through respective lines 80 and 82 to an OR circuit 84.

A cable 90 is connected from a storage device (not shown) to a divisor latch register 92. A latch control line 94 also is connected to the divisor latch register 92. The output of this register 92 is connected through the cable 96 and a cable **96*a* to exclusive OR circuits 98; through the cable 96 and a cable 96*b* to two times divisor gates 100; and the cable 96 and a cable 96*c* to a one-half times divisor gates 102. The divisor latch register 92 also is connected through the cable 96 and a line 983 to a quotient generator 104** in FIG. 3.

The exclusive OR circuits 98 in FIG. 2 are connected through a cable 106 to gates 108. The gates 108 are connected through a cable 110 to the A adders 42. The two times divisor gates 100 and the one-half divisor gates 102 are respectively connected through cables 112 and 114 to OR circuits 116. The OR circuits 116 are connected through a cable 118 to exclusive OR circuits 120. The exclusive OR circuits 120 are connected through a cable 122 to gates 124. The gates 124 are connected through a cable 126 to the B adders 44. The true/complement line 46 is connected to the exclusive OR circuits 98 and 120 from the shifter 12 in FIG. 1. A suppress divisor control circuit 130 is connected through a line 132 to the gates 124 and 108.

The exclusive OR circuits 50, connected from the A adders 42 through a cable 48, are connected through a cable 140 to a shift decoder 142. The shift decoder 142 is connected through a cable 144 to OR circuits 146. A cable 148 is connected to the OR circuits 146 from a storage device (not shown). The OR circuits 146 are connected through a cable 150 to a shift control latch register 152 in FIG. 2. This shift control latch register 152 is connected through a cable 154 to the shifter 12 in FIG. 1.

The shifter decoder 142 in FIG. 3 is connected through a cable 160 to OR circuits 162. The OR circuits 162 are connected through a cable 164 to a shift counter adder 166. A line 168 is connected from the shift decoder 142 to the suppress divisor control circuit 130 in FIG. 2.

The exclusive OR circuits 68 which are connected from the B adders 44 through a cable 66 in FIG. 2, are connected through a cable 170 to an adder selector 172 in FIG. 3. The output of the adder selector 172 is connected through cables 174 and **174*a* to the OR circuits 162, and through cables 174 and 174*b* to the shift decoder 142. A line 178 is connected from the adder selector 172 to the gate 76 and the gates 72 in FIG. 2. A line 180 is connected from the adder selector 172 in FIG. 3 to the shift decoder 142 and the quotient generator 104. This line 180 also is connected to the gate 58 and the gates 54 in FIG. 2. A line 182 is connected from the adder selector 172 in FIG. 3 to the suppress divisor control circuit 130 in FIG. 2. The line 132 is connected from the suppress divisor control circuit 130 in FIG. 2 to the quotient generator 104** in FIG. 3.

Outputs from the shifter counter adder 166 in FIG. 3 are connected through a cable 190 to gates 192. The shift counter adder 166 also is connected through the cable 190 and a cable **190*a* to an equality detector circuit 194. A line 196 is connected from the shift counter adder 166 to the shift decoder 142, the gates 192, and the suppress divisor control circuit 130** in FIG. 3.

An inhibit line 198 is connected to the gates 192. The outputs of the gates 192 are connected through a cable 200 to OR circuits 202. A cable 204 is connected to the OR circuits 202 from a storage device (not illustrated). The OR circuits 202 are connected through a cable 206 to a shift counter latch register 208. Outputs from the shift counter latch register 208 are connected through a cable 210 to the shift decoder 142. Outputs from the shift counter latch register 208 are connected through a cable 212 and a cable 212a to the shift counter adder 166. The shift counter latch register 208 also is connected through the cable 212 and a cable **212*b* to a zero detector circuit 214**.

The zero detector circuit 214 is connected through a line 216 to a termination control circuit 218. The equality detector 194 is connected through a line 220 to the termination control circuit 218. The true/complement line 46 also is connected to the termination control circuit 218. This control circuit 218 is connected through a line 222 to the adder selector 172. A latch control line 230 is connected to the dividend-quotient register 10 in FIG. 1, the shift control register 152 and the suppress divisor control 130 in FIG. 2, and the shift counter latch register 208 in FIG. 3.

A line 232 is connected from the shifter 12 in FIG. 1 to the quotient generator 104 in FIG. 3. A line 234 is connected from the OR circuit 84 in FIG. 2 to the quotient generator 104 in FIG. 3. A line 983 is connected from the cable 96 and the divisor latch register 92 in FIG. 2 to the quotient generator 104 in FIG. 3. The quotient generator 104 is connected through a line 240 to the gate 20 in FIG. 1. The gate 20 is connected through a line 242 to the OR circuits 16 in FIG. 1. The quotient generator 104 is connected through a line 244 to the OR circuits 16 in FIG. 1 and a line 246 to the dividend-quotient latch register 10 in FIG. 1.

The specific details of construction and operation of the circuit shown within the blocks in FIGS. 1 through 3, and the detailed system operation will be discussed subsequently. However, a general discussion of the overall system operation of the block diagram shown in FIGS. 1 through 3 follows. Initially, the dividend is supplied from a storage device, not shown, through the cable 22 to the OR circuits 14 and 16 in FIG. 1. Likewise, the divisor is applied through the cable 90 to the divisor latch register 92 in FIG. 2, zero shift information is applied through the cable 148 to the OR circuit 146 in FIG. 3, a negative inhibit signal is applied through the line 198 to the gates 192 and a number representative of the number of quotient bits to be developed is applied through a cable 204 to the OR circuits 202 (twenty-three quotient bits will be developed in the present example). Also, a positive level is applied to the shift counter adder 166 in FIG. 3 through a line 167. This maintains a "one" in the low order position and the two highest order positions in the adder 166. A detailed description of this operation and its purpose will be given with the subsequent detailed description of the double adder divider example.

The latch control signal is applied through the line 94 to the divisor latch register 92 in FIG. 2 to store the divisor in that latch register. A latch control signal is supplied to the line 230 in FIGS. 1 through 3 to store the dividend in the dividend-quotient latch register 10 in FIG. 1. The latch control signal on the line 230 also serves to store the initial shift (zero) in the shift control latch register 152 in FIG. 2, and to store the total number of shifts to be made (the number of quotient bits to be developed) in the shift counter latch register 209 in FIG. 3. The latch control signals applied in the line 230 recur throughout the division operation, and these latch control signals control the cycles of operation. During one cycle of operation a shift is made, an addition is made, and information is sensed, or decoded, to indicate the next following shift and which result of the two adders A or B to use. This result is supplied to the dividend-quotient register 10. In the next following cycle the indicated shift is performed.

Figure 11:
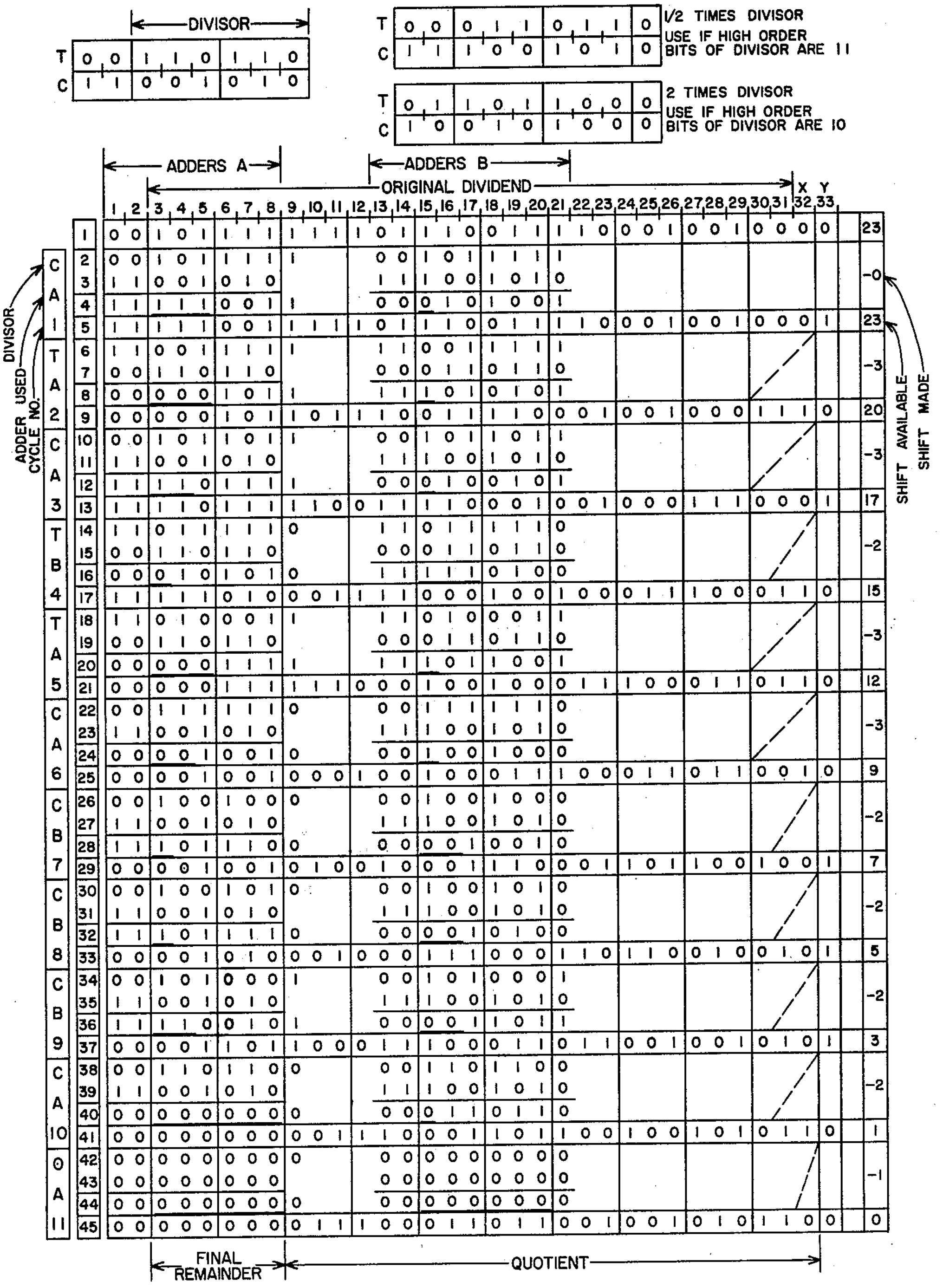
FIG. 11 shows a table which illustrates the additions performed, the multiples used, and the shifts made during a division process by the divider illustrated in FIGS. 1 through 3.

FIG. 11 is a table which illustrates the cycles of operation during a divide procedure, the addition performed, the multiples used and the shifts taken. The dividend entered into the dividend-quotient latch register 10 in FIG. 1 is illustrated in row 1, columns 3 through 31 of FIG. 11. The bits in columns 1 and 2 at row 1 indicate whether the dividend is true or complement, at rows 4, 8, 12, 16, 20, 24, 28, 32, 36, 40 and 44 whether the partial dividend (remainder from a particular addition) is true or complement, and at rows 3, 7, 11, 15, 19, 23, 27, 31, 35 and 39 whether the divisor is true or complement. This latter information (whether the divisor is true or complement) also is indicated by a C or a T in the un-numbered leftmost column of FIG. 11. This column also indicates by letters A or B which adder is employed in the particular cycle indicated. The cycle numbers also appear in this leftmost column. The shifts available and the shifts used in each cycle are shown in the rightmost column of FIG. 11. As shown in that column, the division process commences with an available shift of 23 and progresses through eleven cycles until no shifts remain. Columns 32 and 33, respectively, are the X and the Y quotient bits positions. The quotient bits that are generated are placed in these two positions and shifted (to the left) along with the dividend in the dividend-quotient latch register 10 in FIG. 1.

An example of the operation of the two adder divider followers with reference to FIGS. 1 through 3 and the table in FIG. 11. At the beginning of the first cycle, the seven high order bits of the dividend (in columns 3 through 9) are gated from the dividend-quotient latch register 10 by the shifter 12 through the cable 38 to the OR circuits 18. These particular high order bits are gated to the OR circuits 18 because the shift indicated is zero. If the shift indicated had been three, for example, the dividend bits gated to the OR circuits 18 would have started with the bit in column 6 in FIG. 11. The bits in columns 1 and 2, which are zeros and indicate that the dividend is true, also are gated to the OR circuits 18.

The OR circuits 18 apply to bits in row 2, columns 1 through 8 of FIG. 11 through the cable 40 and the cable 40*a* to the A adders 42 in FIG. 2. The bit in row 2, column 9 is applied from the cable 40*a* to the gates 54 through a line 838. Likewise, the bits in row 2, columns 1 through 9 are applied from the OR circuits 18 through the cable 40 and the cable 40*b* to the B adders 44 in FIG. 2. Hence, the information shown in row 2 of FIG. 11 indicates the portion of the dividend that is applied to the adders 42 and 44.

The line 46 provides an indication of whether the dividend is true or complement. When a true dividend is to be added, the two's complement of a divisor multiple is employed. When the dividend is complement, the true value of the particular divisor multiple is employed.

The true value of the one times divisor that is employed in the present example is 110110. This divisor, as is the dividend, in the present example is a fraction. Since the two high order bits of this divisor are ones, this divisor is greater than three-fourths (the leftmost one indicates a value of one-fourth) and, therefore, according to the rules previously stated, the half times divisor is utilized in the B adders 44 instead of the two times divisor. The selection of the particular divisor is accomplished by sensing the bit next to the high order bit (the one-fourth decimal value bit) and controlling the gates 100 or 102 to gate through the desired divisor.

Since the dividend used in this first cycle is true, the divisors used in the A and the B adders 42 and 44 are complement. The one times divisor is applied from the divisor latch register 92 through the cables 96 and 96*a* to the exclusive OR circuits 98. The line 46 is positive at this time since the dividend is true, and the one's complement of the one times divisor is provided at the output of the exclusive OR circuits 98 through the cable 106, through the gates 108, and through the cable 110 to the A adders 42. In a similar manner, the normal or one times divisor is applied from the divisor latch register 92 through the cables 96 and 96*c* to the one-half times divisor gates 102. These gates gate the one times true divisor through the cable 114 to the OR circuits 116 which serve to shift the position of the divisor one place to the right (as shown at the top of the table in FIG. 11) to provide the one-half true divisor through the cable 118 to the exclusive OR circuits 120. The exclusive OR circuits 120 provide the one's complement of the one-half times divisor through the cable 122, the gates 124 and the cable 126 to the B adders 44. The two's complement of the divisors is provided by applying a positive signal from the cables 110 and 126 to the lowest order adder in the respective A and B adders 42 and 44. This serves to force a one into the low order position of each of these adders (the two's complement of a number is the one's complement of the number plus a one). The A and the B adders 42 and 44 perform the additions of the divisors and the dividend, and these adders supply the result of these additions through the respective cables 52 and 70 to the gates 54 and 72, respectively. However, only one set of the gates 54 or 72 will be selected to gate this result back to the dividend-quotient register 10 in FIG. 1 through the OR circuits 62, the cable 64, the OR circuits 14, and the cable 28. The result from the A adders 42 is applied through a cable 48, through the exclusive OR circuits 50 through the cable 140 to the shift decoder 142 in FIG. 3. The result from the B adders 44 is applied through the cable 66, the exclusive OR circuits 68 and the cable 170 to the adder selector 172 in FIG. 3. The adder selector 172 includes a decoding arrangement for determining the number of shifts indicated by the result from the B adders 44 in FIG. 2. If the shift indicated by the B adders 44 is two or greater, the adder selector 172 conditions the gates 72 in FIG. 2 by means of the line 178 to gate the result from the B adders 44 through the cable 70, through the gates 72, through the cable 78, through the OR circuits 62 and through the cable 64 to the OR circuits 14 in FIG. 1. If the result from the B adders 44 indicates a shift of less than two, the adder selector 172 in FIG. 3 conditions the gates 54 in FIG. 2 by means of the line 180 to pass the result from the A adders 42 through the cable 52, the gates 54, the cable 60, the OR circuits 62 and the cable 64 to the OR circuits 14 in FIG. 1. The adder selector 172 in FIG. 3 also provides a gating signal within itself or to the shift decoder 142 to gate the shift requested through either the cable 174 or the cable 160, respectively, to the OR circuits 162.

The shift available (which at this time is the total number of shifts to be allowed for the complete division process) is applied from the shift counter latch register 208 in FIG. 3 through the cable 212 and the cable 212*a* to the shift counter adder 166. The shift requested is applied from the OR circuits 162 through the cable 164 to the shift counter adder 166. The shift counter adder 166 serves to subtract (actually an addition through the use of the two's complement) the shift requested (provided through the cable 164) from the shift available (provided through the cable 212*a*). The result of the addition, which is the remaining shift available, is applied through the cable 190, the gates 192, the cable 200, the OR circuits 202 and the cable 206 to the shift counter latch register 208. The shift requested by the A adders 42 in FIG. 2 is determined in the shift decoder 142 in FIG. 3 and gated through the cable 144 to the OR circuits 146, or the shift requested by the B adders 44 in FIG. 2 is determined by the adder selector 172 in FIG. 3 and supplied through the cable 174 and the cable 174*b* to the shift decoder 142 and is gated through the cable 144 to the OR circuits 146 (depending upon which adder is selected by the adder selector 172). In other words, if the A adders 42 in FIG. 2 are selected, the shift indicated by the result from these adders is gated from the shift decoder 142 through the cable 144 to the OR circuits 146. If the B adders 44 in FIG. 2 are selected, the shift indicated by the result from these adders is gated from the adder selector 172 in FIG. 3 through the cables 174 and 174*b*, through the shift decoder 142 and through the cable 144 to the OR circuits 146. The shift requested is gated in a similar manner through either the cables 174 and 174*a* or the cable 160 to the OR circuits 162. The shift available also is applied through the cable 210 from the shift counter latch register 208 to the shift decoder 142. However, this information is utilized only at the last stage of the division process where the shift requested may be larger than the shift available. In this case only the shift available is gated through the cable 144 to the OR circuits 146.

The shift requested is supplied from the OR circuits 146 through the cable 150 to the shift control latch register 152. At the beginning of the next cycle (upon the occurrence of the next latch control signal) the shift requested is supplied through the cable 154 in FIG. 2 to the shifter 12 in FIG. 1 to shift the dividend in the divident-quotient latch register 10 and to supply the proper dividend bits in that next cycle to the A and B adders 42 and 44 in FIG. 2.

Referring back to the first cycle discussed above, after the addition is made and the result from one of the adders 42 or 44 is selected, the quotient generator 104 in FIG. 3 generates two quotient bits which are supplied through the lines 240 and 244 to the OR circuit 16 in FIG. 1. The development of quotient bits, which has been discussed generally, is illustrated in Table I below.

TABLE I

*Quotient development*

| Divisor Used | Resulting Partial Dividend | Quotient Bits Generated | |
|---|---|---|---|
| | | X | Y |
| ½C | T | 0 | 1 |
| | C | 0 | 0 |
| ½T | T | 1 | 1 |
| | C | 1 | 0 |
| 1C | T | 1 | (0) |
| | C | 0 | (1) |
| 1T | T | 1 | (0) |
| | C | 0 | (1) |
| 2C | T | ----- | ----- |
| | C | 1 | (1) |
| 2T | T | 0 | (0) |
| | C | ----- | ----- |

The quotient generator 104 senses which divisor is used by means of the line 180 and the line 983. The line 180 supplies a signal to the quotient generator 104 to indicate whether the A adders or the B adders 42 or 44 were selected. If the A adders 42 were selected, the one times divisor was used. If the B adders 44 were selected, either the one-half times or the two times divisor was used. The line 983 supplies a signal to the quotient generator 104 indicative of whether the one-half times divisor or the two times divisor is being utilized during a particular division problem.

The quotient generator 104 also receives information by the line 46 indicative of whether the divisor used was true or complement, and whether the resulting remainder from the addition is true or complement by the line 234. The quotient generator 104 supplies the correct quotient bits for the positions X and Y in the dividend-quotient latch register 10 in FIG. 1. Normally, these quotient bits are generated and applied through the OR circuit 16 in FIG. 1 to the dividend-quotient latch register 10. However, when the one-half times divisor is used in one cycle and a shift of one is indicated during the following cycle, the X quotient bit generated by the quotient generator 104 is not applied to the OR circuits 16 in FIG. 1. This generated X bit is suppressed by applying a negative signal through a line 33 to the gate 20 in FIG. 1, and the X position in the dividend-quotient latch register 10 is set from the Y position through the line 36 in FIG. 1 shown connected from the shifter 12 to the OR circuit 16. This is done, as was discussed before because the Y bit generated during a cycle in which the one-half times divisor is used is a correct quotient bit and must be shifted into the X position instead of generating a new X bit when a shift of one follows that cycle.

Only two quotient bits are generated during each cycle. However, shifts of greater than two may occur which would leave certain quotient bit positions vacant in the dividend-quotient latch register 10. When a shift of three or greater occurs, these positions that would be vacant are set to agree with the bits that are being shifted across by means of the cable 32 in FIG. 1 which is shown connected between the shifter 12 and the OR circuits 16. Referring to row 5 of FIG. 11, the 0 and the 1 shown in the respective X and Y columns (32 and 33) are the bits generated by the quotient generator 104 in FIG. 3. The result of the addition in the first cycle is shown in row 4, and this result indicates a shift of three will be requested and performed in the next cycle because a string of three like bits is present (the three underlined "ones"). The shift occurs between rows 5 and 6, and the dividend shown in row 6 is shifted three places from that shown in row 5. The bits shown in columns 1 through 9 in row 6 correspond to the bits shown in columns 4 through 12 in row 5. Since only two quotient bits were developed during the first cycle and the following shift was three bits, a bit corresponding to the bits shifted across is placed in the dividend-quotient latch register 10 in FIG. 1 at column 31 in the table in FIG. 11 when this three shift occurs. This is accomplished by sensing the bit in the second high order position of the dividend-quotient latch register 10 in FIG. 1 which corresponds to the bit (a one) in column 2, row 5 of FIG. 11. In a similar manner, if a shift of four occurs the bits shifted across are placed in columns 31 and 30, and if a shift of five occurs, bits corresponding to the bits shifted across are placed in columns 31, 30 and 29.

A shifter of any reasonable length may be utilized in the present system. However, for purposes of illustration, a five bit shifter is shown and described. In some cases, the shift decoder 142 or the adder selector 172 in FIG. 3 may indicate a requested shift of greater than five. If a shifter capable of larger shifts than five is employed no problem occurs, but if a five bit shifter, as in the present case, is utilized a somewhat different operation takes place. Keeping in mind that it is desired to make as great a shift as possible within practical equipment limits, means are provided to sense a shift greater than five suppress entry of the divisors, perform a shift of five and insert bits corresponding to the bits being shifted across in the low order positions (columns 29, 30, 31, 32 and 33 in the table of FIG. 11) in the dividend-quotient latch register 10 in FIG. 1. After the shift of five is taken the division process continues in a normal manner if the remaining shift requested is five or less. For example, assuming that the result from the B adders 44 in FIG. 2 indicates a shift of seven, the line 182 connected from the adder selector 172 in FIG. 3 becomes positive. This line supplies a signal to the suppress divisor control circuit 130 in FIG. 2 which in turn stores and supplies a negative signal through the line 132 to the gates 124 and 108 to suppress the entry of the divisors during the next cycle into the A and the B adders 42 and 44. The line 132 also provides a signal to the quotient generator 104 to suppress the generation of the normal X and Y quotient bits. The line 232 connected from the shifter 12 in FIG. 1 is connected to the quotient generator 104 in FIG. 3 to supply the bits being shifted across to the quotient generator 104. The signal on the line 132 from the suppress divisor control 130 conditions a gate within the quotient generator 104 to supply the bits being shifted across to the lines 240 and 244. A shift of five is taken, and bits corresponding to the bits being shifted across are placed into the X and the Y positions of the dividend-quotient latch register 10 in FIG. 1 from the quotient generator 104 in FIG. 3. The cable 32 in FIG. 1 supplies bits corresponding to the bits being shifted across to the dividend quotient latch register 10 for the next three high order positions (corresponding to columns 31, 30 and 29 in FIG. 11). Since a shift of seven was indicated and a shift of five has been taken, a requested shift of two remains. The divider now continues to operate in a normal manner, taking a shift of two.

Referring again to the table in FIG. 11, columns 1 through 8 show the additions performed by the A adders 42, and the columns 13 through 21 show the additions performed by the B adders 44. The bit in column 9 is not added, but is taken from and returned to the divisor-quotient latch register. It should be noted that the results of the additions performed in the first three cycles by the A adders are utilized. The result from the addition performed by the B adders during cycle 4 indicates that a shift of three will be made on the next cycle, and, therefore, the result from the B adders is used in the fourth cycle. The result of this addition is shown in row 16, columns 13 through 21. As illustrated in the table this result is applied back to the dividend-quotient latch register 10 in FIG. 1 (at row 17, columns 1 through 9). A shift of two is indicated by the results of the additions in the B adders during cycles 7, 8 and 9 and, therefore, these results are utilized rather than the results from the A adders.

The quotient bits for the positions X and Y are generated by the quotient generator 104 in FIG. 3 in accordance with the Table I as noted before. For example, in the first cycle (rows 2 through 5 in FIG. 11) the complement of the one times divisor is used (the complement is indicated by the "one" in row 3, column 1 and the one times divisor is used since the output of the A adders is used in this cycle) and the partial dividend is complement (indicated by the "one" in row 5, column 1). These conditions (complement of one times divisor used, partial dividend complement) indicate, by the Table I, that the generated quotient bits X and Y are a "zero" and a "one," respectively. These X and Y bits are shown in FIG. 11, row 5, columns 32 and 33. The quotient bits X and Y for the remaining cycles are generated in a similar manner. It should be noted in Table I that no quotient bits are shown for two times divisor complement, partial dividend true, and for two times divisor true, partial dividend complement. No bits are shown here because these conditions can not occur. If a true partial dividend resulted from using the complement of the two times the divisor it would mean that the dividend (which is true in this case) would be greater than twice the divisor. Since the divisor is normalized, it always has a minimum value of one half and, therefore, the dividend would be equal to or greater than one which is contrary to the division conditions set forth before (the dividend is a fraction greater than one-half but less than one). An analysis excludes the possibility of a complement partial dividend when the true value of the two times divisor is used.

As noted before, certain operations must be performed for terminating a division. Certain conditions are sensed by the suppress divisor control circuit 130 in FIG. 2, the termination control 218 and the quotient generator 104 in FIG. 3 to terminate the division properly. These conditions are sensed in the last cycle of the division operation. If the dividend or partial dividend is true and the shift requested is larger than the shift available, the entry of the divisors is suppressed and the bits being shifted across (the shift taken is that remaining) are inserted in the X and the Y quotient bit positions in the same manner as when a shift greater than 5 is requested. The line 46 applies a signal to the suppress divisor control circuit 130 in FIG. 2 indicative of whether the dividend is true or complement. The line 196 supplies a signal to the suppress divisor control circuit 130 from the shift counter adder 166 in FIG. 3 indicative of whether the shift requested is larger than the shift available. When the dividend is true and the shift requested is larger than the shift available, the suppress divisor control circuit 130 in FIG. 2 deconditions the gates 124 and 108 to suppress entry of the divisors into the A and the B adders 42 and 44. The suppress divisor control circuit 130 supplies a signal through the line 132 to the quotient generator 104 in FIG. 3 to condition a gate within the quotient generator to supply the bits being shifted across to the lines 240 and 244.

If the dividend is complement and the shift allowed is zero, the zero shift is made in the next cycle, the true value of one times the divisor is added, and no new X and Y quotient bits are generated as the bits already present in the dividend-quotient latch register 10 in FIG. 1 in positions X and Y are correct. This termination procedure is controlled by the termination control circuit 218 in FIG. 3. The line 46 supplies a signal indicative of whether or not the dividend is true or complement. The zero detector 214 supplies a signal through the line 216 to the termination control circuit 218 indicating that the shift allowed is zero. The zero shift is made in the normal manner (through the shift control latch register 152 in FIG. 2, the cable 154, etc.), and the termination control circuit 218 supplies a signal through the line 222 to the adder selector 172 to select the output of the A adders 42 in FIG. 2. This effectively selects the one times divisor since this divisor always is utilized in the A adders 42. The termination control circuit 218 also supplies a signal through a line 252 to the dividend-quotient latch register 10 to suppress the entry of quotient bits X and Y.

If the shift requested is equal to the shift available at termination, the one times divisor multiple must be selected following the shift. The equality detector 194 provides a signal through a line 220 to the termination control circuit 218 to indicate when the shift requested is equal to the shift available. When this occurs, the information is stored in a register and the termination control circuit 218 supplies a signal during the next cycle through the line 222 to the adder selector 172 to select the one times divisor (by selecting the A adders 42). This implies a zero shift for the next cycle.

If the resulting adder output following the use of the zero shift is in true form, the division is complete. When this occurs, the termination control circuit 218 supplies a signal on a line 254 which indicates that the division process is complete. This signal may be employed by equipment which is used with the present divider to proceed with other operations. If the resulting adder output is in complement form, one additional cycle is required to get the remainder into true form. In this case the shift allowed is zero, and the operation is the same as discussed above when the dividend is complement and the shift allowed is zero. If, on the last cycle, the dividend is complement and the shift requested is equal to or greater than the shift allowed, the allowed shift is used and the division continues in the normal manner. If the resulting remainder is in true form, the division is complete. If the resulting remainder is in complement form, the resulting quotient is complete but one additional cycle is required to get the remainer in true form. This latter condition occurs only when the shift called for and the shift counter register are equal. Since the allowed shift is used, the remaining shift allowed is zero and the circuits discussed above to complete the division when the dividend is complement and the shift allowed is zero complete the division process.

According to another feature of the present invention, an illustrative arrangement of a divider employing a single adder in which to add the dividend and the divisor is shown in FIGS. 1, 5 and 6. These figures are arranged as shown in FIG. 4b. The circuits shown in FIG. 1 are common to both the illustrated double adder divider (FIGS. 1 through 3) and the single adder divider (FIGS. 1, 5 and 6). Hence, a detailed discussion of the construction and interconnection of the circuits in FIG. 1 will not be reiterated at this point. Many of the circuits shown in FIGS. 5 and 6 are identical to those shown in FIGS. 2 and 3. However since a single adder is employed certain circuits are eliminated, certain additional circuits are utilized and certain circuits are modified. For example, obviously the B adder 44 in FIG. 2 is not utilized in the single adder divider example. A decoding arrangement (termed a multiple selector) is utilized to select a particular divisor multiple before the divisor is entered into the single adder.

The OR circuits 18 in FIG. 1 are connected through cables 40 and 40a to adders 300. The adders 300 include nine individual adders to add seven bits of the dividend (and two extra bits, true/complement bit and an overflow bit) with a divisor. The output of the adders 300 is connected through the cable 302 to exclusive OR circuits 304, and through a cable 306 to gates 308. A gate inhibit line 310 is connected to the gates 308. The outputs from the gates 308 are connected through the cable 64 to the OR circuits 14 in FIG. 1.

A cable 316 is connected from a storage device (not shown) to a divisor latch register 318 in FIG. 5. A latch control line 320 is connected to the divisor latch register 318. The output of the divisor latch register 318 is connected through cables 322 and 322a to two times divisor gates 324. The output of the divisor latch register 318 is connected through cables 322 and 322b to one-half times divisor gates 326. The output of the divisor latch register 318 is connected through cables 322 and 322c to one times divisor gates 328. The two times divisor gates 324 are connected through a cable 330 to OR circuits 332. The one-half times divisor gates 326 are connected through a cable 334 to the OR circuits 332, and the one times divisor gates 328 are connected through a cable 336 to the OR circuits 332. The OR circuits 332 serve to supply the one times divisor, the one-half times divisor (which is shifted right one position with respect to the one times divisor), or the two times divisor (which is shifted left one position with respect to the one times divisor) through a cable 338 to exclusive OR circuits 340. The exclusive OR circuits 340 supply either the true or the complement of the divisor applied to their inputs. The outputs from the exclusive OR circuits 340 are applied through the cable 342 to the adders 300. Certain divisor bits are supplied from the divisor latch register 318 through the cables 322 and 322d to a multiple selector 350 in FIG. 6. Also, certain dividend bits are supplied from the OR circuits 18 in FIG. 1 through the cables 40 and 40c to the multiple selector 350 in FIG. 6. The true/complement line 46 is connected from the shifter 12 in FIG. 1 through a gate 421 to the exclusive OR circuits 340. This line 46 also is connected through the gate 421 and a line 423 to the adders 300 in FIG. 5.

The outputs of the exclusive OR circuits 304 in FIG. 5 are supplied through a cable 354 to a shift decoder 356 in FIG. 6. The shift decoder 356 is connected through a cable 358 to OR circuits 360 in FIG. 5. A cable 362 is connected from a storage device (not shown) to the OR circuits 360. The OR circuits 360 are connected through a cable 364 to a shift control latch register 366. The shift control latch register is connected through the cable 154 to the shifter 12 in FIG. 1.

The shift decoder 356 in FIG. 6 also is connected through a cable 368 to OR circuits 370. The OR circuits 370 are connected through a cable 372 to a shift counter adder 374. The output of the shift counter adder 374 is connected through a cable 376, gates 378 and a cable 380 to OR circuits 382. The OR circuits 382 are connected through a cable 386 to a shift counter latch register 388. The shift counter latch register 388 is connected through a cable 390 to the shift decoder 356, and through a cable 392 to the shift counter adder 374. A line 394 is connected from the shift decoder 356 to the multiple selector 350. A line 398 is connected from the shift counter adder 374 to the shift decoder 356, the gates 378, and a termination control circuit 400. A gate inhibit line 402 is connected to the gates 378. The latch control line 230 is connected to the shift control latch register 366 in FIG. 5, and to the multiple selector 350 and to the shift counter latch register 388, in FIG. 6.

The multiple selector 350 in FIG. 6 is connected through line 404, 405 and 406 to gates 408. A line 410 is connected from the termination control circuit 400 to the gates 408. An equality detector 412 is connected from the shift counter adder 374 through cables 376 and 376*a*. The output of the equality detector 412 is connected through a line 414 to the termination control circuit 400. A zero detector 416 is connected from the shift counter latch register 388 through cables 392 and 392*a*. The output of the zero detector 416 is connected through a line 418 to the termination control circuit 400. A line 420 is connected from the termination control circuit 400 to the multiple selector 350. The true/complement line 46 is connected as an input to the termination control circuit 400. A line 422 may be connected from the termination control circuit 400 to equipment (not shown) associated with the present divisor to indicate when division is complete.

The outputs from the gates 408 are connected through lines 424, 425 and 426 to the two times divisor gates 324, the one-half times divisor gates 326 and the one times divisor gates 328, respectively. These lines 424, 425 and 426 also are connected to the quotient generator 396. A line 434 is connected from the adders 300 in FIG. 5 to the quotient generator 396 in FIG. 6. A line 232 is connected from the shifter 12 in FIG. 1 to the quotient generator 396 in FIG. 6. The line 425 from the gates 408 in FIG. 6 is connected to a line 246 (FIG. 5) which in turn is connected to the dividend-quotient latch register 10 in FIG. 1. A line 240 is connected from the quotient generator 396 in FIG. 6 to the gate 20 in FIG. 1, and a line 244 is connected from the quotient generator 396 to the OR circuits 16 in FIG. 1.

The operation of the single adder divider shown in FIGS. 1, 5 and 6 is quite similar to the operation of the double adder divider shown in FIGS. 1, 2 and 3. The basic differences between the two arrangements are in the circuits for selecting the particular divisor multiple to be used. The efficiency of the operation of the single adder divider as compared to the double adder divider primarily depends upon the decoding arrangement for multiple selection, i.e., complex decoding provides for more efficient operation than does simple decoding. The efficiency of the two adder divider is comparable to that of a single adder divider where optimum decoding is utilized in the single adder divider. The specific circuits in the multiple selector 350, which will be shown and described in detail subsequently, provide complex decoding but less than optimum decoding. The decoding is achieved by sensing a certain number of the dividend bits and a certain number of the divisor bits and, therefore, the complexity of decoding and efficiency of operation of the divider is related to the number of these bits that are sensed.

The initial operations for commencing the division process for the single adder divider are the same as those for the double adder divider. The dividend is supplied through the cable 22 and the OR circuits 14 and 16 to the dividend-quotient latch register 10 in FIG. 1. The divisor is applied through the cable 316 to the divisor latch register 318 in FIG. 5. An initial shift of zero is applied through the cable 362, the OR circuits 360 and the cable 364 to the shift control latch register 366 in FIG. 5. The number of quotient bits to be developed (twenty-three in this example as in the double adder example since the initial dividend and divisor are the same in each case) are supplied through the cable 364, the OR circuits 382 and the cable 386 to the shift counter latch register 378 in FIG. 6 are deconditioned. Also, a positive level is applied to the shift counter adder 374 through line 375.

Figure 12:
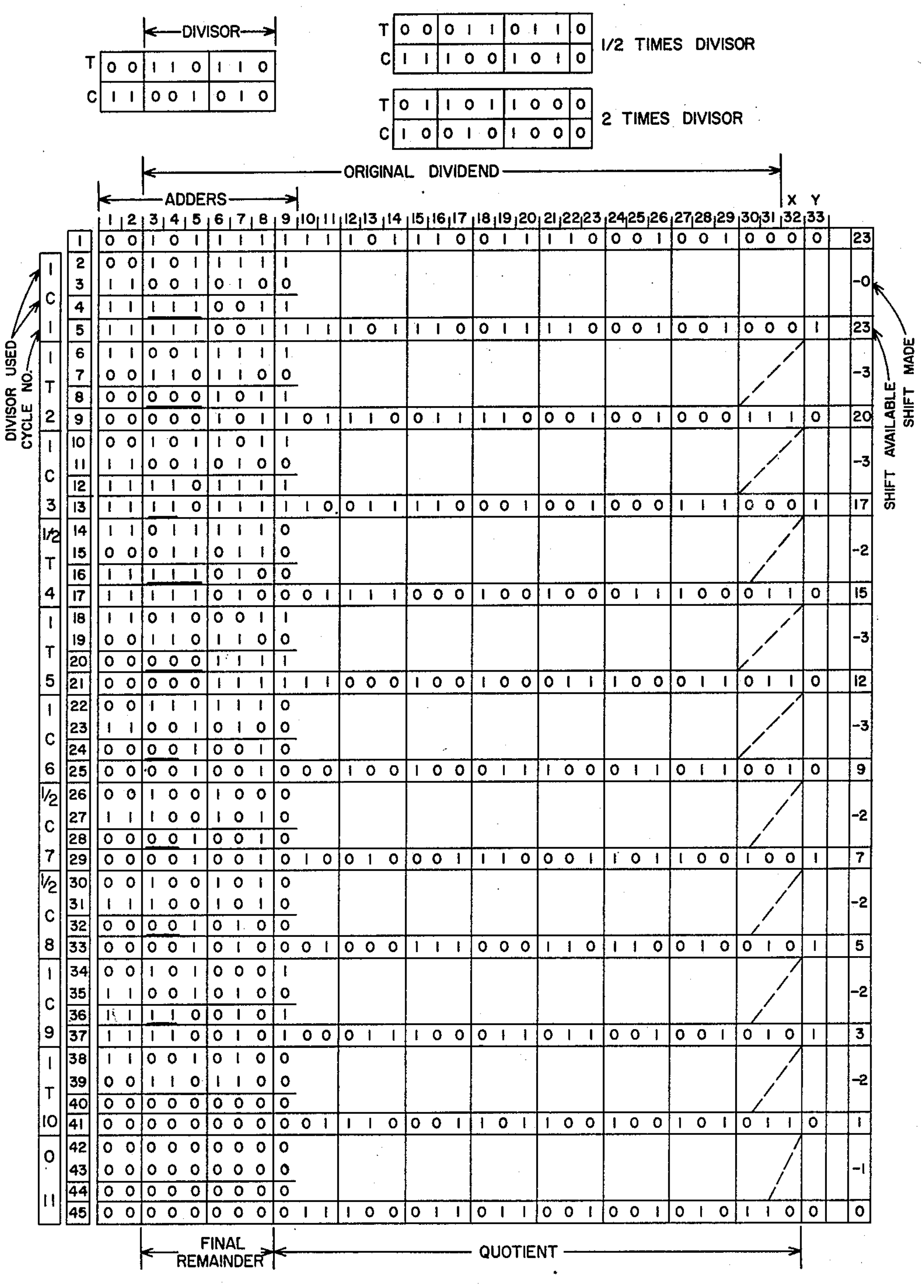
FIG. 12 shows a table which illustrates the additions performed, the multiples used, and the shifts made during a divide operation by the divider shown in FIGS. 1, 5 and 6.

FIG. 12 is a table which illustrates the operations performed by the single adder divider in FIGS. 1, 5 and 6. The same dividend and the same divisor that is shown in the table in FIG. 11 is used for the divide example shown in FIG. 12. In the single adder arrangement, the adders 300 in FIG. 5 receive the dividend and one of the divisor multiples in each cycle rather than one adder receiving the one times divisor multiple and another adder receiving either the two times or the one-half times divisor multiples as in the double adder arrangement.

A shift to zero is made in the first cycle since a shift of zero is indicated by the shift control latch register 366 in FIG. 5 (an initial shift of zero was stored in this register as noted above). The initial dividend is stored in positions (columns in FIG. 12) 3 through 31 of the dividend-quotient latch register 10 in FIG. 1. When the zero shift signal is applied to the shifter 12, the bits in positions 1 through 9 are applied through the cable 38, the OR circuits 18 (FIG. 1), the cable 40 and the cable 40*a* to the adders 300 in FIG. 5. The initial dividend is true as indicated by the zero in row 1, column 1 of FIG. 12. Hence, the divisor must be complement, and the one times divisor is used in the first cycle. The one times divisor gates 328 are conditioned by the line 426, and supply the divisor through the cable 336 to the OR circuits 332. The one times divisor is applied from the OR circuits 332 through the cable 338 to the exclusive OR circuits 340. A signal is applied through the line 46 and the gate 421 to the exclusive OR circuits 340, and this signal causes these exclusive OR circuits to complement the one times divisor. The complement (one's complement) of the one times divisor is applied through the cable 342 to the adders 300. At the same time, a signal is applied through the line 46, the gate 421 and the line 423 to the adders 300 to force a one in the low order adder position in the adders 300 to provide the two's complement of the one times divisor. The line 423 also is connected to the high order adder in the adders 300 to supply a bit indicating whether the divisor is true or complement (in this case a "one"). The complement (two's) one times divisor which is added in the adders 300 is shown in the table of FIG. 12, row 3, columns 1 through 9.

The result of the addition in the adders 300 in FIG. 5 is applied through the cable 306, the gates 308 and the cable 64 to the OR circuits 14. This result, or partial dividend, is applied through the OR circuits 14 and the cable 28 to the dividend-quotient latch register 10 in FIG. 1.

After the addition is made, the quotient generator 396 in FIG. 6 senses the necessary conditions to generate the X and the Y quotient bits which are supplied to the dividend-quotient latch register 10 in FIG. 1 in the same manner as discussed in the double adder example. In the present first cycle the quotient generator 396 in FIG. 6 receives a signal from the line 426 that the one times divisor is being used, a signal from the line 46 that the divisor is complement, and a signal from the line 434 that the partial dividend is complement. The quotient generator 396 generates X and Y bits 0 and 1, respectively, in accordance with Table I discussed previously. These bits are entered into respective positions 32 and 33 of the dividend-quotient latch register 10 in FIG. 1. These bits appear in FIG. 12, row 5, columns 32 and 33.

A portion of the output of the adders 300 in FIG. 5 is applied through the cable 302, the exclusive OR circuits 304, and the cable 354 to the shift decoder 356 in FIG. 6. The shift decoder 356 indicates that a shift of three is requested. The amount of shift requested is indicated by the underlined bits in FIG. 12, row 4, columns 3 through 5. The shift decoder 356 supplies the shift three request through the cable 358, the OR circuits 360 and the cable 364 to the shift control latch register 366 in FIG. 5. Upon the application of the next latch control signal (the second in this example) on the line 230, the shift control latch register 366 conditions the shifter 12 in FIG. 1 to provide the three position shift. The shift three request also is supplied from the shift decoder 356 in FIG. 6 through the cable 368, the OR circuits 370 and the cable 372 to the shift counter adder 374. The shift available is supplied from the shift counter latch register 388 through the cable 392 to the shift counter 374. The shift counter adder 374 provides an output which is the difference between the shift available and the shift requested. This output represents the remaining shifts available, and it is applied through the cable 376, the gates 378, the cable 380, the OR circuits 382 and the cable 386 to the shift counter latch register 388.

The shift available is supplied from the shift counter latch register 388 through the cable 390 to the shift decoder. However, as discussed in connection with the double adder example, this information concerning the available shift is not utilized within the shift decoder 356 unless the shift requested is larger than the shift available. In such a case, the shift decoder 356 is conditioned by the line 398 from the shift counter adder 374 to indicate that only the shift available is to be made, and only the shift available would be applied to the shift control latch register 366 in FIG. 5.

In the event of a shift larger than two but not greater than five, the quotient bits (other than X and Y) are generated in the same manner as in the double adder example. These quotient bits are set to agree with the bits being shifted across, and they are supplied through the cable 32, the OR circuits 16 and the cable 30 to the dividend-quotient latch register 10 in FIG. 1. In the event of a requested shift greater than five, the shift decoder 356 in FIG. 6 supplies a signal through the line 394 to the multiple selector 350. This signal prevents the multiple selector 350 from selecting any multiple and, therefore, any of the divisor gates 324, 326 or 328 in FIG. 5. The mutiple selector 350 supplies a signal through the line 419 to decondition the gate 421 in FIG. 5 to prevent the gate 421 from supplying a signal to the high order and the low order adders in the adders 300, and to prevent the gate 421 from supplying a signal to the exclusive OR circuits 340. A shift of five is made and no divisor is entered into the adders 300 in FIG. 5. The signal on the line 419 also is applied to the quotient generator 396. This signal conditions a gate within the quotient generator 396 to cause the X and the Y quotient bits to be generated in agreement with the bits being shifted across. An indication of the bits being shifted across is supplied to the quotient generator 396 by the line 232 which is connected from the second position in the dividend-quotient latch register 10 through the shifter 12 in FIG. 1. When a shift greater than five is requested, the shift of five is taken as just described, and then the remaining shift requested is taken in the normal manner. Should the shift request be greater than ten, for example, two shifts of five are taken in the manner just discussed, followed by the remaining shift made in the normal manner.

The cycles of the division operation continue as illustrated in FIG. 12. The multiple selector 350 in FIG. 6 operates to select a divisor multiple which will result in the greatest number of bits being shifted across. Note that in the fourth cycle of the division example shown in FIG. 12 that the true value of the one-half times divisor multiple is employed. This multiple is selected by the multiple selector 350 in FIG. 6 which conditions the one-half times divisor gates 326 in FIG. 5 by means of the line 405, the gates 408 and the line 425. The gates 326 gate the divisor in the divisor latch register 318 to the OR circuits 332. These OR circuits 332 serve to shift the divisor one position right with respect to the true one times divisor thereby providing a true one-half times divisor through the cable 338 to the exclusive OR circuit 340. Since the true value of the one-half times divisor is to be utilized, the exclusive OR circuits 340 are not conditioned by the line 46 and the gate 421 to complement the divisor applied to their inputs. Likewise, the signal on the line 423 does not force a one into the low order position of the adders 300. This line 423 supplies a negative signal (a zero) to the high order adder in the adders 300. Hence, the true value of the one-half times divisor is added to the dividend in the adders 300 in FIG. 5. The result of the addition is supplied back to the high order positions of the dividend-quotient latch register 10 in FIG. 1 in the normal manner. The other components of the system operate in a normal manner to select the shift for the next cycle, generate quotient bits, etc. The only difference between the use of the one times divisor, or the two times or one-half times divisors in the operation of the system is in the gating of the desired divisor to the adders.

The termination conditions in the single adder example are the same as those for the double adder example. When (at termination) the dividend is true and the shift requested is larger than the shift available, these conditions are supplied by respective lines 46 and 398 to the termination control circuit 400, and the available shift is made. The termination control circuit 400 supplies a signal on the line 420 to the multiple selector 350 to suppress the entry of a divisor into the adders 300 in FIG. 5. The multiple selector deconditions the gate 421 through the line 419. The multiple selector 350 supplies a signal through the line 419 to the quotient generator 396. This signal conditions the gate within the quotient generator 396 to set the X and Y quotient bits to agree with the bits being shifted across. The line 232 supplies information indicative of the bits being shifted across to the quotient generator 396.

The zero detector 416 supplies a conditioning signal through the line 418 to the termination control circuit 400 when the available shift is zero. When this condition occurs along with an indication that the dividend is complement, the termination control circuit 400 supplies a signal through the line 410 to the gates 408. This signal causes the gates 408 to select the one times divisor. The termination control circuit 400 also supplies a signal through a line 252 to the dividend-quotient latch register 10 to suppress entry of the quotient bits X and Y.

The equality detector 412 supplies a conditioning signal through the line 414 to the termination control circuit 400 when the shift requested is equal to the shift available. When this condition occurs, the termination control circuit 400 stores this fact and on the next add cycle supplies a signal through the line 410 to the gates 408 to select the one times divisor. If the resulting adder output is in true form, the division process is complete which is indicated by a signal on the line 422. If the resulting adder output is in complement form, one additional cycle is required to get the remainder into true form. In this case, the remaining shift available is zero and the above described circuits for termination when the dividend is complement and the shift available is zero control the termination.

If the dividend is complement and the shift requested is equal to or larger than the shift available, the allowed shift is used and the division proceeds in the normal manner. If the resulting remainder is in true form, division is complete which is indicated by the signal on the line 422. If the resulting remainder is in complement form, the resulting quotient is complete, but one additional cycle is required to get the remainder in the true form. Since the allowed shift has been used, the shift available is zero and the above described circuits for controlling termination when the dividend is complement and the shift available is zero control the termination.

A more detailed showing of the divider examples shown in FIGS. 1, 2 and 3, and in FIGS. 1, 5 and 6 follows. The double adder divider system is shown in greater detail in FIGS. 13 through 41 and the single adder divider is shown in greater detail in FIGS. 13 through 27 and FIGS. 42 through 53. These detailed circuits of the divide system examples are discussed below in connection with Table I which was previously explained.

The double adder divider example previously described which appears in block form in FIGS. 1 through 3 is shown in detail in FIGS. 13 through 41. FIG. 4*c* illustrates the manner in which FIGS. 13 through 41 are arranged. The portion of the system in block form which appears in FIG. 1 is shown in detailed form in FIGS. 13 through 27. This portion of the system is common both to the double adder divider example and the single adder divider example. The block diagram of the system shown in FIGS. 2 and 3 is shown in detail in FIGS. 28 through 41. The reference numerals that appear in FIGS. 1 through 3 also are used in FIGS. 13 through 41. The circuits in block form in FIGS. 1 through 3 are shown enclosed within dashed lines in FIGS. 13 through 41. The reference numerals of the cables and the lines in FIGS. 1 through 3 also are used in FIGS. 13 through 41, and where a plurality of cables is shown in FIGS. 13 through 41 which correspond to a single cable in FIGS. 1 through 3, the reference numerals on the plurality of cables are the same as that on the single cable but a letter suffix is added. Certain lines within a cable are treated in a similar manner.

The portion of the system that appears in FIG. 1 and in detail in FIGS. 13 through 27 is described first since it is common both to the two adder example and the single adder example. The dividend-quotient latch register 10 is shown within dashed lines at the top of FIGS. 17 through 20. The shifter 12 is shown in FIGS. 17 through 24 and 27. The OR circuits 14 are shown within dashed lines in FIG. 13, and the OR circuits 16 are shown within dashed lines in FIGS. 14 through 16. The OR circuits 18 are shown within dashed lines in FIGS. 25 and 26.

The dividend-quotient latch register 10 shown in FIGS. 17 through 20 includes thirty-four individual latch registers 500 through 533. The individual latch registers 502 through 531 are employed to store the dividend and the quotient. The latch register 500 stores whether the dividend is true or complement, and the latch register 501 is an overflow register. The latch register 531 and 532 store the X and Y quotient bits. The individual latch register 533 is employed to store whether or not the one-half times multiple is used. This latter operation will be explained in greater detail subsequently. The numerals appearing within the individual latch register boxes 500 through 532 correspond to the column numbers appearing in the illustrative tables in FIGS. 11 and 12. The latch control line 230 (FIG. 17) is connected to the individual latch registers 500 through 508, and through a gate 574 and a line 230a to the individual latch registers 531 to 533. The latch control line 230 is connected to a gate 534, and the output of the gate 534 is connected through a line 535 to the individual latch registers 509 through 530. A line 536 is connected from the cable 154 to an inverter 537. This inverter is connected through a line 538 to the gate 534. The line 536 supplies a signal through the inverter 537 and the line 538 to the gate 534 when a shift of zero is requested to prevent the latch control signal on the line 230 from affecting the individual latch registers 509 through 530. The line 252 is connected through an inverter 575 to the gate 574 to decondition this gate at termination when the partial dividend is complement and the shift available is zero. This operation suppresses the entry of new quotient bits into the latch registers 531 and 532 in FIG. 20.

Figure 17:
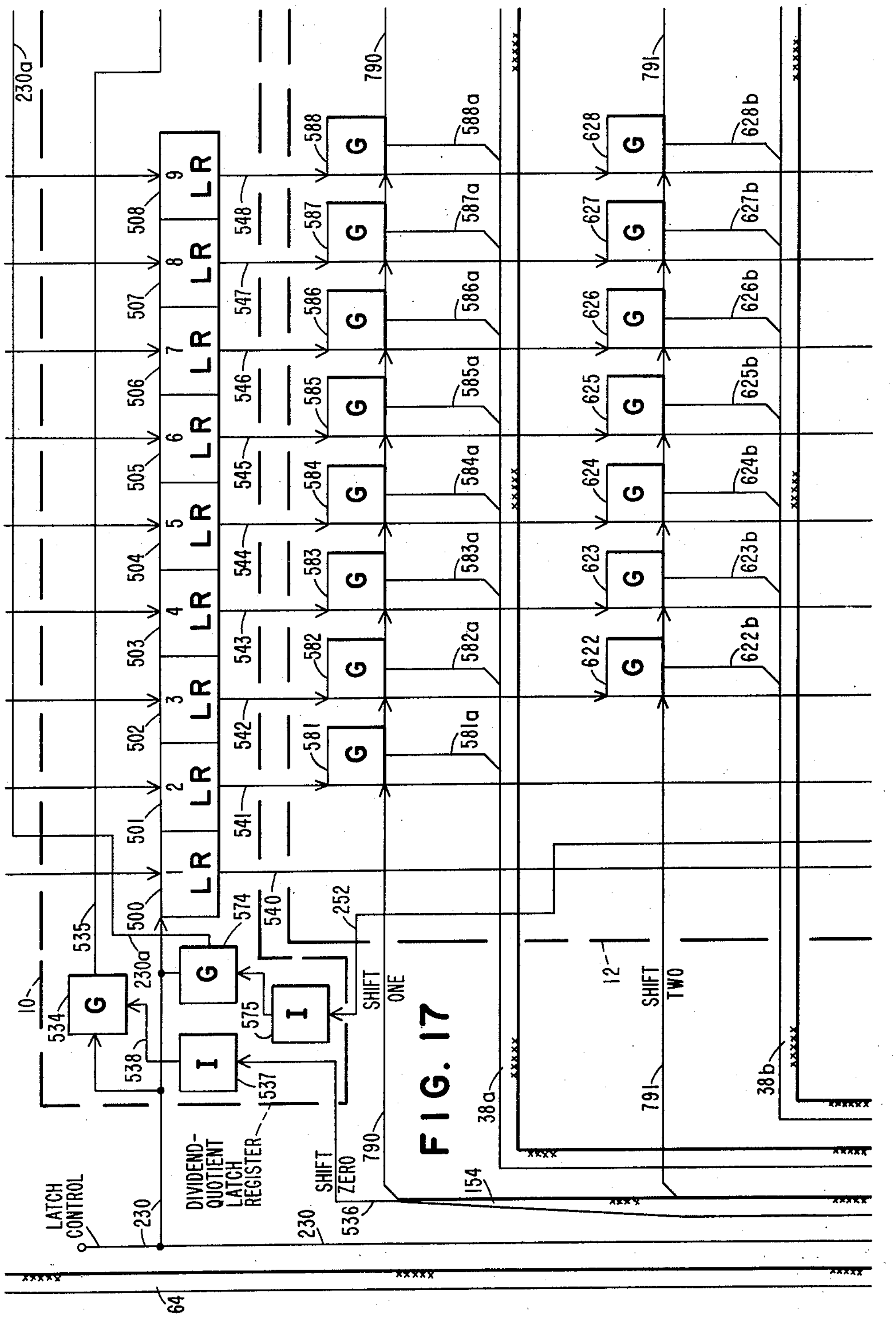
Figure 18:
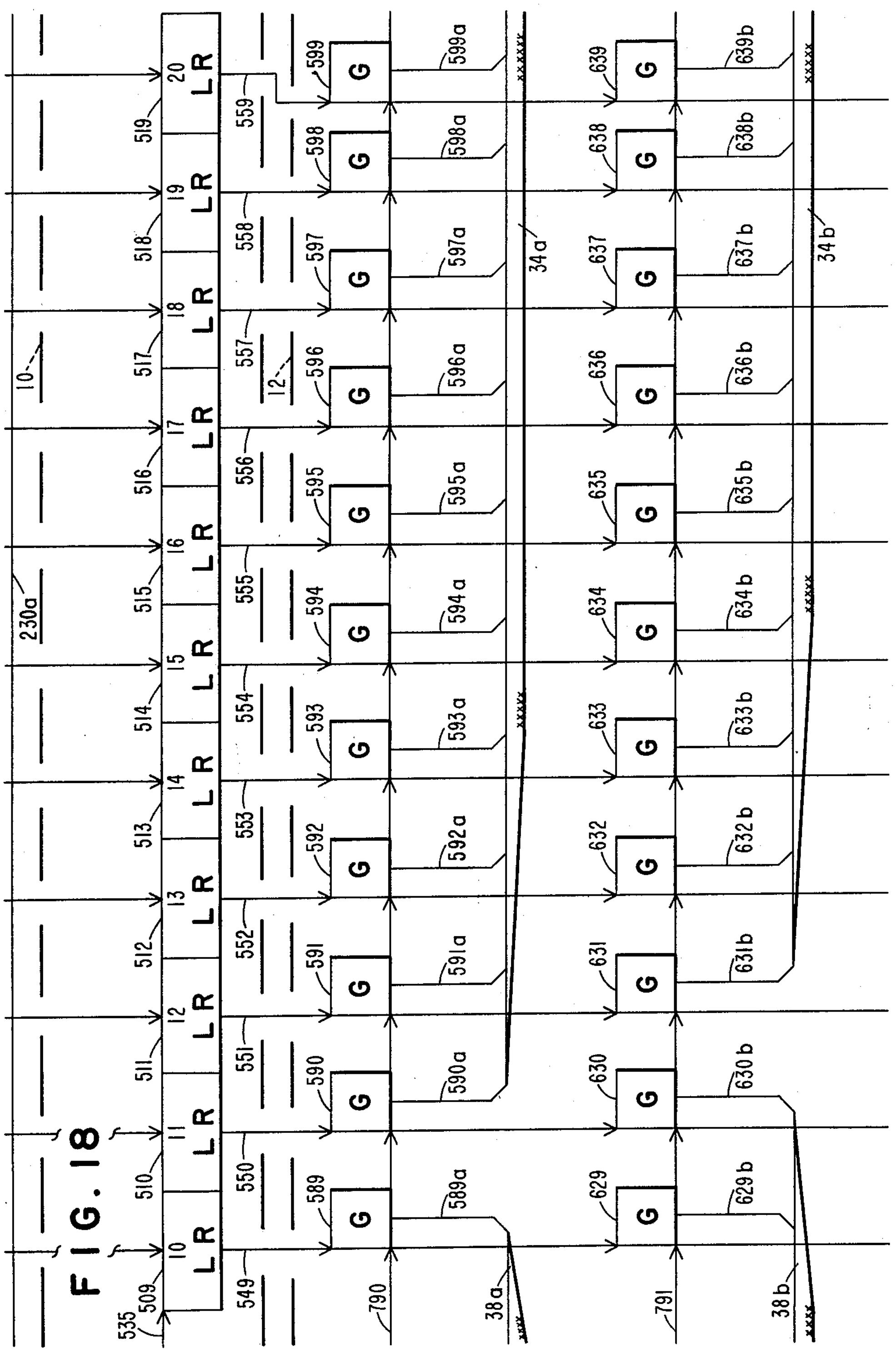
Figure 19:
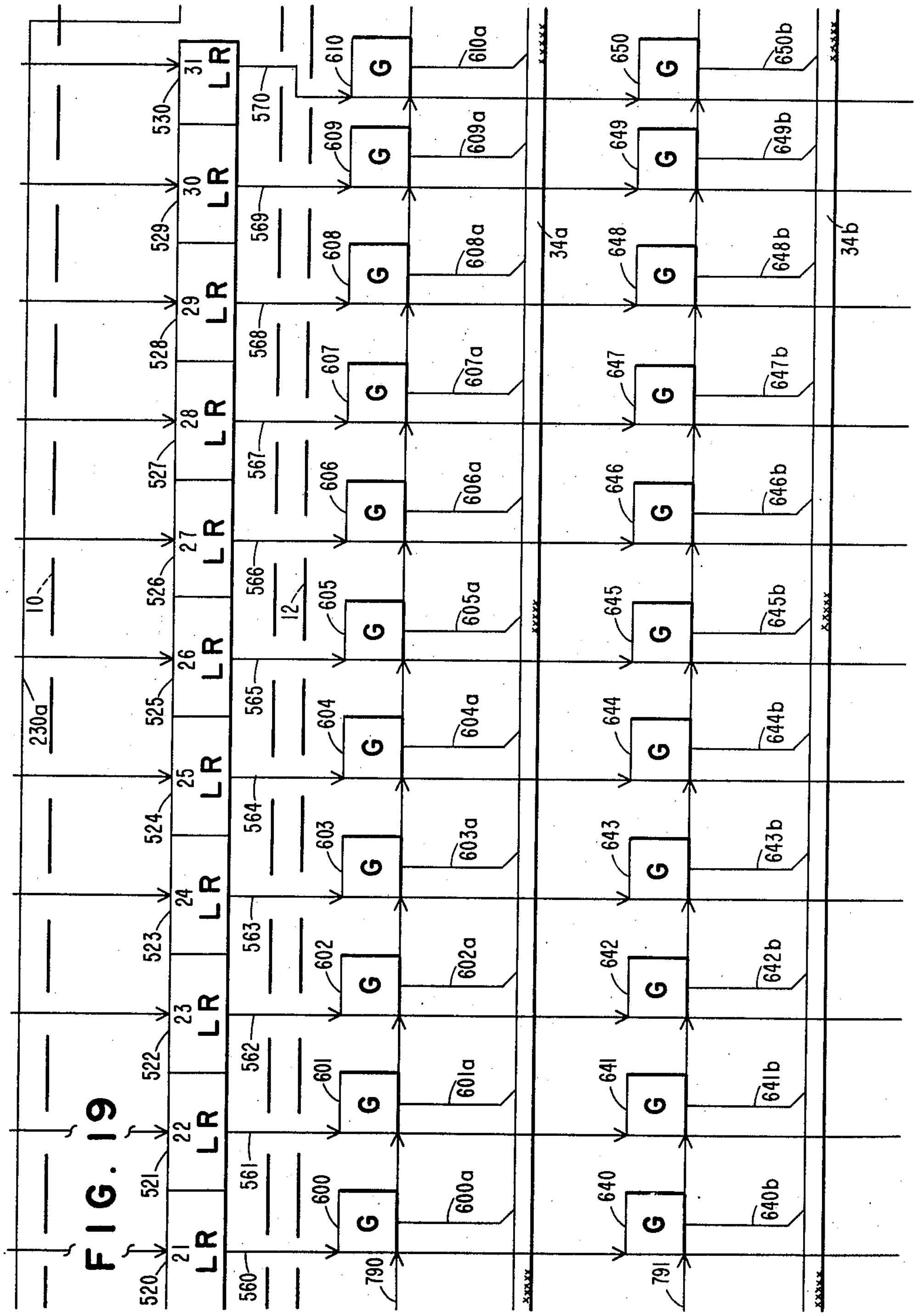
Figure 20:
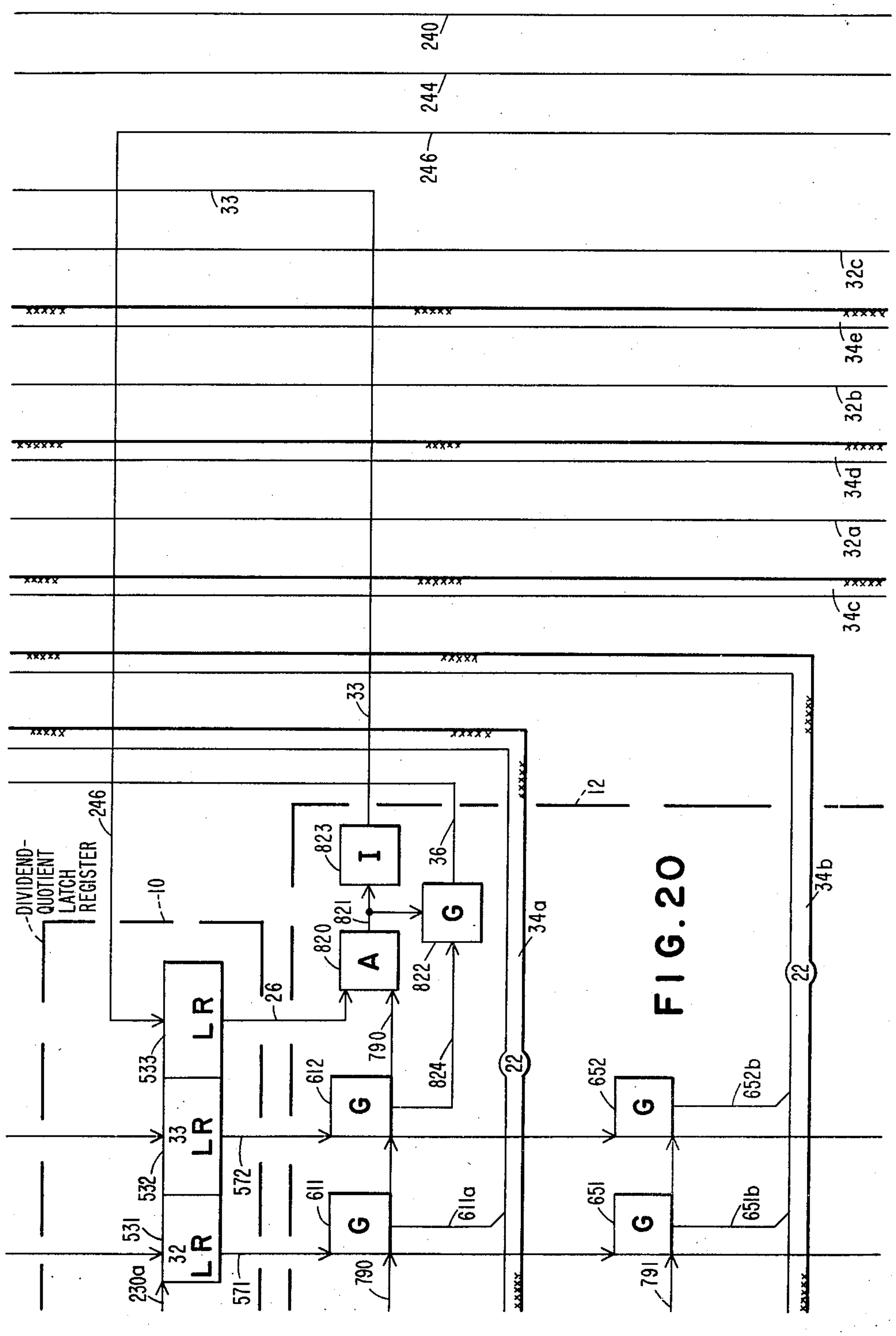

Each output line 540 through 572 from the individual latch registers 500 through 532 is connected to a vertical string of gates within the shifter 12 (shown within dashed lines in FIGS. 17 through 24 and 27). For example, the output line 540 from the individual latch register 500 in FIG. 17 is connected to gate 780 in FIG. 27. The line 541 from the latch register 501 is connected to gates 581, 661, 701 and 741 in FIG. 21, and to a gate 781 in FIG. 27. The line 542 from the latch register 502 is connected to gates 582 and 662 in FIG. 17, and to a gate 782 in FIG. 27. The line 543 is connected to gates 583 and 623 in FIG. 17, to gate 663 in FIG. 21, and to a gate 783 in FIG. 27. The line 544 from the latch register 504 is connected to gates 584, 624, 664, 704 and 784. The line 545 is connected to gates 585, 625, 665, 705, 745 and 785. The line 546 is connected to gates 586, 626, 666, 706, 746 and 786. The line 547 is connected to gates 587, 627, 667, 707, 747 and 787. The line 548 is connected to gates 588, 628, 668, 708, 748 and 788. The line 549 from the latch register 509 in FIG. 18 is connected through gates 589 and 629 in FIG. 18 and to gates 669, 709 and 749 in FIG. 22. The output lines 550 through 572 from the latch registers 510 through 532 in FIGS. 18 through 20 are connected to the vertical strings of gates in FIGS. 18 through 20 and 22 through 24 in a similar manner. The output of the latch register 500 (FIG. 17) is connected through the line 540 to an inverter 859 in FIG. 27.

Figure 21:
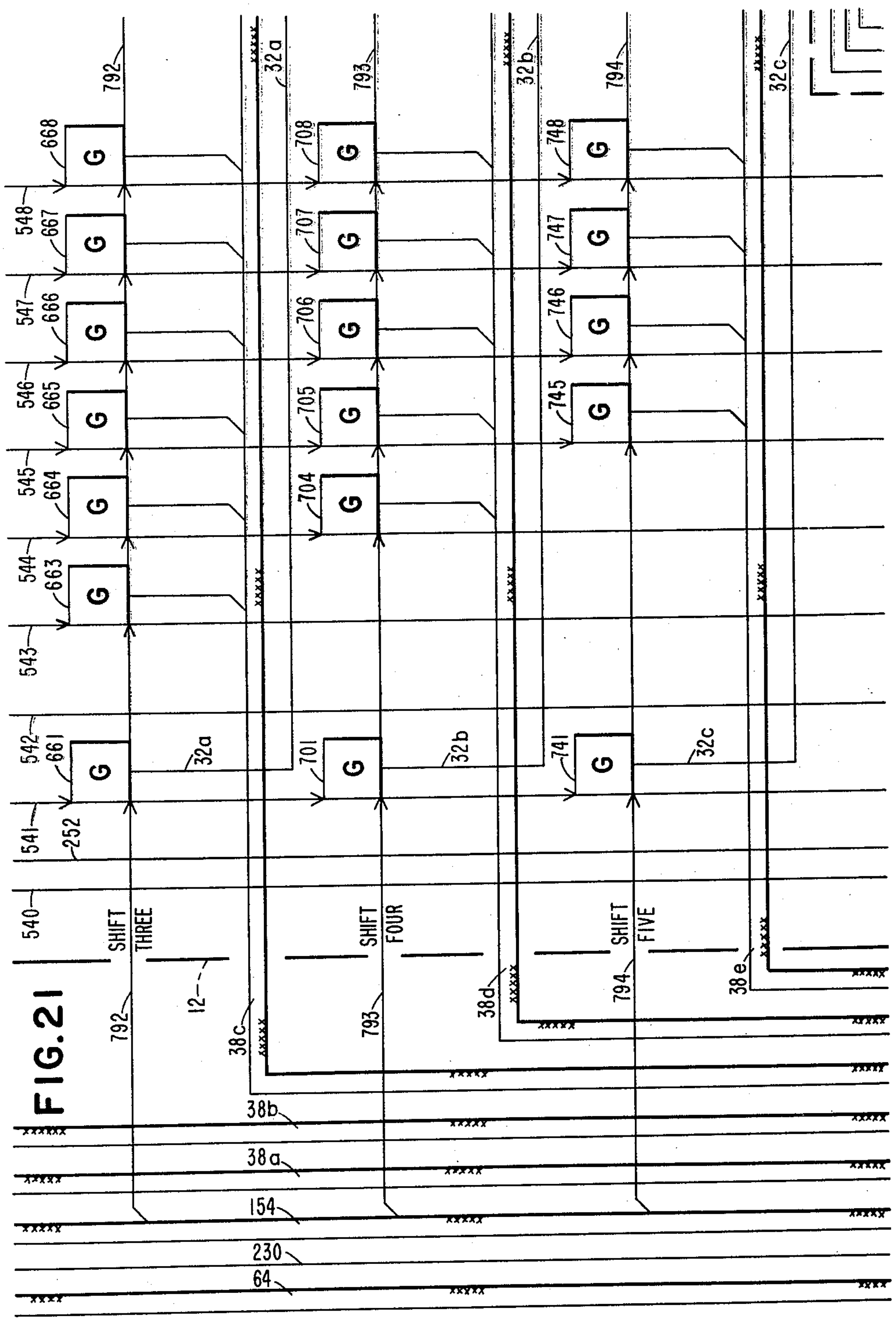
Figure 27:
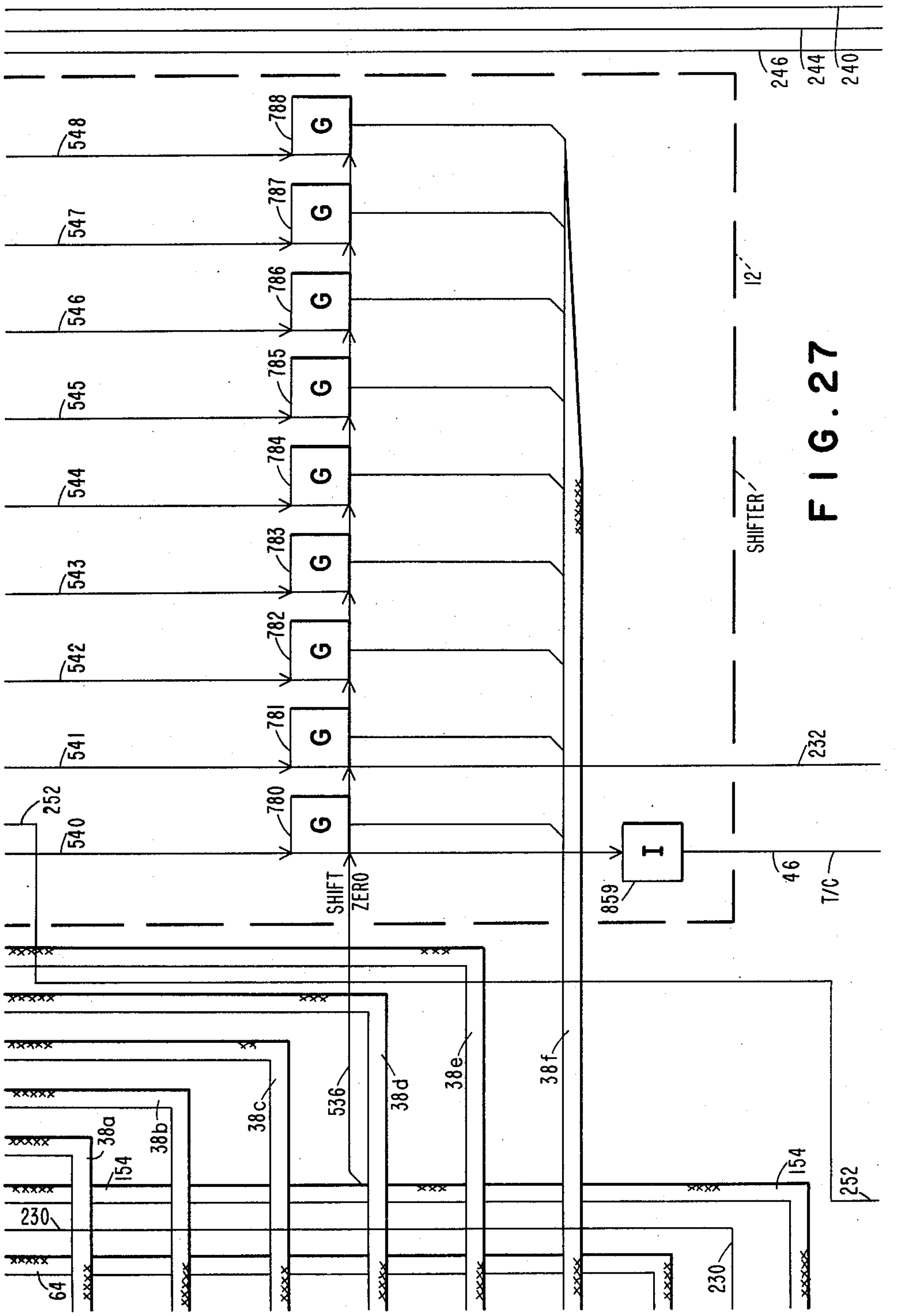

A first row of gates 581 through 612 (FIGS. 17 through 20) are termed the shift one gates, the second row of gates 622 through 652 are termed the shift two gates, the third row of gates 660 and 663 through 692 (FIGS. 21 through 24) are termed the shift three gates, the fourth row of gates 700 and 704 through 732 are termed the shift four gates, the fifth row of gates 740 and 745 through 772 are termed the shift five gates, and the sixth row of gates 780 through 788 (FIG. 27) are termed the shift zero gates. A certain row of these gates is conditioned in response to a shift request signal. The shift request signals are supplied to these gates through the cable 154 (FIGS. 17, 21 and 27). A line 790 is connected from the cable 154 to the shift one gates in FIG. 17. Likewise, lines 791, 792, 793, 794 and 536 are connected from the cable 154 to the shift two, three, four, five and zero gates, respectively.

Figure 25:
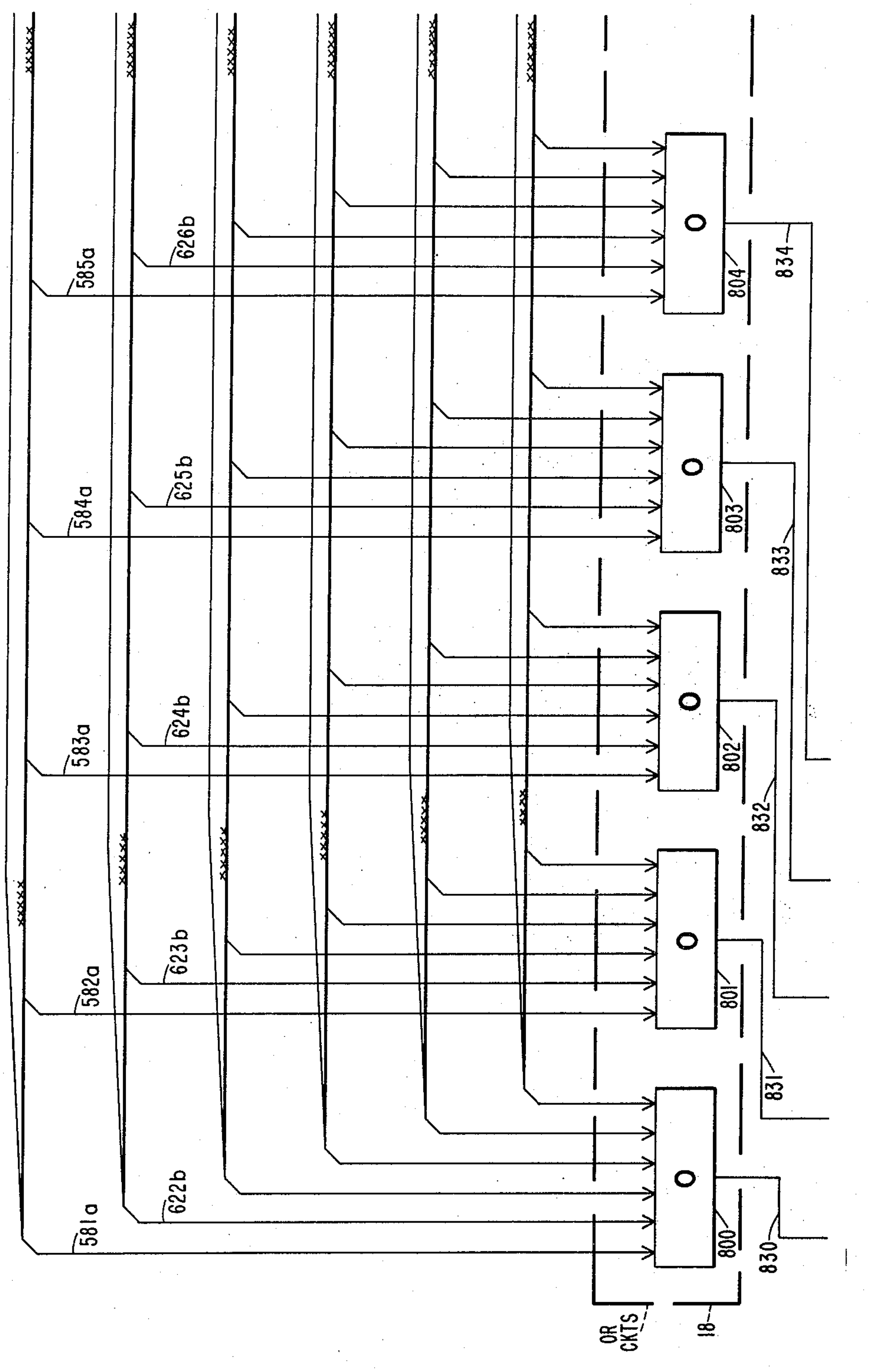
Figure 26:
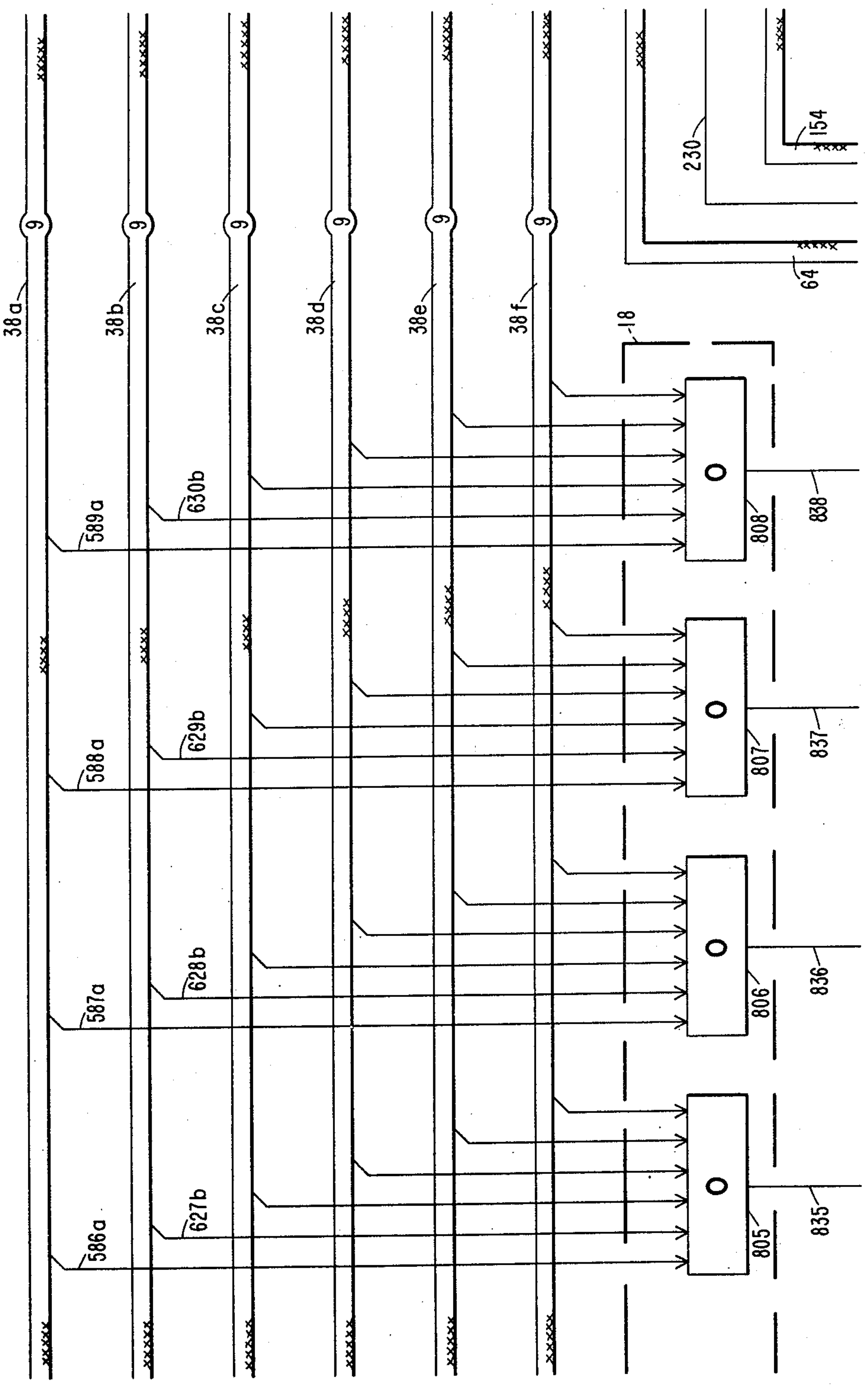

Output lines 581a through 589a are connected from the respective shift one gates 581 through 589 through the cable 38a to the respective OR circuits 800 through 808 in FIGS. 25 and 26. The gates 622 through 630 are connected through respective output lines 622b through 630b through the cable 38b to the OR circuits 800 through 808, respectively. The outputs from the shift three gates 663 through 671, the shift four gates 704 through 712, the shift five gates 745 through 753, and the shift zero gates 780 through 788 are connected through respective cables 38c, 38d, 38e and 38f to the OR circuits 800 through 808 in FIGS. 25 and 26 in a like manner.

Figure 14:
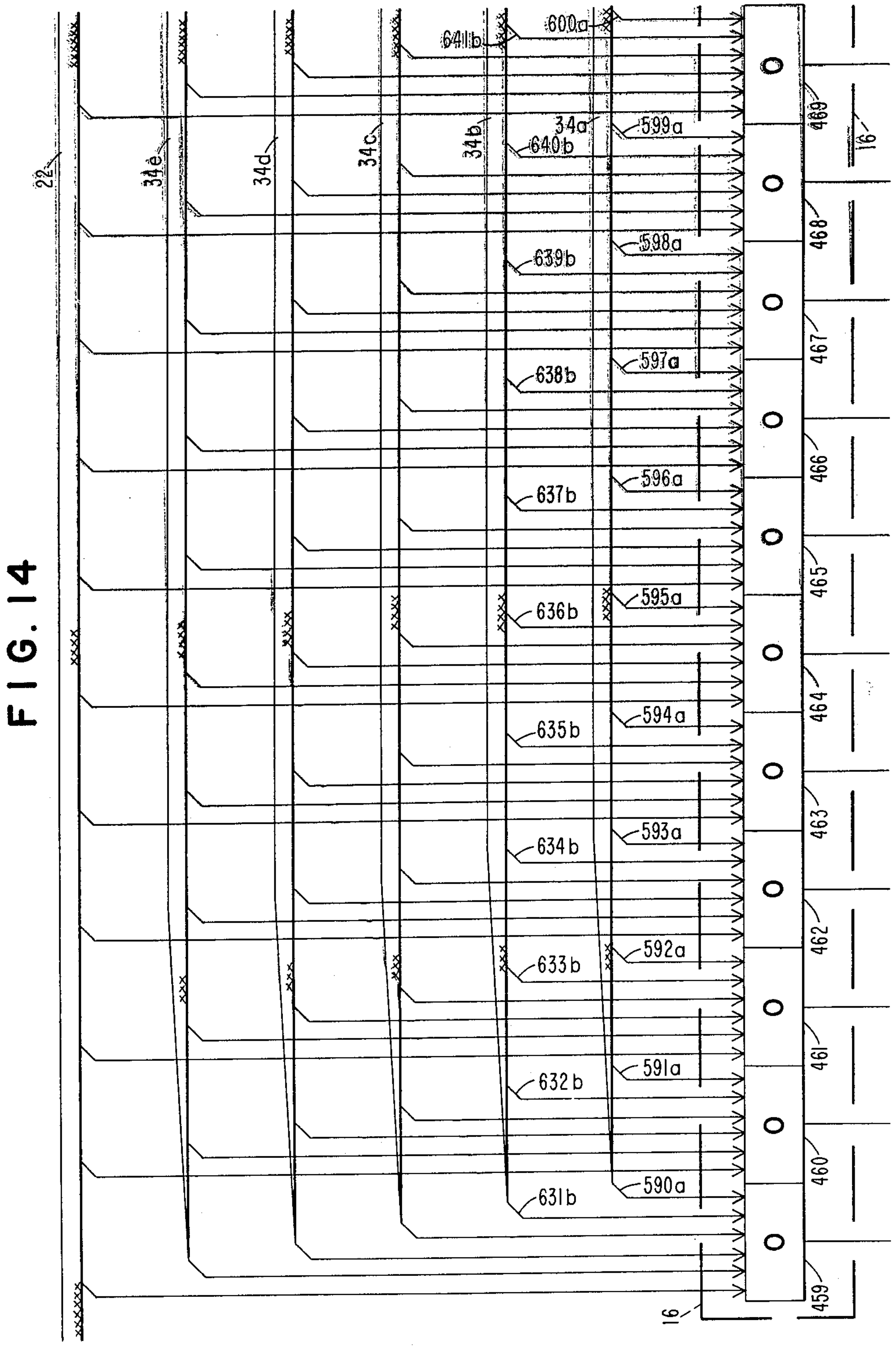
Figure 15:
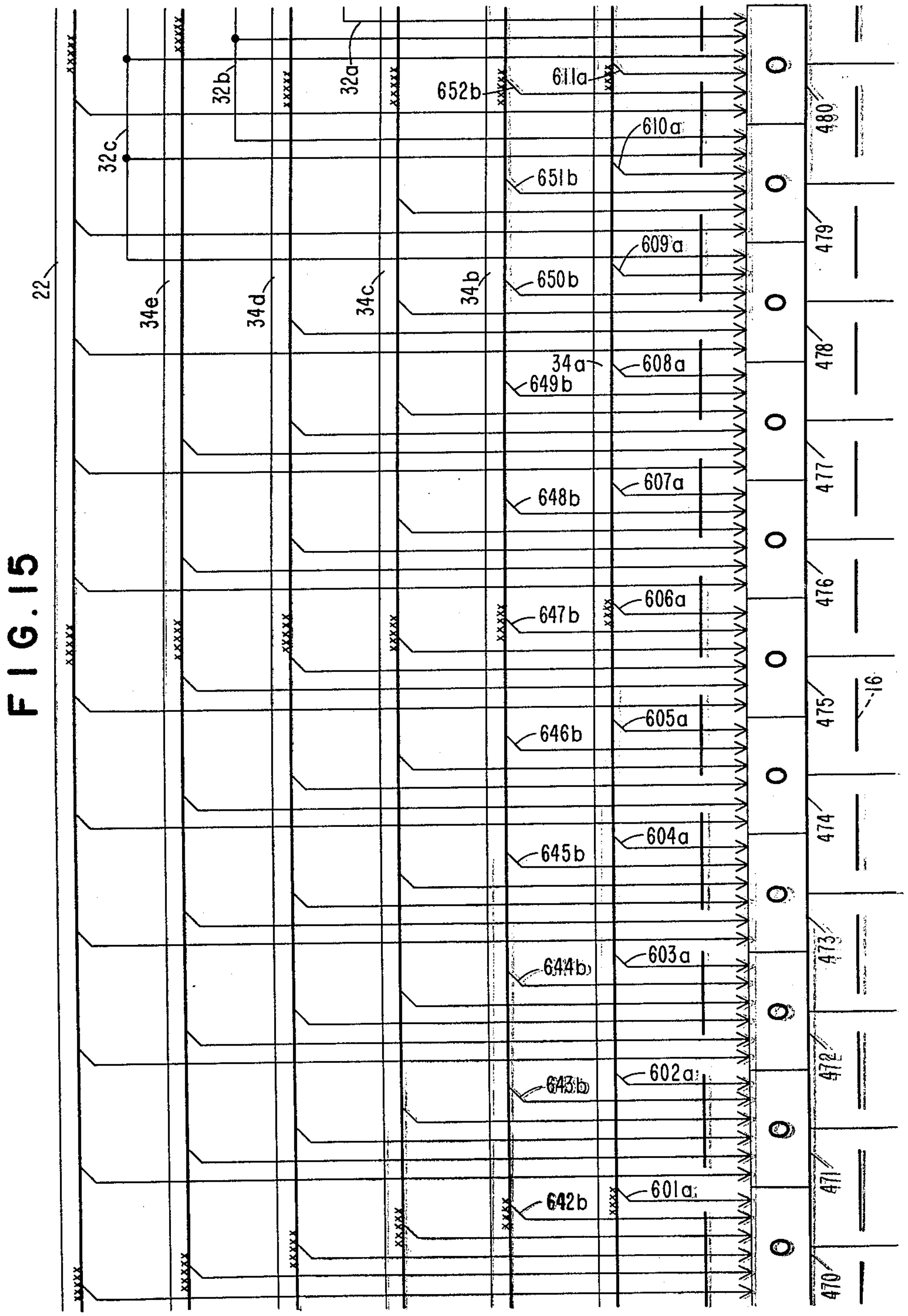
Figure 22:
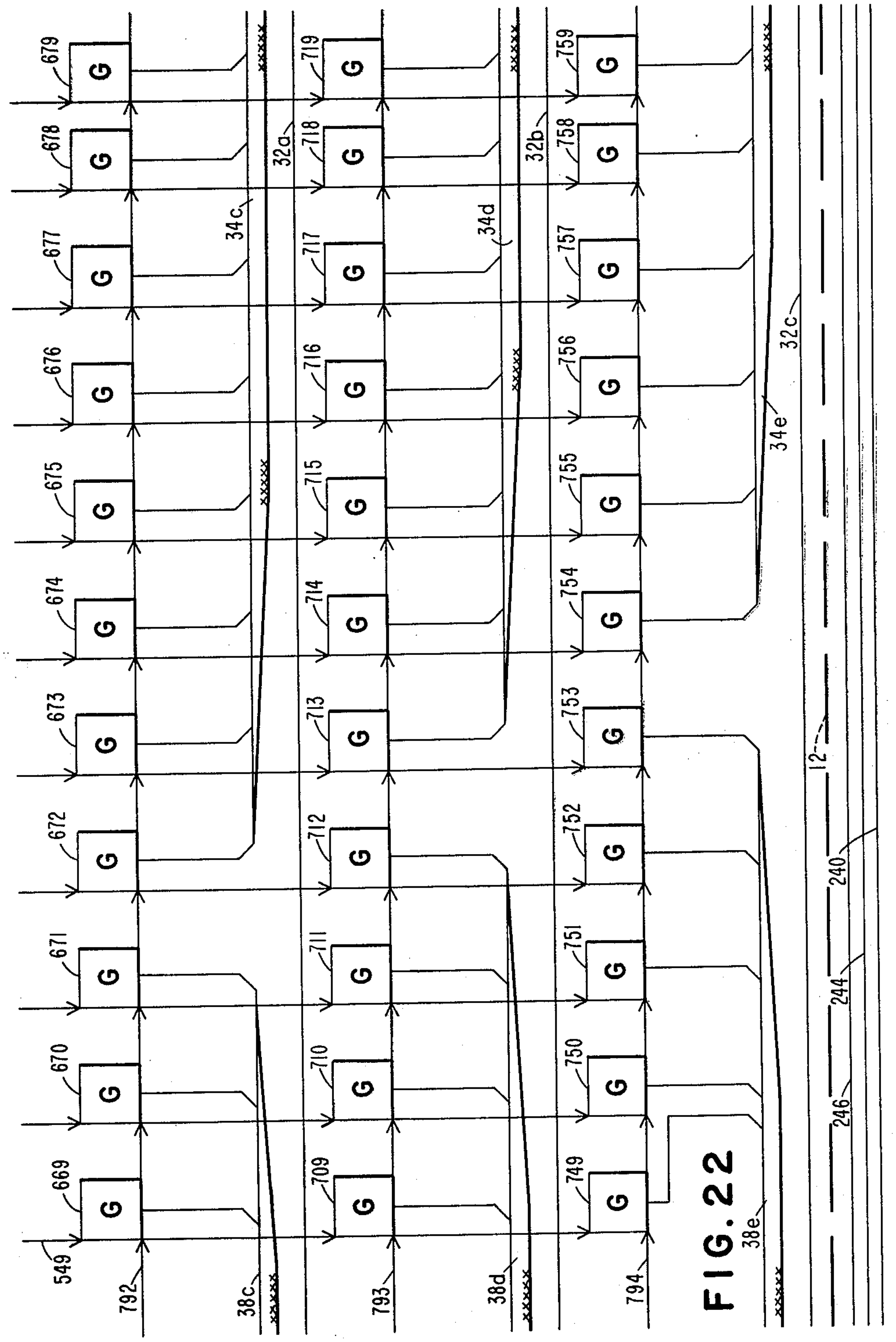
Figure 23:
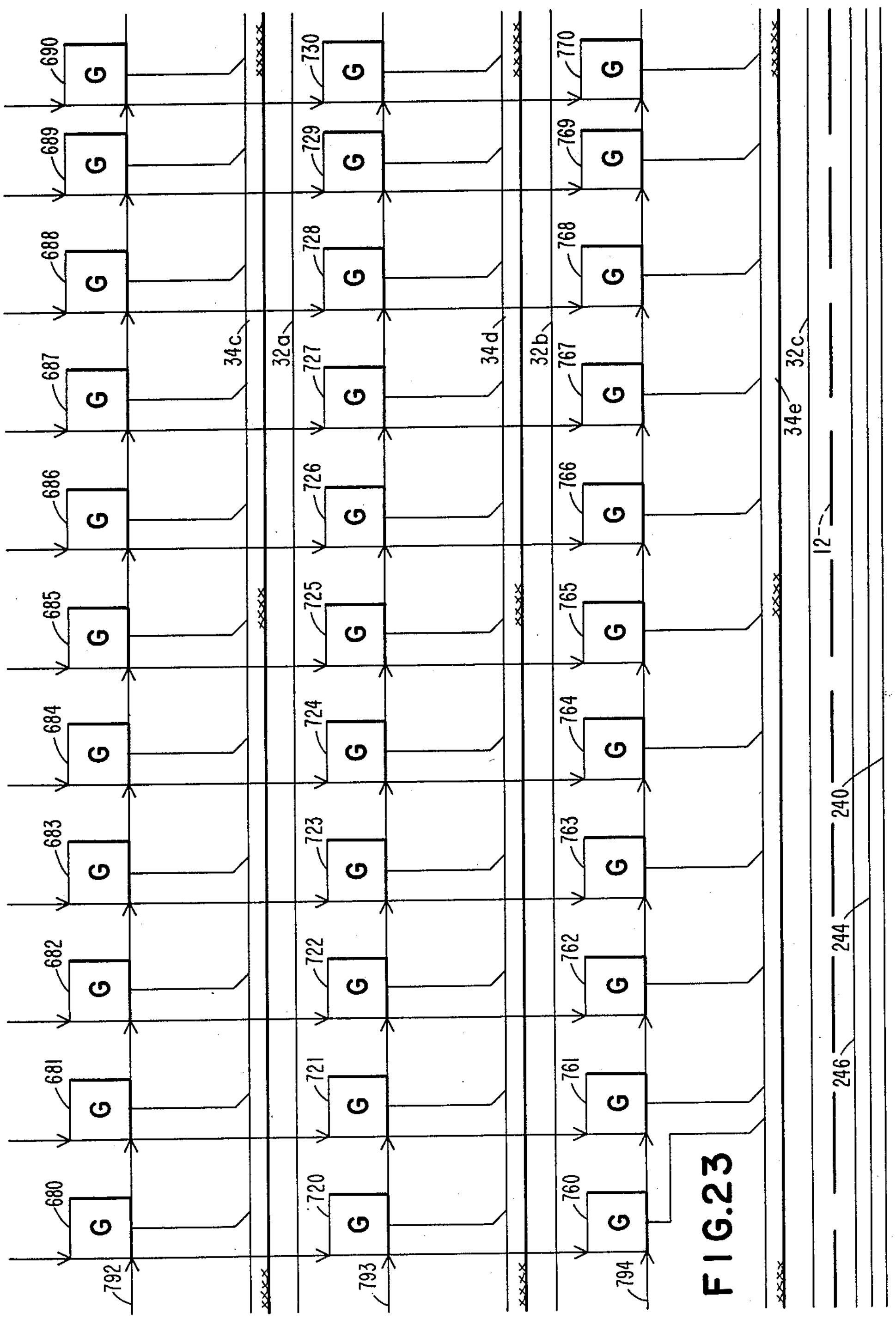
Figure 24:
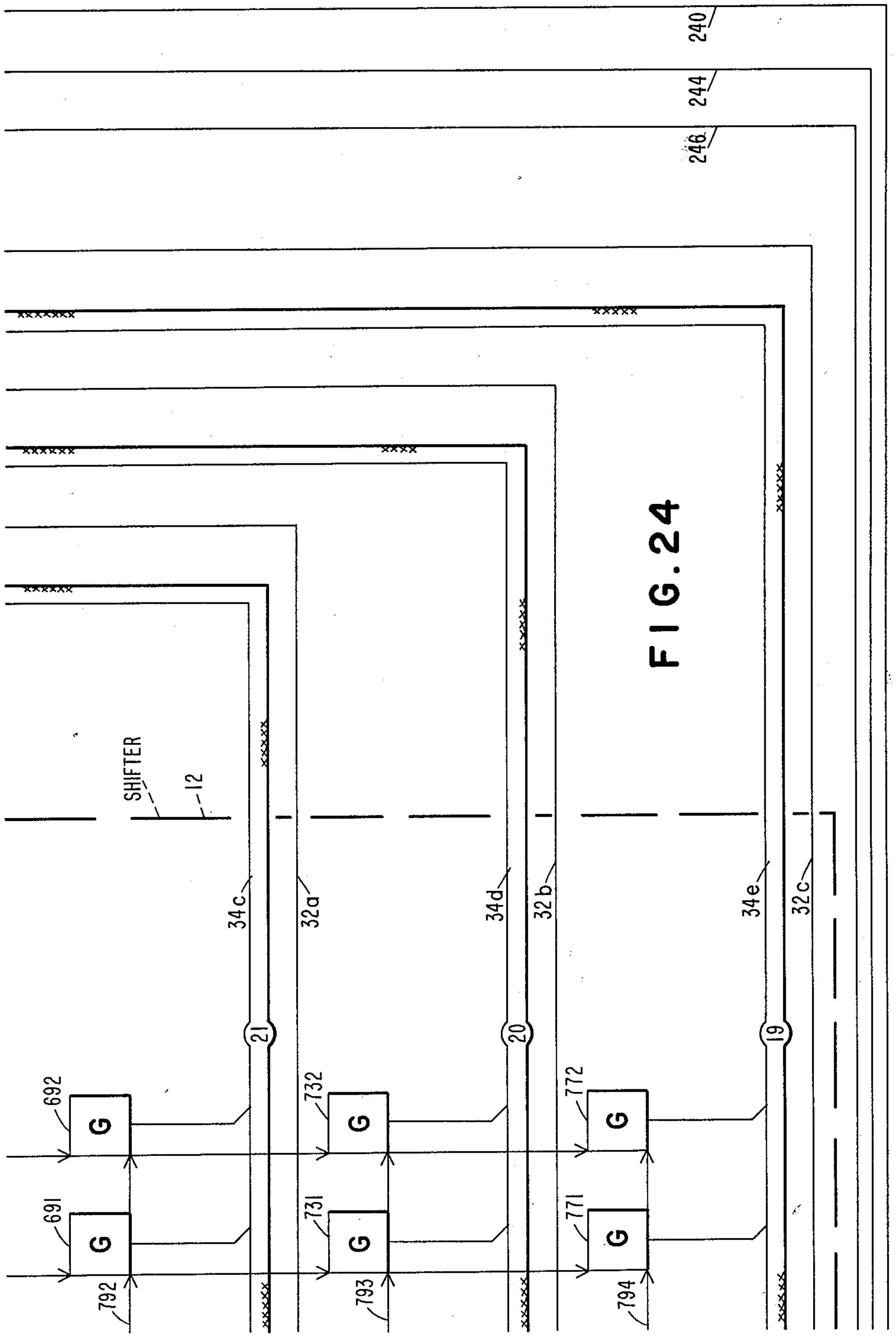

The outputs from the shift one gates 590 through 611 in FIGS. 18 through 20 are connected through respective lines 590a through 611a and the cable 34a to OR circuits 459 through 480 in FIGS. 14 and 15. The outputs from the shift two gates 631 through 652 are connected through respective lines 631b through 652b and through the cable 34b to the OR circuits 459 through 480, respectively. The outputs from the shift three gates 672 through 692 in FIGS. 22 through 24 are connected through the cable 34c to respective OR circuits 459 through 479 in FIGS. 14 and 15. The outputs from the shift four gates 713 through 732 are connected through the cable 34d to the respective OR circuits 459 through 478, and the outputs from the shift five gates 754 through 772 are connected through the cable 34e to the respective OR circuits 459 through 477.

A line 32a, which is within the cable 32 between the shifter 12 and the OR circuit 16 in FIG. 1, is connected from the second shift three gate 661 in FIG. 21 to the OR circuit 480 in FIG. 15. In a similar manner, a line 32b is connected from the second shift four gate 701 in FIG. 21 to the OR circuits 479 and 480. A line 32c is connected from the second shift five gate 741 to the OR circuits 478, 479 and 480 in FIG. 15.

Figure 13:
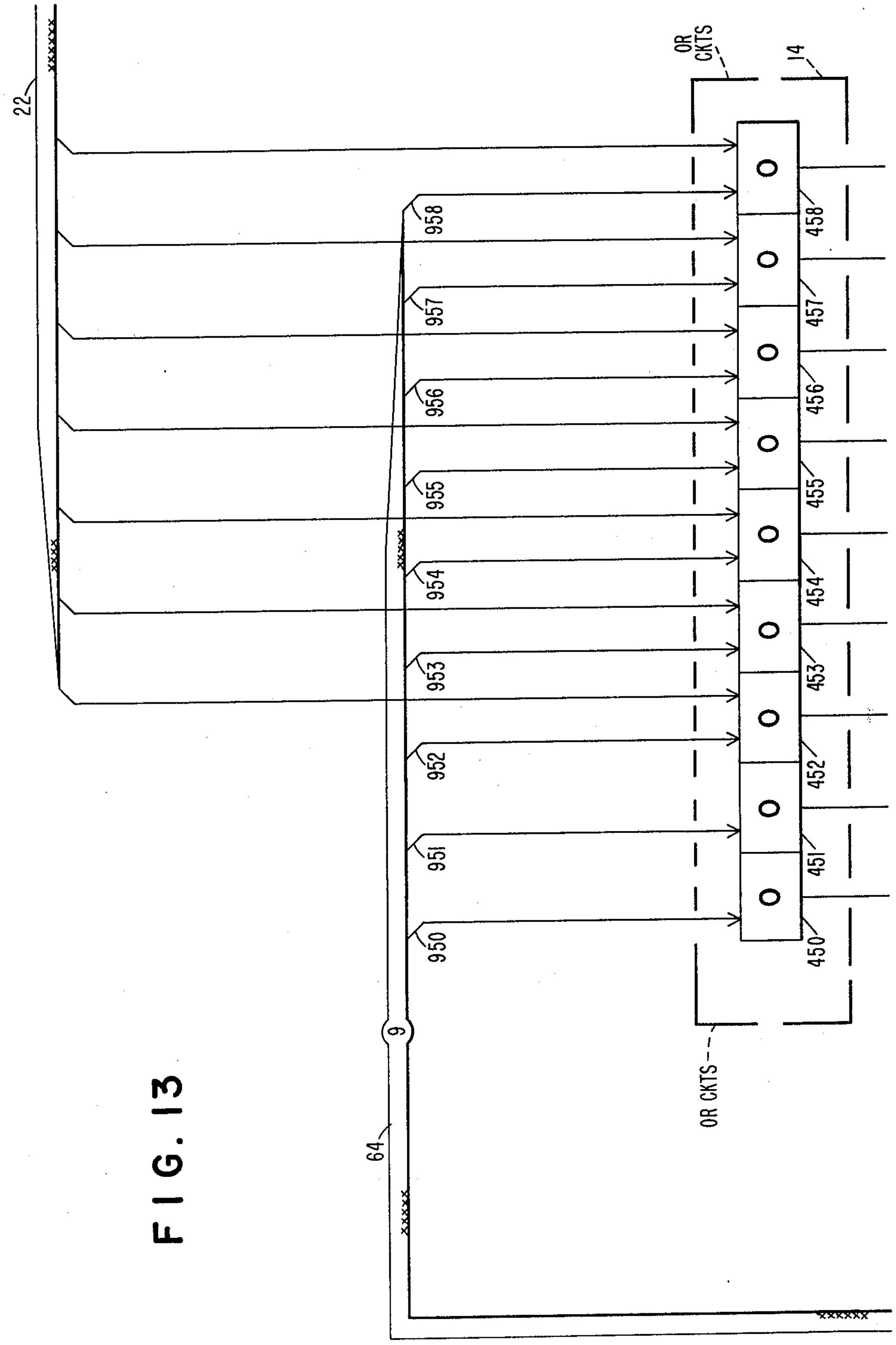
Figure 16:
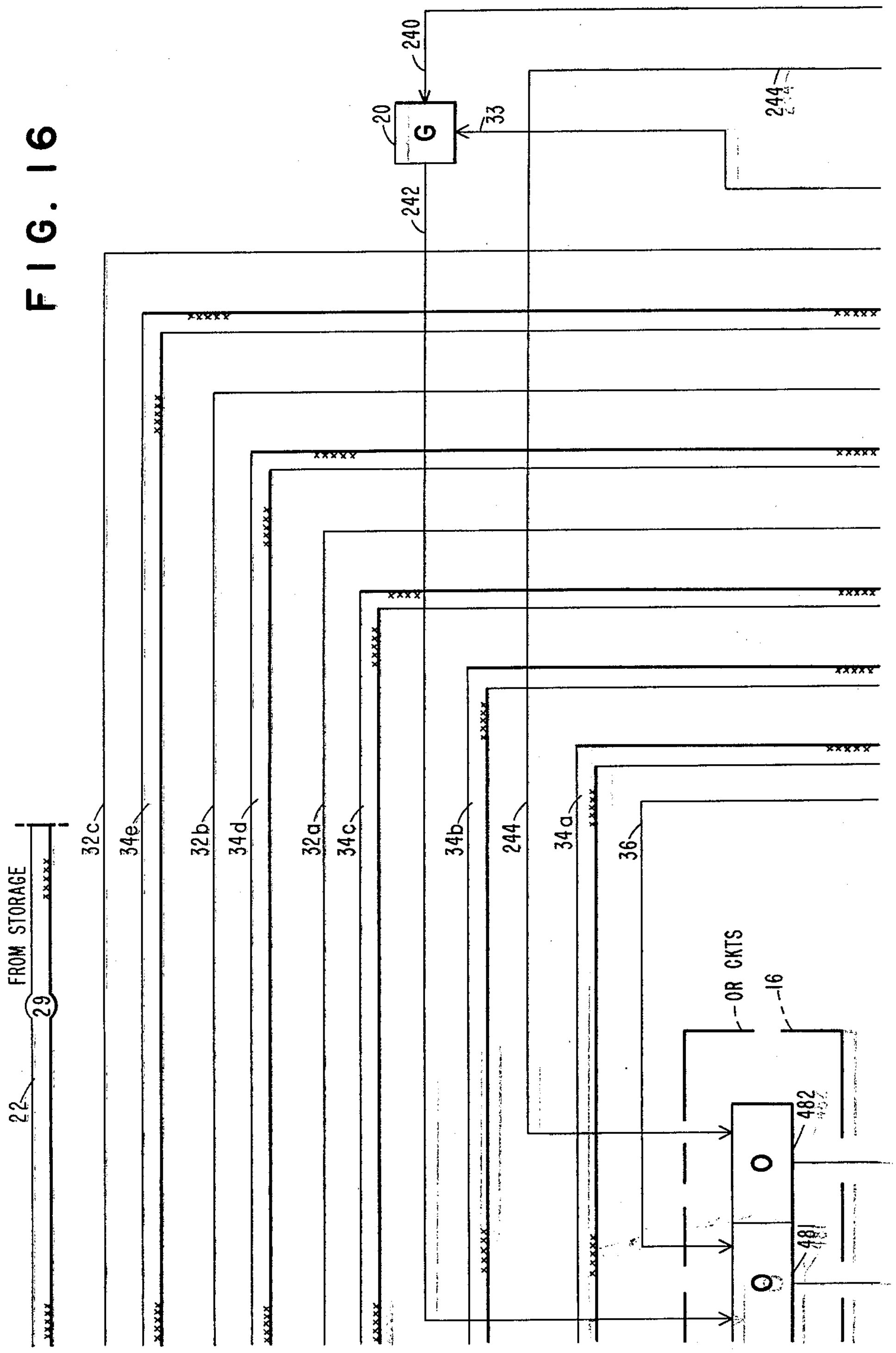

The OR circuits 16 in FIG. 1 includes the OR circuits 459 through 482 in FIGS. 14 through 16. The OR circuits 14 in FIG. 1 include OR circuits 450 through 458 shown in FIG. 13. A cable 22 (FIG. 16) includes twenty-nine lines each of which is connected to one of the OR circuits 452 through 480. The outputs from the OR circuits 450 through 458 in FIG. 13 are connected as inputs to the individual latch registers 500 to 508 in FIG. 17. The outputs from the OR circuits 459 through 482 in FIGS. 14 through 16 are connected as inputs to the individual latch registers 509 through 532 in FIGS. 18 through 20. The cable 64 (FIG. 13) includes nine lines each of which is connected to one of the OR circuits 450 through 458 in FIG. 13. The cable 22 supplies the initial dividend through the OR circuits 450 through 482 to the latch registers 500 through 532. The cable 64 returns a partial dividend from an adder to the latch registers 500 through 508 through the OR circuits 450 through 458.

The line 246 (FIG. 20), which supplies a signal when the one-half times divisor is used, is connected as an input to the latch register 533 in FIG. 20. The line 240 (FIGS. 16 and 20) is connected from the quotient generator to the gate 20 in FIG. 16. This line 240 supplies the generated X bit. The output of the gate 20 is connected through the line 242 to the OR circuit 841. The line 244, which supplies the generated Y bit, is connected to the OR circuit 842 in FIG. 16. The output of the latch register 533 in FIG. 20 is connected through the line 26 to an AND circuit 820. The output of the AND circuit 820 is connected through a line 821 to a gate 822 and an inverter 823. A line 824 is connected from the shift one gate 612 to the gate 822. The output of the gate 822 is connected through the line 36 to the OR circuit 841 in FIG. 16. The output from the inverter 823 is connected through the line 33 to the gate 20 in FIG. 16. The latch register 533, the AND circuit 820, the gate 822, the inverter 823 (FIG. 20) and the gate 20 (FIG. 16) function upon the occurrence of a shift request of one following the use of one-half times divisor to shift the previously generated Y quotient bit into the X quotient bit position (position 32, latch register 531), and to suppress the entry of a generated X quotient bit. The operation of these circuits will be described in greater detail subsequently.

Figure 28:
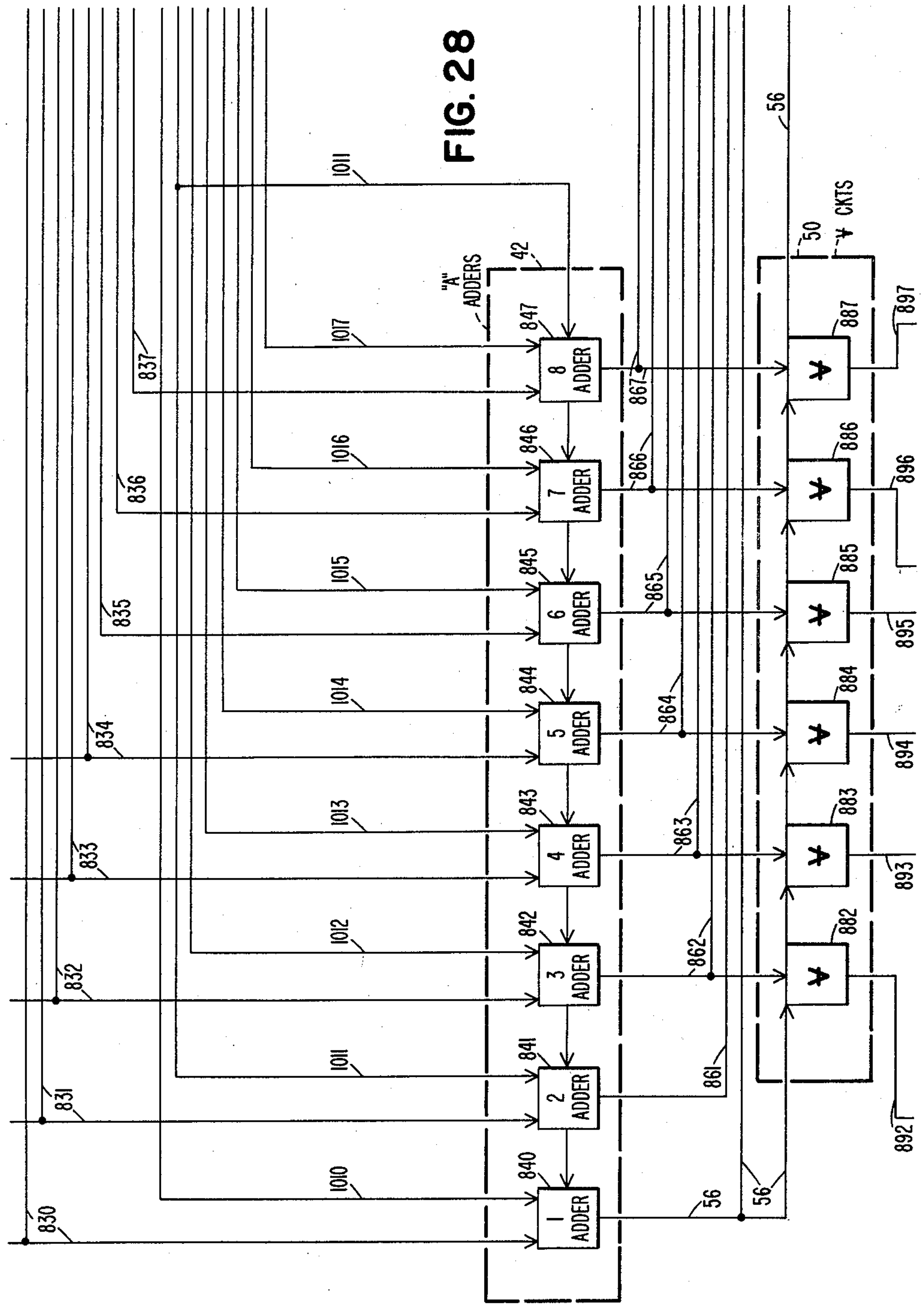
Figure 30:
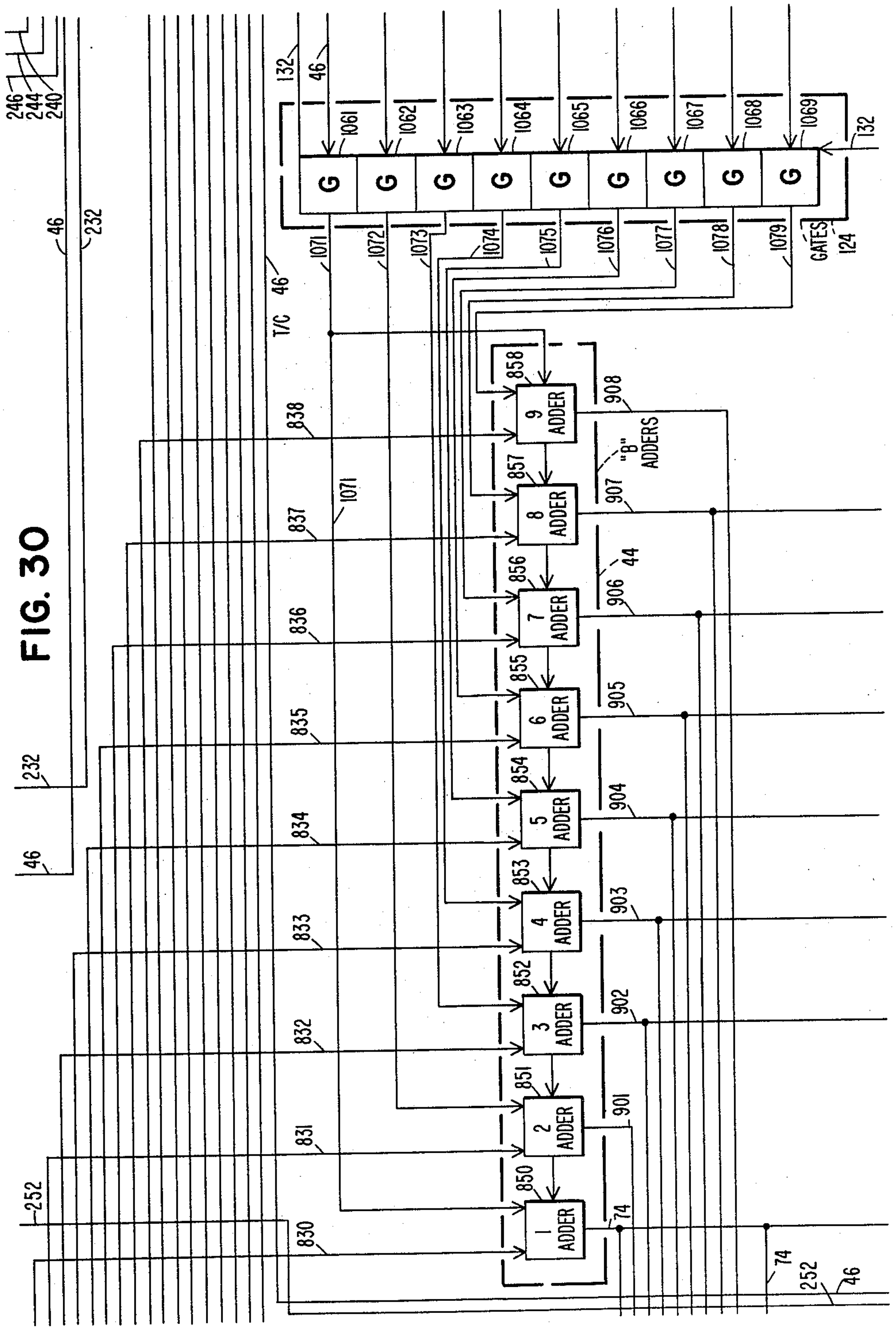

The outputs from the A adders 840 through 847 shown FIGS. 25 and 26 are connected through respective lines 830 through 838 (these lines are within the cable 40 in FIG. 1) to the adders 42 and 44 shown within dashed lines in FIGS. 28 and 30, respectively. The lines 830 through 337 are connected to the respective adders 840 through 847 in FIG. 28, and the lines 830 through 838 are connected to the respective adders 850 through 858 in FIG. 30.

Figure 29:
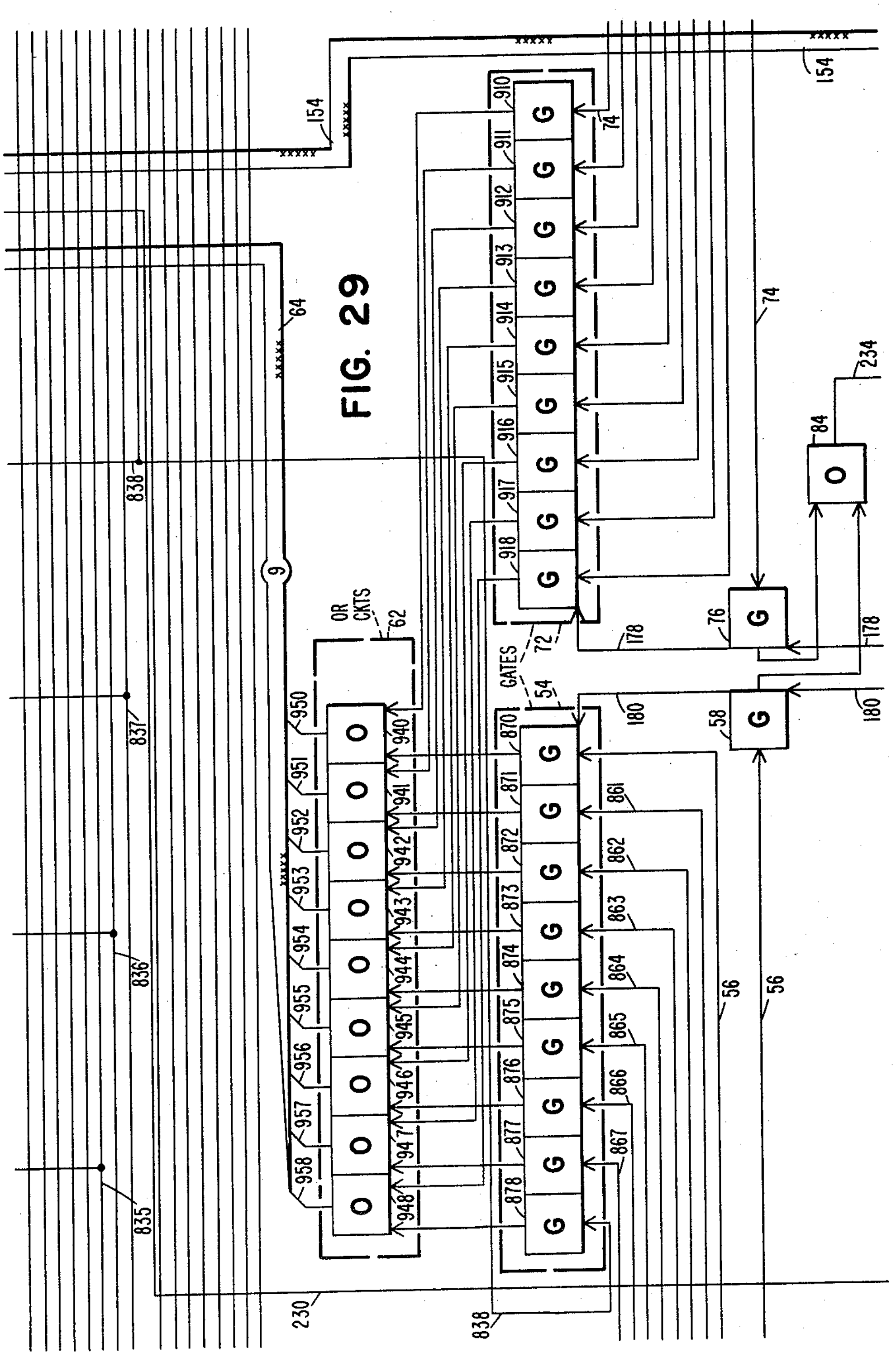

The inputs from the A adders 840 through 847 shown in FIG. 28 are connected through respective lines 56 and 861 through 867 to gates 870 through 877, respectively, in FIG. 29. The line 838 from the OR circuit 808 (FIG. 26) is applied directly to a gate 878. The line 56 from the adder 840 in FIG. 28 also is connected to exclusive OR circuits 882 through 887, and to the gate 58 in FIG. 29. Also, the lines 862 through 867 are connected to the exclusive OR circuits 882 through 887, respectively. Output lines 892 through 897 are connected from the respective exclusive OR circuits 882 through 887 to the shift decoder shown enclosed in dashed lines in FIGS. 32, 36 and 40.

The outputs from the B adders 850 through 858 in FIG. 30 are connected through respective lines 74 and 901 through 908 to gates 910 through 918 in FIG. 29. The line 74 from the output of the adder 850 is connected to exclusive OR circuits 922 through 927 in FIG. 34, and to the gate 76 in FIG. 29. Also, the lines 902 through 908 are connected to the respective exclusive OR circuits 922 through 927 in FIG. 34. The outputs from the exclusive OR circuits 922 through 927 are connected through respective lines 932 through 937 to the adder selector 172 in FIGS. 34 and 38.

The outputs from the gates 870 through 878 in FIG. 29 are connected to respective OR circuits 940 through 948. The outputs from the gates 910 through 918 also are connected to the OR circuits 940 through 948, respectively. The outputs from the OR circuits 940 through 948 are connected through respective line 950 through 958 to the cable 64. The lines 950 through 958 in FIG. 29 are connected through the cable 64 to the OR circuits 810 through 818, respectively, in FIG. 13. The line 180 connected to each of the gates 58 and 870 through 878 in FIG. 29 is connected from the adder selector 172 in FIGS. 34 and 38. Likewise, the line 178 connected to the gates 76 and 910 through 918 in FIG. 29 is connected from the adder selector 172.

Figure 31:
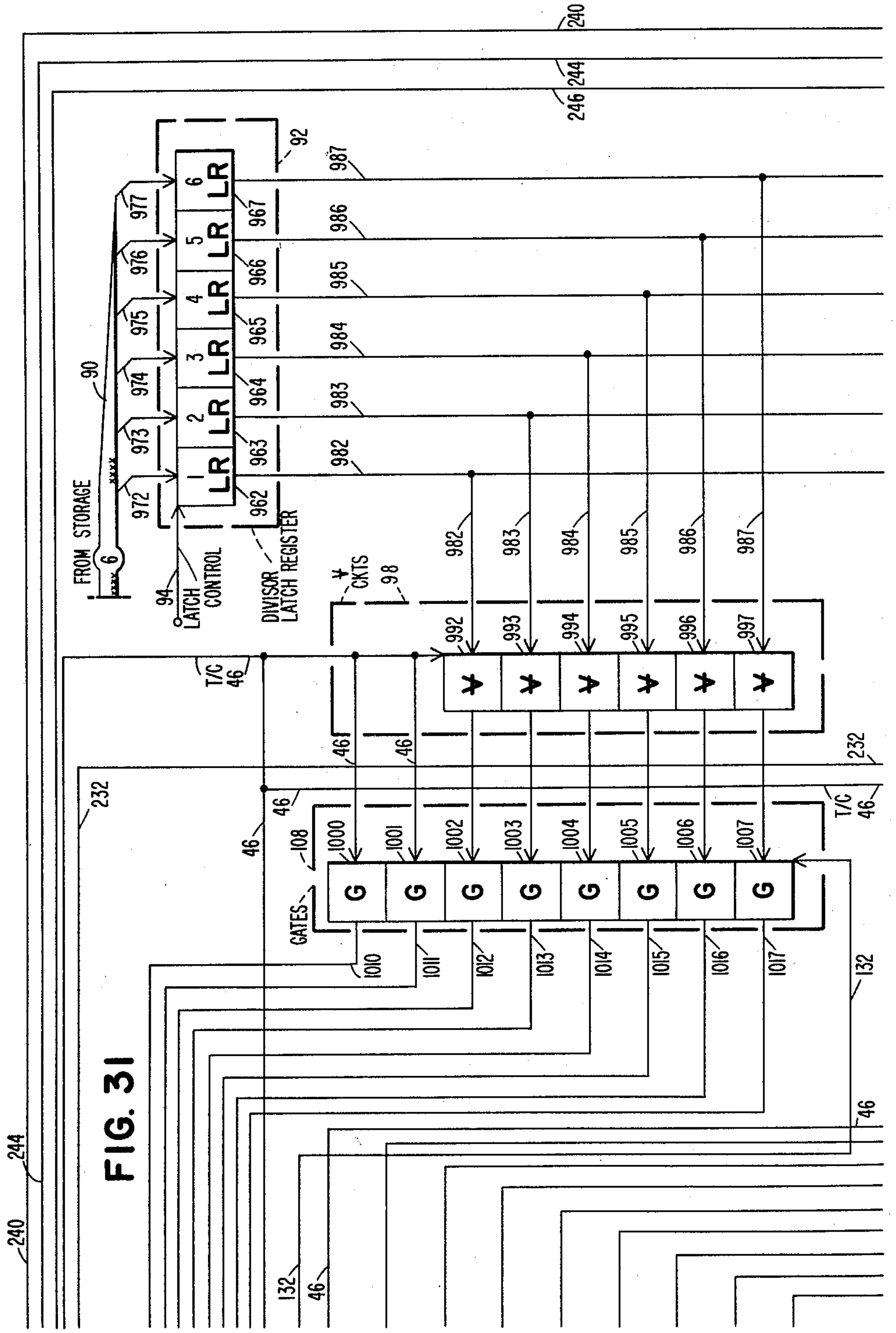

The divisor latch register 92, which is shown in block form in FIG. 2, is illustrated in detail in FIG. 31. The divisor latch register 92 in FIG. 31 includes individual latch registers 962 through 967. Input lines 972 through 977 are connected through the cable 90 from a storage device (not shown). A latch control line 94 is connected to each of the individual latch registers 962 through 967 in FIG. 31. The outputs of the individual divisor latch registers 962 through 967 are connected to respective lines 982 through 987. The lines 982 through 987 are connected to respective exclusive OR circuits 992 through 997 in FIG. 31. The true/complement line 46 is connected to gates 1000 and 1001 in FIG. 31. The outputs from the exclusive OR circuits 992 through 997 are connected to respective gates 1002 through 1007. The line 132 is connected to each of the gates 1000 through 1007 from the suppress divisor control circuit 130 in FIG. 34. The outputs from the gates 1000 through 1007 are connected through respective lines 1010 through 1017 to the A adders 840 through 847, respectively, in FIG. 28. These lines 1010 through 1017 supply the true or the complement value of the one times divisor to the A adders 42 in FIG. 28. The line 1011 is connected to the adder 847 in FIG. 28 to force a one into that adder when the complement of the one times divisor is to be added (to provide the two's complement).

Figure 35:
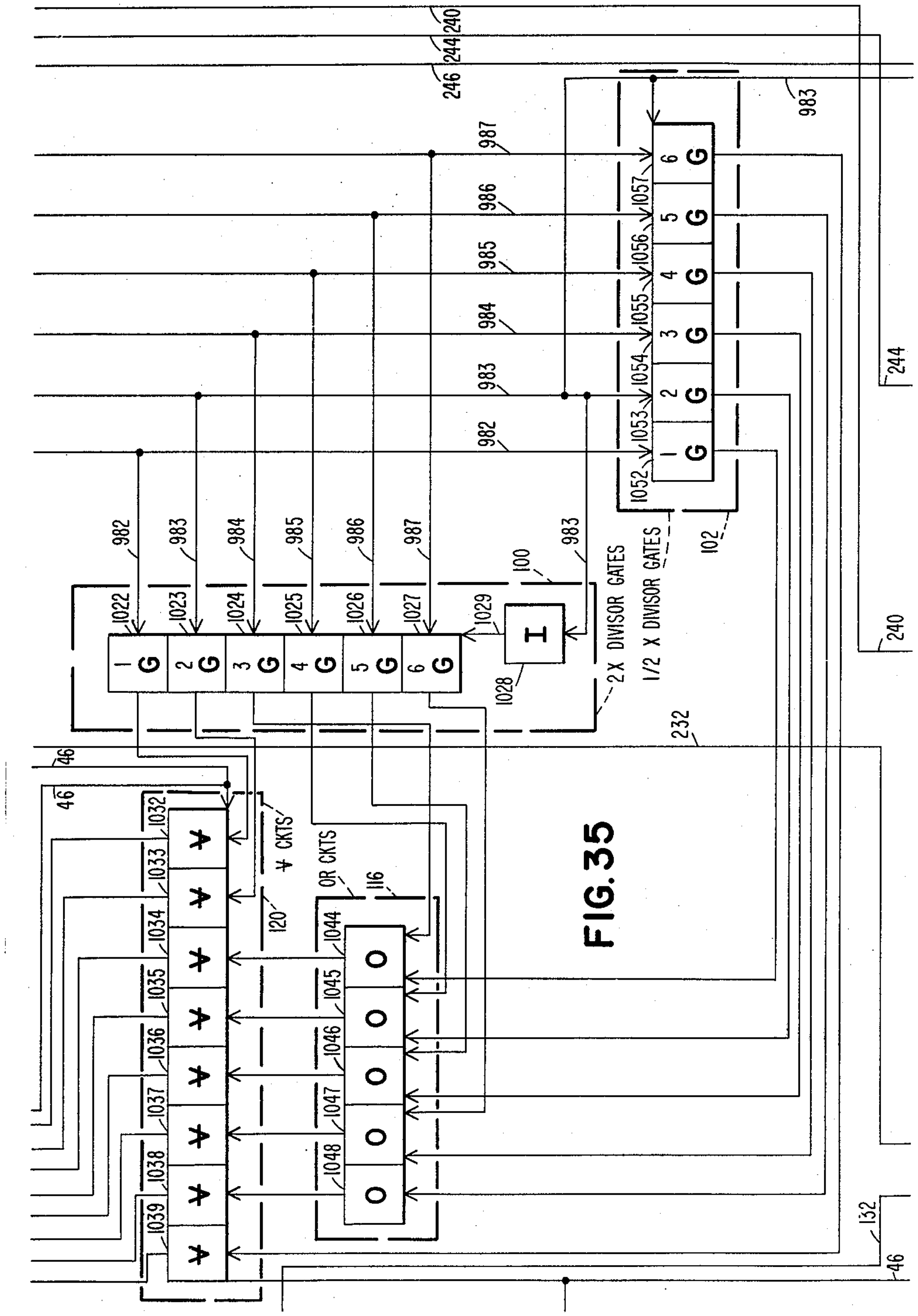

The lines 982 through 987 from the divisor latch register 92 in FIG. 31 are connected to respective two times divisor gates 1022 through 1027 in FIG. 35. The line 983 also is connected through an inverter 1028 and a line 1029 to each of the gates 1022 through 1027. The outputs from the gates 1022 and 1023 are connected to respective exclusive OR circuits 1032 and 1033. The outputs from the gates 1024 through 1027 are connected to respective OR circuits 1044 through 1047. The outputs from the OR circuits 1044 through 1047 are connected to respective exclusive OR circuits 1034 through 1037.

The lines 982 through 987 from the divisor latch register 92 in FIG. 31 are connected to respective one-half times divisor gates 1052 through 1057, and the line 983 is connected to each of these gates. The output from the one-half times divisor gate 1057 is connected directly to an exclusive OR circuit 1039. The outputs from the one-half times divisor gates 1052 through 1056 are connected to the OR circuits 1044 through 1048, respectively.

The true/complement line 46 is connected to a gate 1061 in FIG. 30. The outputs from the exclusive OR circuits 1032 through 1039 in FIG. 35 are connected to respective gates 1062 through 1069 in FIG. 30. The line 132 is connected to each of the gates 1061 through 1069 in FIG. 30 from the suppress divisor control 130 in FIG. 34. The outputs from the gates 1061 through 1069 are connected through respective lines 1071 through 1079 to the B adders 850 through 858, respectively. The line 1071 is connected to the adder 858 in FIG. 30 to force one into that adder when the complement of the one-half times or the complement of the two times divisor is to be added.

Figure 33:
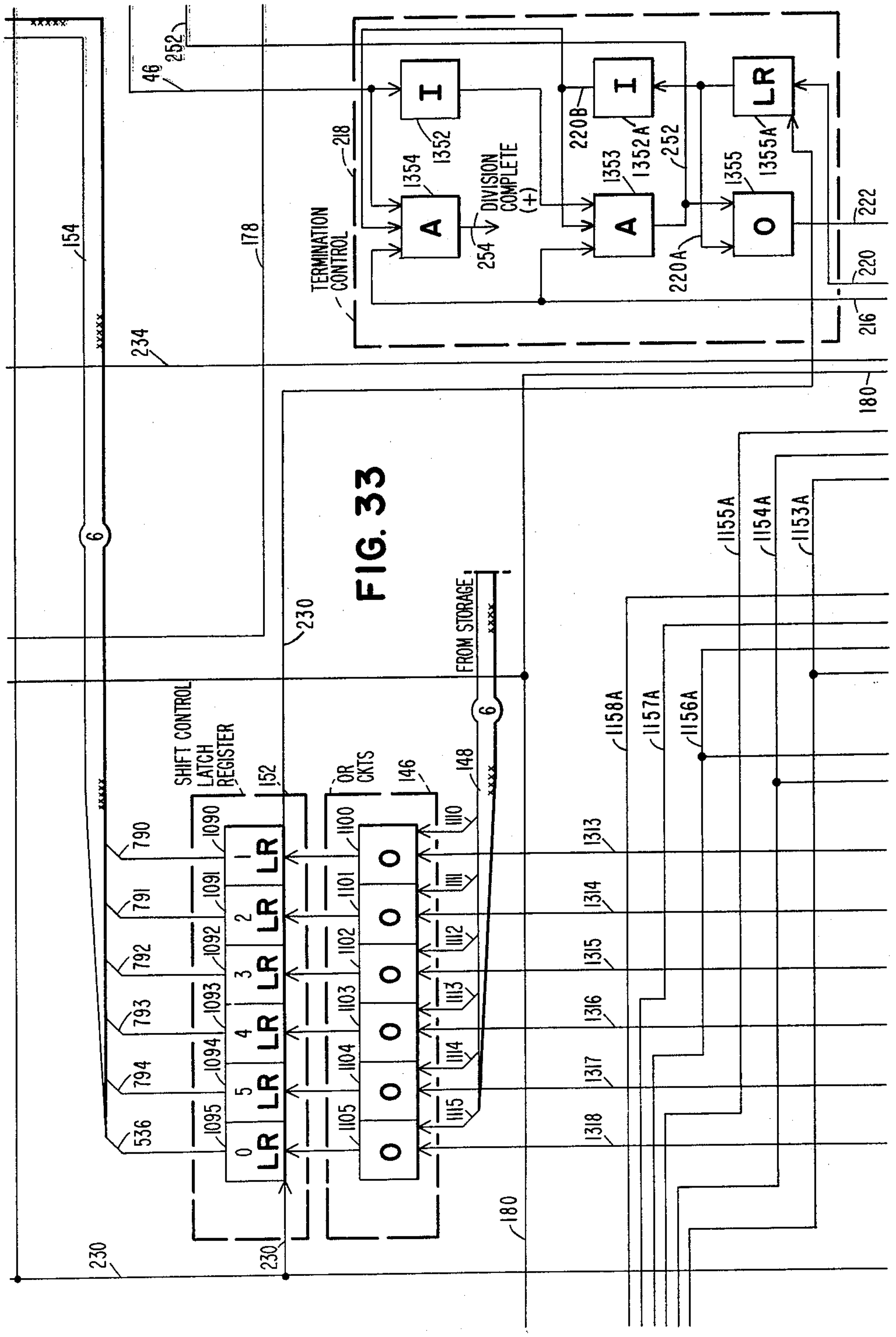

The shift control latch register 152 is shown within a dashed line box in FIG. 33. This register includes six individual latch registers 1090 through 1095. The outputs of six OR circuits 1100 through 1105 are connected as inputs to the individual latch registers 1090 through 1095. The latch control line 230 is connected to each of the latch registers 1090 through 1095. The cable 148 which is connected from storage device (not shown) is connected to the OR circuits 1100 through 1105 by lines 1110 through 1115. The outputs from the latch register 1090 through 1095 are connected through the respective lines 790 through 794 and 536 to the cable 154 in FIG. 33. These lines 790 through 794 and 536 are connected from the cable 154 to the respective shift one, two, three, four, five and zero gates in FIGS. 17 through 24 and 27.

Figure 32:
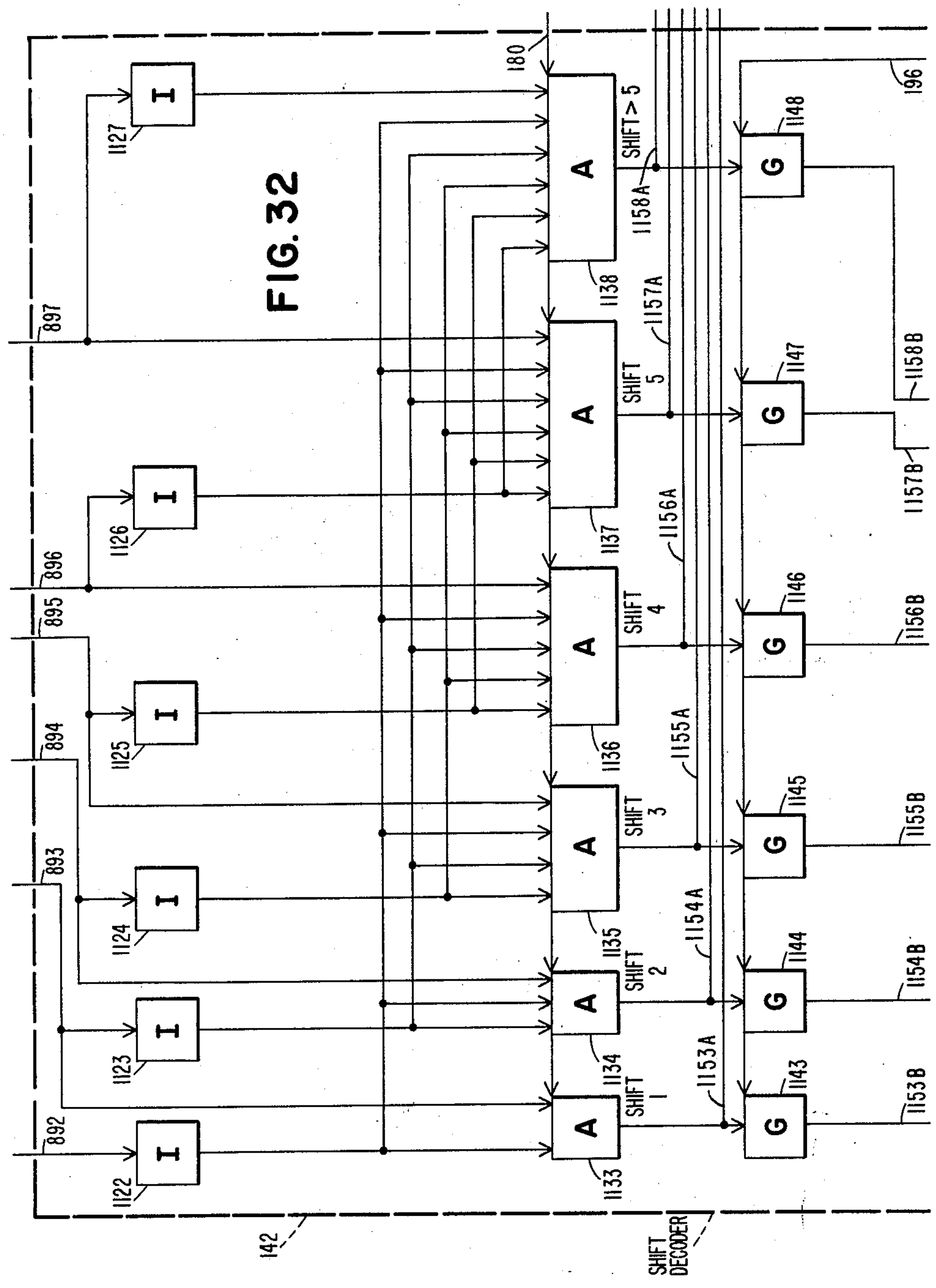
Figure 36:
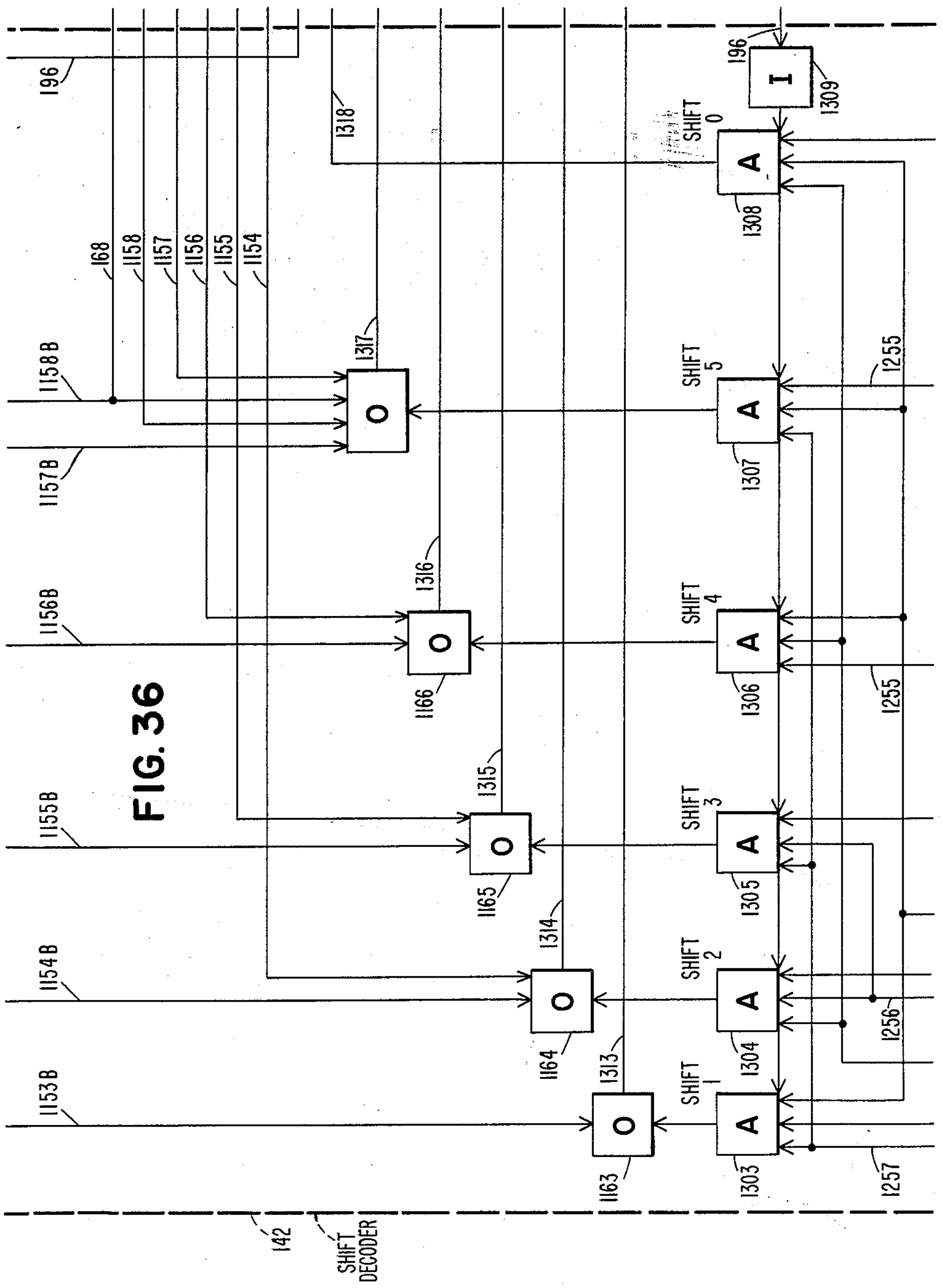
Figure 40:
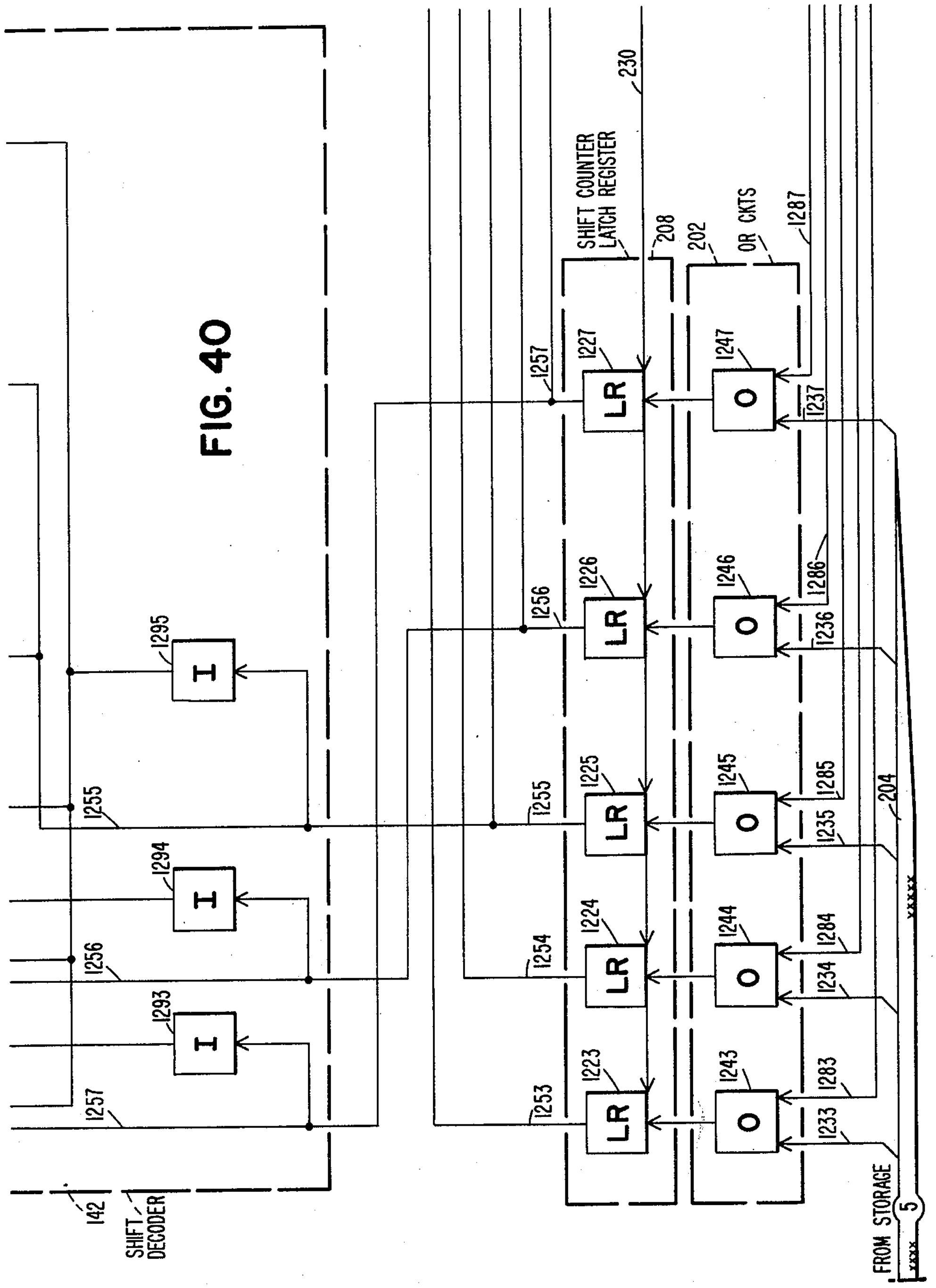

Referring to the shift decoder 142 which is shown in detail in FIGS. 32, 36 and 40, the lines 892 through 897 are connected to respective inverters 1122 through 1127. The lines 893 through 897 also are connected to respective AND circuits 1133 through 1137. The output from the inverter 1122 is connected to the AND circuits 1133 through 1137 and an AND circuit 1138. The output from the inverter 1123 is connected to the AND circuits 1134 through 1138. The output from the inverter 1124 is connected to the AND circuits 1135 through 1138, and the output of the inverter 1125 is connected to the AND circuits 1136 through 1138. The output of the inverter 1126 is connected to the AND circuits 1137 and 1138, and the output of the inverter 1127 is connected to the AND circuit 1138. The line 180 is connected to each of the AND circuits 1133 through 1138 from the adder selector 172 in FIGS. 34 and 38.

Figure 37:
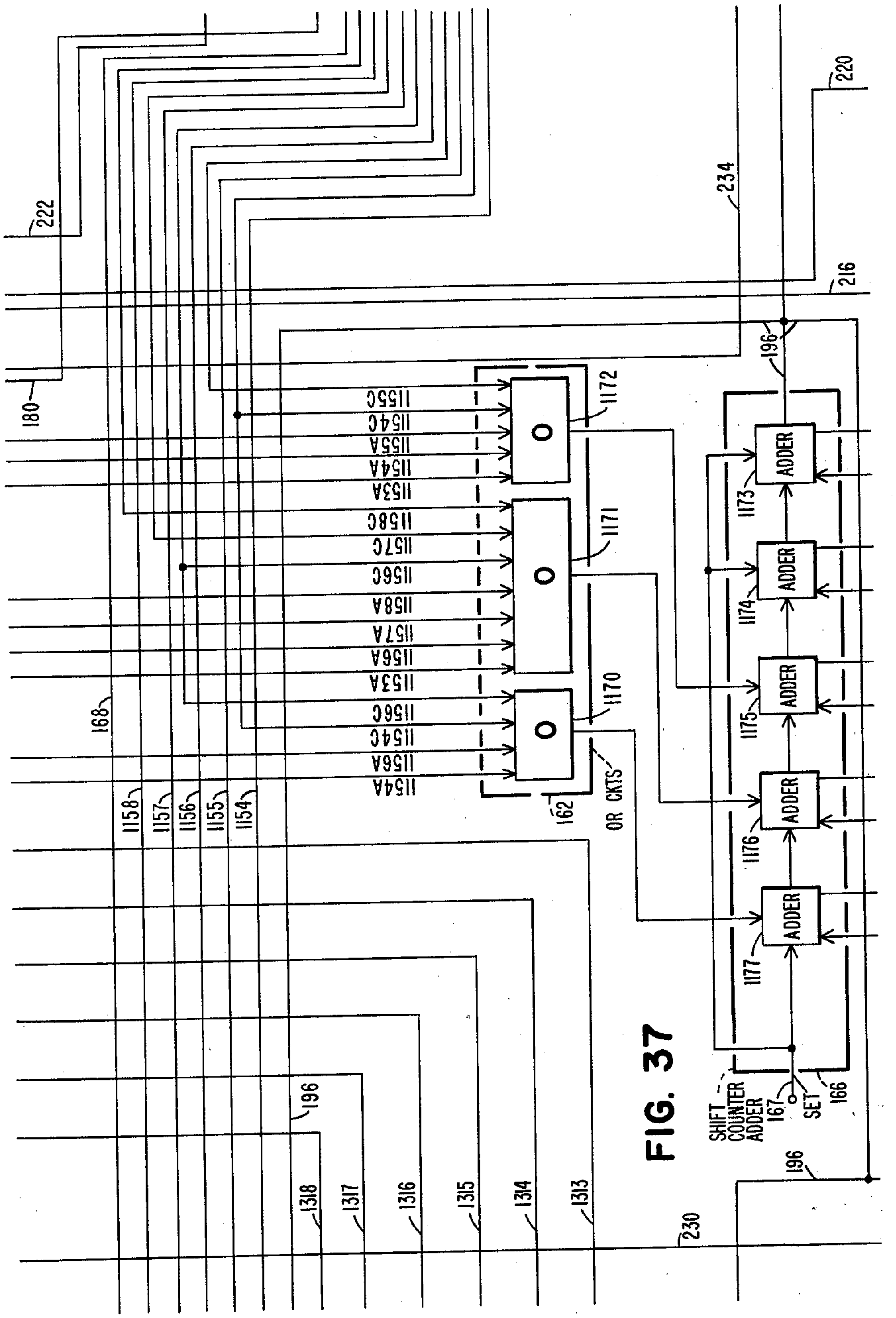

The outputs from the AND circuits 1133 through 1138 (which represent, when positive, shift one, two, three, four, five or greater than five) are applied to gates 1143 through 1148. The line 196, which is connected from the shift counter adder in FIG. 37, is connected to each of the gates 1143 through 1148. The outputs of the gates 1143 through 1137 are connected through respective lines 1153B through 1157B to OR circuits 1163 through 1167, respectively, in FIG. 36. The output of the gate 1148 in FIG. 32 is connected through a line 1158B to the OR circuit 1167 in FIG. 36.

The output from the AND circuits 1133 through 1138 in the shift decoder also are connected to OR circuits 1170 through 1172 in FIG. 37. The output from AND circuit 1133 in FIG. 32 is connected through the line 1153A to the OR circuits 1171 and 1172 in FIG. 37. The output from AND circuit 1134 is connected through the line 1154A to the OR circuits 1170 and 1172. The output from AND circuit 1135 is connected through the line 1155A to the OR circuit 1172. The output from AND circuit 1136 is connected through the line 1156A to the OR circuits 1170 and 1171. The output of AND circuit 1137 is connected through the line 1157A to the OR circuit 1171, and the output of AND circuit 1138 is connected through the line 1158A to the OR circuit 1171.

The outputs from the OR circuits 1170 through 1172 are connected to respective adders 1177, 1176 and 1175 of the shift counter adder 166 shown in FIG. 37. The shift counter adder 166 includes adders 1173 through 1177. A set line 167 is connected to the adders 1173, 1174 and 1177. This line 167 supplies the positive signal to the adders 1173, 1174 and 1177 to provide a one input thereto. Another set of inputs is applied to the shift counter adders 1173 through 1177 from the shift counter latch register 208 shown in detail in FIG. 40, and this input will be discussed subsequently.

Figure 34:
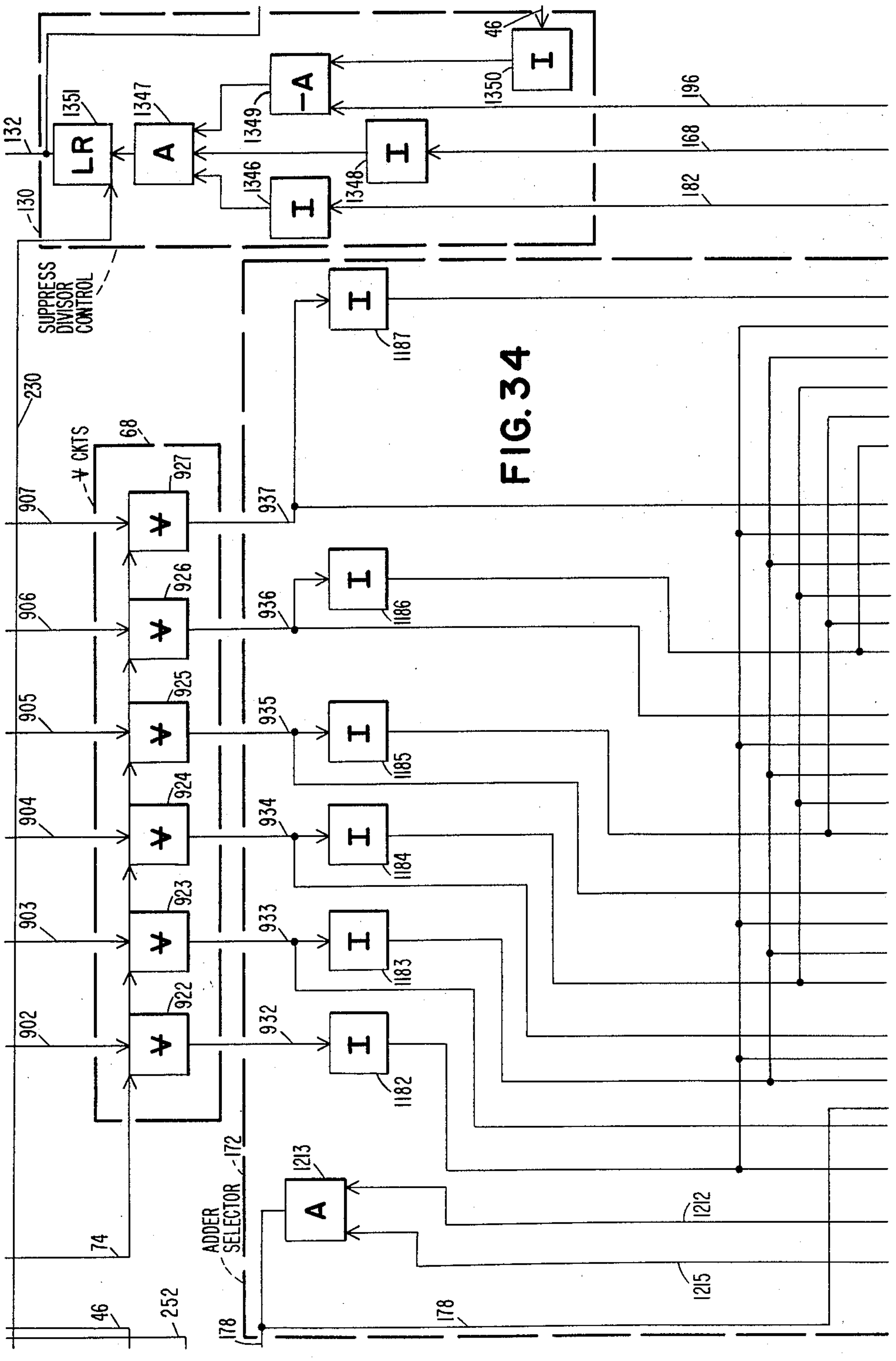
Figure 38:
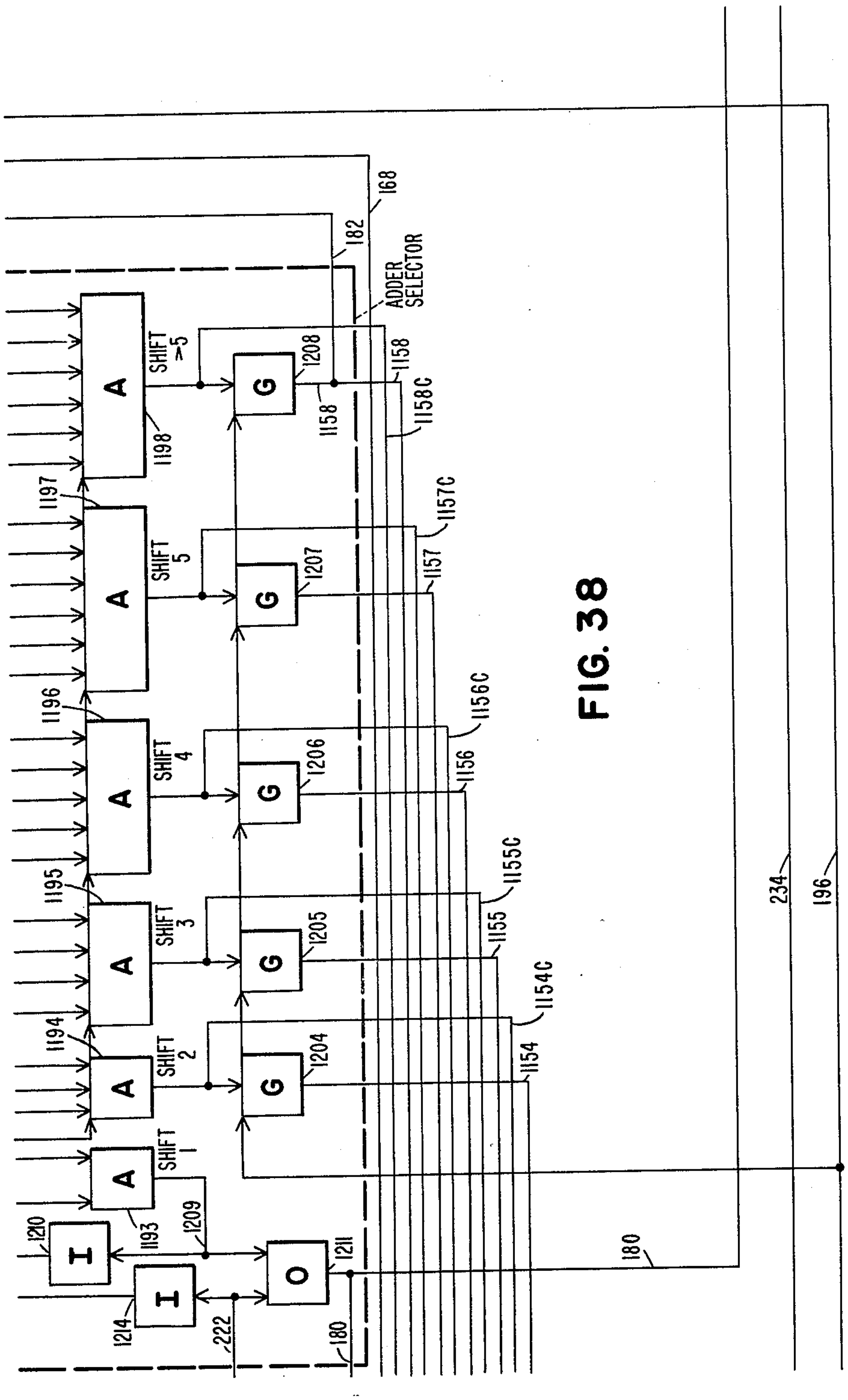

Turning now to the adder selector 132 shown in FIGS. 34 and 38, the lines 932 through 937 from the respective exclusive OR circuits 922 through 927 in FIG. 34 are connected to inverters 1182 through 1187, respectively. The lines 933 through 937 also are connected to respective AND circuits 1193 through 1197. The output from the inverter 1182 is connected to the AND circuits 1193 through 1197 and an AND circuit 1198. The output from the inverter 1183 is connected to the AND circuits 1194 through 1198. The output from the inverter 1184 is connected to the AND circuits 1195 through 1198, and the output from the inverter 1185 is connected to the AND circuits 1196 through 1198. The output from the inverter 1186 is connected to the AND circuits 1197 and 1198, and the output from the inverter 1187 is connected to the AND circuit 1198. The line 178 is connected to each of the AND circuits 1194 through 1197. The outputs from the AND circuits 1194 through 1198 in FIG. 38 are connected to respective gates 1204 through 1208 by lines 1154C through 1158C. The line 196, which is connected from the shift counter adder in FIGS 34 and 38, is connected to each of the gates 1204 through 1208. The outputs from the gates 1203 through 1208 are connected to the respective lines 1154 through 1158. The outputs from the AND circuits 1193 through 1198, when positive, indicate shifts of one, two, three, four, five or greater than five.

The AND circuit 1194 in the adder selector 172 in FIG. 38 is connected through the line 1154C to the OR circuits 1170 and 1172 in FIG. 37. The output of AND circuit 1195 is connected through a line 1155C to the OR circuit 1172, and the output of AND circuit 1196 is connected through the line 1156C to the OR circuits 1170 and 1171. The output of AND circuit 1196 is connected through the line 1157C to the OR circuit 1171, and the output of AND circuit 1198 is connected through the line 1158C to this same OR circuit.

The output from the AND circuit 1193 in the adder selector 172 in FIG. 38 is connected through a line 1209 to an inverter 1210 and an OR circuit 1211. The output from the inverter 1210 is connected through a line 1212 to an AND circuit 1213. The output from the OR circuit 1211 is connected to the line 180 which supplies the signal to select the A adders. The output from the AND circuit 1213 is connected to the line 178 which supplies the signal to select the B adders. An inverter 1214 is connected from the input line 222 through a line 1215 to the AND circuit 1213. The line 222 supplies the signal from the termination control circuit 218 in FIG. 33 to select the A adders and deselect the B adders as explained in the description of FIGS. 1 through 3.

Referring now to FIG. 40, the shift counter latch register 208 includes five individual latch registers 1223 through 1227. The latch control line 230 is connected to each of the latch registers 1223 through 1227. The cable 204 is connected from a storage device (not shown) through lines 1233 through 1237 to respective OR circuits 1243 through 1247. The outputs from the OR circuits 1243 through 1247 are connected to the respective latch registers 1223 through 1227. The outputs from the latch registers 1223 through 1227 are connected through respective lines 1253 through 1257 to the adders 1173 through 1177 in the shift counter adder 166 shown in FIG. 37. The shift counter adder 166 functions to subtract the number (the shift requested) applied thereto from the OR circuits 1170 through 1172 from the number (shift available supplied from the latch registers 1223 through 1227 in the shift counter latch register 208 in FIG. 40. The outputs from the adders 1173 through 1177 in the shift counter adder 166 in FIG. 37 are connected through respective lines 1263 through 1267 to gates 1273 through 1277, respectively, in FIG. 41. The carry line 196 from the high order adder 1173 in FIG. 37 is connected to an AND circuit 1278. The inhibit line 198 is connected to the AND circuit 1278 and the output from the AND circuit 1278 is connected to each of the gates 1273 through 1277. The outputs from the gates 1273 through 1277 are connected through respective lines 1283 through 1287 to the OR circuits 1243 through 1247 in FIG. 40.

Referring again to the shift decoder in FIGS. 32, 36 and 40, the lines 1257, 1256 and 1255 from the latch registers 1227, 1226 and 1225 in the shaft counter latch register 208 in FIG. 40 are connected to respective inverters 1293 through 1295. The line 1257 is connected to AND circuits 1303, 1305 and 1307 in FIG. 36. The line 1256 is connected to AND circuits 1304 and 1305. The line 1255 is connected to AND circuits 1306 and 1307. The output of the inverter 1293 in FIG. 40 is connected to AND circuits 1304, 1306 and 1308 in FIG. 36. The output of the inverter 1294 is connected to the AND circuits 1303, 1306, 1307 and 1308. The output from the inverter 1295 is connected to the AND circuits 1303, 1304, 1305 and 1308. The line 196 from the high order adder 1173 in the shift counter adder 166 in FIG. 37 is connected through an inverter 1309 (FIG. 36) to each of the AND circuits 1303 through 1308 in FIG. 36. The outputs from the AND circuits 1303 through 1307 are connected to the OR circuits 1163 through 1167, respectively. The outputs from the OR circuits 1163 through 1167 in FIG. 36 are connected through respective lines 1313 through 1317 to the OR circuits 1100 through 1104 in FIG. 33. The output from the AND circuit 1308 in FIG. 36 is connected through a line 1318 directly to the OR circuit 1105 in FIG. 33. The outputs from the AND circuits 1303 through 1308 in FIG. 36 indicate respective shifts of one, two, three, four, five and zero when one of these outputs is positive.

Figure 39:
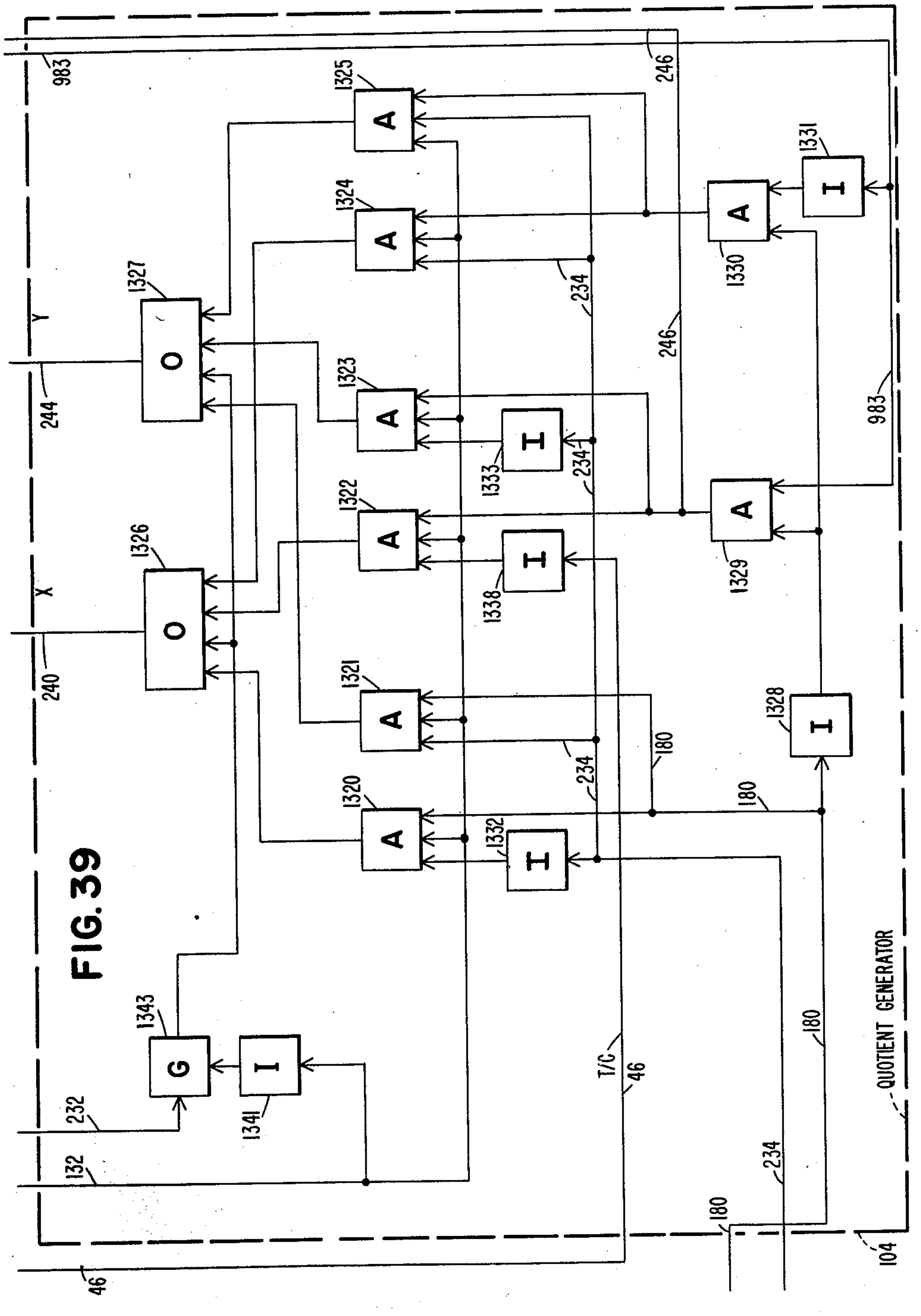

The quotient generator, which is illustrated as box 104 in FIG. 3, is shown in detail in FIG. 39. This generator includes a plurality of logic circuits which function to sense certain conditions of operation within the divider to generate the quotient bits X and Y. This generator includes AND circuits 1320 though 1325. The AND circuits 1320 and 1321 are connected to respective OR circuits 1326 and 1327. The OR circuits 1326 and 1327 are connected to the lines 240 and 244, respectively. The AND circuits 1322 and 1323 are connected to the respective OR circuits 1326 and 1327. The AND circuits 1324 and 1325 are connected to the OR circuits 1326 and 1327, respectively.

The input line 180, which supplies a positive signal when the A adders are used (when the one times divisor is used), is connected to the AND circuits 1320 and 1321. This line 180 is also connected through an inverter 1328 to AND circuits 1329 atnd 1330. The input line 983, which is connected from the individual latch register 963 in the divisor latch register 92 in FIG. 31, is connected to the AND circuit 1329 and throught an inverter 1331 to the AND circuit 1330. The output of the AND circuit 1329 is connected to the AND circuits 1322 and 1323 in FIG. 39. The output of this AND circuit 1329 also is connected to the output line 246 which is connected to the individual latch register 533 in the dividend-quotient latch register 10 in FIG. 20. This line supplies a positive signal when the one-half times divisor is used. The output from the AND circuit 1330 is connected to the AND circuits 1324 and 1325.

The input line 234, which is connected from the OR circuit 84 in FIG. 29, is connected to the AND circuits 1321, 1324 and 1325, and inverters 1332 and 1333. The output from the inverter 1332 is connected to the AND circuit 1320, and the output from the inverter 1333 is connected to the AND circuit 1323. The true/complement line 46 is connected through an inverter 1338 to the AND circuit 1322.

The input line 132, which is connected from the suppress divisor control circuit 130 in FIG. 34, is connected through an inverter 1341 to a gate 1343. The input line 132 is connected to each of the AND circuits 1320 through 1325. The input line 232, which is connected from the second position latch register 501 (FIG. 17) of the dividend-quotient latch register 10, is connected to the gate 1343. The output of a gate 1343 is connected to the OR circuits 1326 and 1327. The logic circuits 1341 and 1343 of FIG. 39 function, upon the occurrence of certain conditions, to cause the quotient generator to generate X and Y quotient bits in agreement with the bits being shifted across.

The suppress divisor control circuit 130 shown within dotted lines in FIG. 34 operates, upon the occurrence of certain conditions, to decondition the gates 124 and 108 shown within dotted lines in respective FIGS. 30 and 31. The input line 182 (FIG. 34) is connected through an inverter 1346 to an AND circuit 1347 in the suppress divisor control 130. The input line 168 is connected through an inverter 1348 to the AND circuit 1347. The input line 196 is connected to a negative AND circuit 1349. The true/complement line 46 is connected through an inverter 1350 to the negative AND circuit 1349. The output from the negative AND circuit 1349 is connected to the AND circuit 1347. The output from the AND circuit 1347 is connected to a latch register 1351. The latch register 1351 is connected through the line 132 to the gates 1061 through 1069 in FIG. 30 and to the gates 1000 and 1007 in FIG. 31. The line 132 also is connected to the inverter 1341 and to the AND circuit 1320 through 1325 in FIG. 39.

Figure 41:
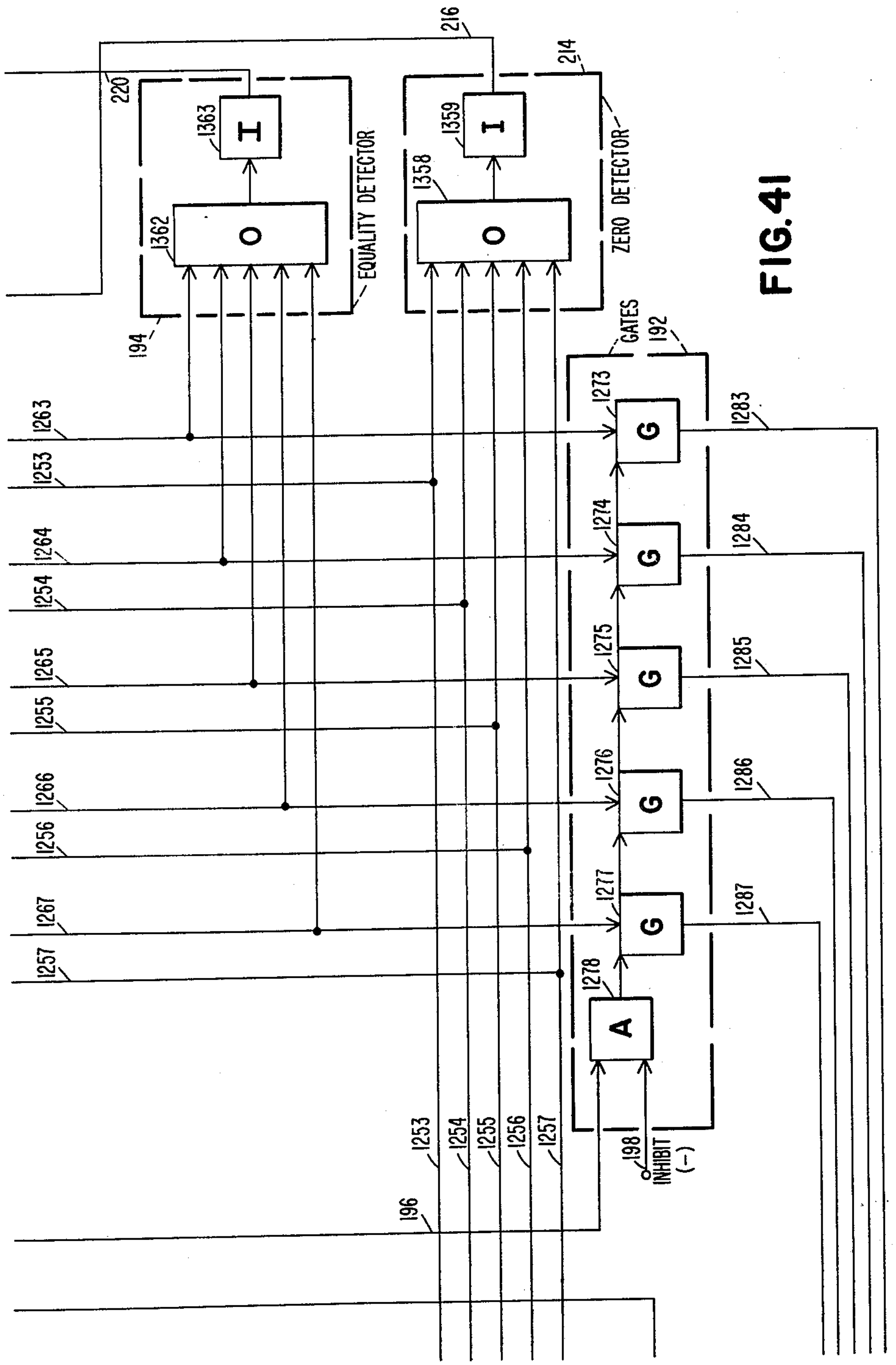

The termination control circuit 218 is shown within a dashed line box in FIG. 33. The true/complement line 46 is connected through an inverter 1352 to an AND circuit 1353. The true/complement line 46 also is connected to an AND circuit 1354. The input line 216 from the zero detector shown within dashed line box 214 in FIG. 41 is connected to the AND circuits 1353 and 1354. The output from the AND circuit 1354 is connected to the line 254 which carries the signal indicating when division is complete. The output from the AND circuit 1353 is connected to an OR circuit 1355. The output from the AND circuit 1353 also is connected through the line 252 to the inverter 575 in the dividend-quotient latch register in FIG. 17. This line 252 supplies a signal to suppress the entry of X and Y quotient bits into the dividend-quotient latch register under a certain termination condition. The input line 220 (FIG. 33) connected to the latch register 1355A is connected from the equality detector shown within dashed line box 194 in FIG. 41. The output of latch register 1355A is connected as an input to OR circuit 1355 and inverter 1352A. The output of inverter 1352A is an input to AND circuit 1353 and also AND circuit 1354. The latch control line 230 is also an input to latch register 1355A. The output from the OR circuit 1355 is connected through the line 222 to the OR circuit 1211 and to the inverter 1214 in the adder selector in FIG. 38.

The zero detector shown within dashed line box 214 in FIG. 41 includes an OR circuit 1358 and an inverter 1359. The lines 1253 through 1257 from the respective latch register 1223 through 1227 in the shift counter latch register in FIG. 40 are connected to the OR circuit 1358 in FIG. 41. The output from the OR circuit 1358 is connected through the inverter 1359 to the line 216. The line 216 is connected to the AND circuits 1353 and 1354 within the termination control circuit in FIG. 33 as described previously. The zero detector in FIG. 41 supplies a positive signal on the line 216 when the available shift is zero.

The equality detector shown within the dashed line box 194 in FIG. 41 includes an OR circuit 1362 and an inverter 1363. The lines 1263 through 1267 from the adders 1173 through 1177 in the shift counter adder of FIG. 37 are connected to the OR circuit 1362 in FIG. 41. The OR circuit 1362 is connected through the inverter 1363 to the line 220 which is connected to the latch register 1355A in the termination control circuit shown in FIG. 33 and described previously. The equality detector in FIG. 41 supplies a positive signal on the line 220 when the shift requested is equal to the shift available.

The operation of the two adder example shown in detail in FIGS. 13 through 41 is the same as that described in connection with FIGS. 1 through 3. A dividend is supplied from a storage device (not shown) through the cable 22 in FIGS. 13 through 16 to the OR circuits 452 through 480. This dividend is supplied from the OR circuits 452 through 480 to the inputs of the individual latch registers 502 through 530 in FIGS. 17 through 20, and the dividend is gated into these latch registers upon the occurrence of latch control signal on the line 230 (FIG. 17). The bits applied to latch registers 500, 501, 531 and 532 are zeros. The bit applied to the latch register 500 indicates whether the dividend is true or complement (a zero indicates true). When the latch control signal is applied, the data present at the inputs of the individual latch registers is gated into these latch registers and appears on the respective output lines 540 through 572 of the individual latch registers. The latch control signals applied to the line 230 in FIG. 17 are applied periodically throughout a divide operation to control the cycles of operation. The latch register 533 (FIG. 20) is operated in the same manner and at the same time as the latch registers 531 and 533 but this particular latch register is employed to store only a signal indicating that the one-half times divisor is used. The purpose of this operation will be described subsequently.

In a like manner, a divisor is supplied from a storage device (not shown) through the cable 19 in FIG. 31 to the divisor latch registers 962 through 967. A latch control signal is supplied to these registers through the line 94 to enter the divisor into these registers and make it available on the output lines 962 through 967 in FIG. 31, and the divisor is available throughout a divide operation.

Information indicating an initial shift of zero is supplied from a storage device (not shown) through the cable 148 in FIG. 33 and the OR circuits 1100 through 1105 to the respective shift control latch registers 1090 through 1095. A positive signal is entered into the latch register 1095 and negative signals are entered into the latch registers 1090 through 1094 upon the occurrence of the latch control signal on the line 230.

The example which will be used in the detailed description of FIGS. 13 through 41 is the same example used for the description of FIGS. 1 through 3, and this example is shown in the table in FIG. 11. Since a total shift of twenty-three will be made during the divide operation, this information is supplied from a storage device (not shown) through the cable 204 in FIG. 40 and through the OR circuits 1243 through 1247 to the respective shift counter latch registers 1223 through 1227 in FIG. 40. This information is stored in the latch registers 1223 through 1227 upon the occurrence of the latch control signal applied through the line 230.

During entry of the dividend, divisor, etc., into the divider, a negative inhibit signal is applied through the line 198 to the AND circuit 1278 in FIG. 41. This causes the gates 1273 through 1277 to be deconditioned while information is entered from storage to the shift counter latch register shown within the dashed line box 208 in FIG. 40. A positive level is applied to the set line 167 of the shift counter adder shown within the dashed line box 166 in FIG. 37. This positive level is maintained throughout a divide operation, and provides a one input into the adders 1173, 1174 and 1177.

When the first latch control signal is applied through the lines 230 and 94 the information at the input of each of the latch registers in the divider at this time now appears at the outputs of the latch registers. In the shift control latch register, shown within the dashed line box 152 in FIG. 33, the latch register 1095 supplies a positive signal to the line 536 since an initial shift of zero was stored in the shift control latch register. This positive signal is applied through the line 536 and the cable 154 to the shift zero gates 780 through 788 in FIG. 27 and also through the line 536 to the inverter 537 in FIG. 17. This positive level conditions the zero gates 780 through 788, and the inverter 537 deconditions the gate 534. The gates 780 through 788 pass the bits stored in the latch registers 500 through 508 in FIG. 17. These nine bits are applied through the cable 38f to the respective OR circuits 800 through 808 in FIGS. 25 and 26. These bits are applied from the OR circuits 800 through 808 through the respective lines 830 through 838 to the B adders 850 through 858, respectively. The eight bits from the OR circuits 800 to 807 are supplied through the respective lines 830 through 837 to the A adders 840 through 847, respectively, in FIG. 28. The bit from the OR circuit 808 is supplied through the line 838 to the gate 878 in FIG. 29 so that in the event the output from the A adders is used, this bit will be preserved and returned to the dividend-quotient latch register 508 in FIG. 17.

Since the true value of the one times divisor that is entered into the divisor latch registers 962 through 967 in FIG. 31 is 110110, the second position latch register 963 supplies a positive signal through the line 983 to each of the one-half times divisor gates 1052 through 1057 in FIG. 35. This positive signal is applied through the line 983 to the inverter 1028 within the two times divisor gates, and the inverter 1028 supplies a negative signal through the line 1029 to each of the two times divisor gates 1022 through 1027. Hence, the one-half times divisor gates are conditioned to pass the information appearing at their inputs, and the two times divisor gates are deconditioned and will not pass the information appearing at their inputs. As noted previously, if the two high order bits of the divisor in its true form are 10, the two times divisor is applied to the B adders 44 in FIG. 30. If the two high order bits of the divisor in its true form are 11, the one-half times divisor is applied to the B adders. The choice between these two divisors (two times or one-half times) is made by sensing the divisor bit (1 or 0) next to the high order divisor bit. This is accomplished by sensing the bit stored in the latch register 963 in the divisor latch register in FIG. 31 by means of the line 983. Hence, if this line is positive (a one bit) the one-half times divisor gates are conditioned and the two times divisor gates are deconditioned. Conversely, if the line 983 is negative, the one-half times divisor gates in FIG. 35 are deconditioned, and the two times divisor gates are conditioned since the inverter 1028 changes the negative level to a positive level.

The divisor bits supplied to the lines 982 through 986 in FIG. 35 are passed by the one-half times divisor gates 1052 through 1056, and through the respective OR circuits 1044 through 1048 to the exclusive OR circuits 1034 through 1038, respectively. The divisor bit applied by the line 987 is passed through the one-half times divisor gate 1057 directly to the exclusive OR circuit 1039. The inputs to the exclusive OR circuits 1034 through 1039 represent the true value of the one-half times divisor. This is the case because the one-half times divisor appearing at the inputs of the exclusive OR circuits 1034 through 1039 is shifted one position to the right with respect to the one times divisor, and two positions to the right with respect to the two times divisor. Note, for example, that if the two times divisor gates had been conditioned, the one times divisor bits appearing on the lines 982 through 987 would be applied to the exclusive OR circuits 1032 through 1037. The high order bit in the two times divisor is applied to the exclusive OR circuit 1032, and the high order bit of the one-half times divisor is applied through the OR circuit 1044 to the exclusive OR circuit 1034. Hence, as physically represented by the exclusive OR circuits in FIG. 35, the one-half times divisor is shifted two positions to the left with respect to the two times divisor. This actually represents a shift in the divisor to the right since the high order position of the divisor latch register of FIG. 31, and the adders in FIGS. 28 and 30 are on the left and the high order position of the exclusive OR circuits in FIG. 35 is on the right.

Since the dividend is true (note FIG. 11), the complement of the one-half times divisor is utilized rather than the true value. The true/complement latch register 500 (column 1 in FIG. 11) in FIG. 17 supplies a negative signal through the line 540 to the inverter 859 in FIG. 27.

The inverter supplies a positive signal on the true/complement line 46 to each of the exclusive OR circuits 1032 through 1039. The line 46 also is connected to the gate 1061 in FIG. 30. The outputs from the exclusive OR circuits 1032 through 1039 are connected to the gates 1062 through 1069 in FIG. 30. When the line 46 is positive, the exclusive OR circuits 1032 through 1039 provide the one's complement of the number applied to the input of these exclusive OR circuits. Conversely, if the line 46 is negative, the number appearing at the inputs to the exclusive OR circuits 1032 through 1039 appears at their outputs. At this time, the suppress divisor control circuit shown within the dashed line box 130 in FIG. 34 supplies a positive signal through the line 132 to each of the gates 1061 through 1069 in FIG. 30. Hence, the information appearing at the inputs of the gates 1061 through 1069 is applied through the respective lines 1071 through 1079 to the B adders 850 through 858, respectively, in FIG. 30. The line 1071 supplies a positive signal to the low order B adder 858. This forces a one into that adder position. Hence the B adders 850 through 858 receive the nine high order bits of the dividend in true form and the complement of the one-half times divisor plus a one (the two's complement of the divisor is the one's complement of the divisor plus one).

The true value of the one times divisor is applied through the lines 982 through 987 in FIG. 31 to the exclusive OR circuits 992 through 997, respectively. The true/complement line 46 supplies a positive signal to each of the exclusive OR circuits 992 through 997, and positive signals (ones) to the gates 1000 and 1001. The complement of the one times divisor is applied from the exclusive OR circuits 992 through 997 to the respective gates 1002 through 1007. The complement of the one times divisor is applied from the gates 1000 through 1007 through the respective lines 1010 through 1017 to the A adders 840 through 847, respectively, in FIG. 28. The gates 1000 and 1001 in FIG. 31 supply ones if the divisor is complement, and zeros if the divisor is true. Likewise the gate 1061 in FIG. 30 supplies a one to the B adder 850 if the divisor multiple is complement, and a zero if the divisor multiple is true. The line 1011 supplies a positive signal to the low order A adder 847 in FIG. 28. This forces a one into that adder. Hence, the A adders 840 through 847 in FIG. 28 receive the eight high order bits of the dividend and the complement of the one times divisor plus a one.

The result of the addition of the eight dividend bits with the two's complement of the one times divisor in the A adders 840 through 847 in FIG. 28 is supplied through the respective lines 56 and 861 through 867 to the gates 870 through 877 in FIG. 29. The first partial dividend bit (which indicates whether the result of the addition is true or complement) is applied from the adder 840 through the line 56 to the exclusive OR circuits 882 through 887 in FIG. 28 and to the gate 58 in FIG. 29. The third through the eighth partial dividend bits are supplied from the respective A adders 842 through 847 in FIG. 28 to the exclusive OR circuits 882 through 887, respectively. The partial dividend bits which appear at the outputs of the A adders 840 through 847 in FIG. 28 are shown in row 4, columns 1 through 8 in the table in FIG. 11.

In a like manner, the results (partial dividend) from the B adders 850 through 858 are applied through respective lines 74 and 901 through 908 in FIG. 30 to the gates 910 through 918 in FIG. 29. The high order partial dividend bit from the adder 850 is applied through the line 74 to each of the exclusive OR circuits 922 through 927 in FIG. 34. The third through the ninth partial dividend bits are applied from the respective adders 852 through 858 in FIG. 30 to the exclusive OR circuits 922 through 927, respectively, in FIG. 34. The partial dividend from the B adders 850 through 858 is shown in row 4, columns 13 through 21 in the table shown in FIG. 11.

At this point in the first cycle the additions have been made. Now, the amount of shift indicated by the results from the additions is determined, which adder output is to be utilized is determined, and quotient bits are generated. Since in row 4, columns 3 through 5 of FIG. 11 three adjacent high order ones appear, the shift decoder shown in the dashed line box 142 in FIGS. 32, 36 and 40 will indicate a shift of three. Since in row 4, column 15 in FIG. 11 only a single zero is present (no string of zeros) the adder selector shown in the dashed line box 172 in FIGS. 34 and 38 will indicate a shift of one, and this adder selector also will select which adder (A or B) output will be utilized (supplied back to the divided-quotient latch register 10).

The inverters 1122 through 1127 and the AND circuits 1133 through 1138 in the shift decoder in FIG. 32 along with the exclusive OR circuits 882 through 887 in FIG. 28 function to detect the number of adjacent ones or zeros at the outputs of the A adders 842 through 847. In the present example, row 4, columns 1 through 8 in FIG. 11 indicate that the output of the respective adders 840 through 847 is 11111001. The ones indicate positive signals, and the zeros indicate negative signals. Hence, the line 56 from the adder 840 supplies a positive signal to the exclusive OR circuits 882 through 887 in FIG. 28. This positive signal causes the exclusive OR circuits 882 through 887 to supply at their outputs the complement of the bits applied to their inputs. The inputs to the exclusive OR circuits 882 through 887 are 111001, respectively. Hence, the outputs of the exclusive OR circuits 882 through 887 are 000110, respectively. Therefore the lines 892 through 894 are negative, the lines 895 and 896 are positive, and the line 897 is negative.

The negative signal on the line 892 is inverted to a positive signal by the inverter 1122 in FIG. 32, and a positive signal is applied to each of the AND circuits 1133 through 1138. The negative signal on the line 893 is applied to the AND circuit 1133. Since these AND circuits produce a positive output only when all inputs are positive a shift one request signal (a positive signal) is not present at the output of the AND circuit 1133. The line 894 applies a negative signal to the AND circuit 1134 and, therefore, this AND circuit does not supply a shift two request. The negative signal on the line 893 is inverted to a positive signal by the inverter 1123 and applied to each of the AND circuits 1134 through 1138. The negative signal on the line 894 is inverted to a positive signal by the inverter 1124 and applied to each of the AND circuits 1135 through 1138. The line 895 applies a positive signal to the AND circuit 1135. The line 180 applies a positive signal to each of the AND circuits 1133 through 1138 at this time (line 180 is negative only when the B adder output is being used as determined by the adder selector 172 in FIGS. 34 and 38). Hence, all of the inputs to the AND circuit 1135 are positive, and, therefore, this AND circuit supplies a positive output which is a shift three request signal. The inverter 1125 supplies a negative signal to the AND circuits 1136 through 1138. Therefore, a shift three request is indicated by the output of the AND circuit 1135, and no shift request is indicated by the outputs of the AND circuits 1133, 1134 and 1136 through 1138. This shift three request signal (positive) from the AND circuit 1135 is applied as an input to the gate 1145. The gate 1145 (along with the gates 1143, 1144 and 1146 through 1148) is selected except when the requested shift is larger than the available shift.

The exclusive OR circuits 922 through 927 in FIG. 34, the inverters 1182 through 1187, and the AND circuits 1193 through 1198 function in a manner identical to the similar circuits in the shift decoder shown in FIGS. 28 and 32 to provide a shift request signal. Since the high order zero in row 4, column 15 of FIG. 11 is not followed by a like bit (a zero) but is followed by a one, the AND circuit 1193 in FIG. 38 supplies a positive signal at its output which indicates a shift one request. As noted in the description of FIGS. 1 through 3, the adder selector 172 selects the B adders 44 only when the output of the B adders indicates a shift of two or greater. Hence, in the present cycle the output of the A adders is selected. The AND circuit 1193 in FIG. 38 supplies the positive signal through the OR circuit 1211 to the line 180. The line 180 applies this positive signal to AND circuits 1134 through 1138 in FIG. 32 and to the gates 58 and 870 through 878 in FIG. 29. This signal causes the positive shift three request from the AND circuit 1135 in FIG. 32 to pass through the gate 1145 to the line 1155. The signal on the line 180 conditions the gates 870 through 877 in FIG. 29 to pass the partial dividend from the A adders through the respective OR circuits 940 through 947, the respective lines 950 to 957, the cable 64, the lines 950 through 957 in FIG. 13 to the respective OR circuits 450 through 457 also, the gate 878 is conditioned to pass the bit at its input through the OR circuit 948, the line 958 and the cable 64 to the OR circuit 458. The OR circuits 450 through 458 supply the partial dividend to the inputs of the latch registers 500 through 508, and this partial dividend will be entered into these latch registers upon the occurrence of the next latch control signal on the line 230.

Referring back to the portion of the adder selector shown in FIG. 38, the AND circuit 1193 supplies a positive signal through the line 1209 to the inverter 1210. The inverter 1210 supplies a negative signal through the line 1212 in FIG. 34 to the AND circuit 1213. Since all inputs to the AND circuit 1213 are not positive, this AND circuit supplies a negative output signal to the line 178. This negative signal is applied through the line 178 to inhibit the AND circuits 1194 through 1198 in FIG. 38. Also, the negative signal on the line 178 is applied to the gates 76, and the gates 910 through 918 in FIG. 29. This negative signal deconditions these gates and, therefore, the partial dividend appearing at the output of the B adders is not passed by the gates 910 through 918.

Had the shift indicated by the output of the B adders been greater than one, the output of the AND circuit 1193 would have been negative. Hence, a negative signal would have been applied through the line 180 to inhibit the AND circuits 1134 through 1138 in FIG. 32 and the gates 58 and 870 through 878 in FIG. 29. The output of the AND circuit 1213 would have applied the positive signal to enable the AND circuits 1194 through 1198 in FIG. 38 and the gates 76 and 910 through 918 in FIG. 29. There is one exception to this operation which occurs at termination, and the termination control circuit in FIG. 33 supplies a positive signal to the line 222 in FIG. 38 which causes only the A adders to be selected. This termination procedure will be discussed subsequently. Also the line 196 applies a positive conditioning signal to each of the gates 1204 through 1208.

The shift three request from the AND circuit 1135 in FIG. 32 is applied through the gate 1145, the line 1155 in FIG. 36, the OR circuit 1165, the line 1315, and the OR circuit 1102 in FIG. 33 to the latch register 1092 in the shift control latch register shown within the dashed line box 152 in FIG. 33. The next latch control signal on the line 230 (the second in the present example) will gate this shift three request into the latch register 1092, where it will be applied from the latch register 1092 through the line 792, the cable 154, and the line 792 in FIG. 21 to the shift three gates 660 through 692 in FIGS. 21 through 24.

During the first cycle in the present example, the shift three request is gated through the AND 1135 in FIG. 32 and the line 1155A in FIGS. 32, 33 and 37 to the OR circuit 1172 in FIG. 37. The shift three request signal, which is a positive signal, is applied from the OR circuit 1172 to the adder 1175 in the shift counter adder shown within the dashed line box 166 in FIG. 37. The OR circuits 1170 and 1171 supply negative signals to the adders 1177 and 1176, respectively. The line 167 supplies a positive signal to the adders 1173, 1174 and 1177.

Since a total shift available of twenty-three was previously stored in the shift counter latch register shown within the dashed line box 208 in FIG. 40 and only a zero shift has been made, the outputs from the latch registers 1223, 1225, 1226 and 1227 are positive and the output from the latch register 1224 is negative. The latch register 1223 is the high order latch register. These outputs represent in binary form (10111) the decimal numeral twenty-three. Therefore, a positive signal is applied from the latch registers 1223, 1225, 1226 and 1227 through respective lines 1253, 1255, 1256 and 157 to the adders 1173, 1175, 1176 and 1177, respectively, in FIG. 37. The latch register 1224 in FIG. 40 supplies a negative signal through the line 1254 to the adder 1174 in FIG. 37. The OR circuits 1170 through 1172 in FIGS. 37 serve to supply the complement binary number representing the shift requested to the shift counter adder 166 in FIG. 37.

The low order adder 1177 in FIG. 37 receives positive inputs on the lines 167 and 1257 and a negative input from the OR circuit 1170. This adder provides a negative output on the output line 1267 and a positive carry to the adder 1176. The adder 1176 receives the positive carry from the adder 1177, a positive input on the line 1256 and a negative input from the OR circuit 1171. This adder 1176 supplies a negative output on the line 1266 and a positive carry to the adder 1175. The adder 1175 receives the positive carry, the positive signal on the line 1255, and the positive signal from the OR circuit 1171. This adder 1175 provides a positive output on the line 1265 and a positive carry to the adder 1174. The adder 1174 receives the positive carry, a negative input on the line 1254 and a positive input on the line 167. This adder 1174 provides a negative output on the line 1264 and a positive carry to the adder 1173. The adder 1173 receives the positive carry, the positive input from the line 1253 and a positive input on the line 167. The adder 1173 provides a positive output on the line 1263 and a positive carry on the line 196. The line 196 will remain positive until the shift requested is larger than the shift available, at which time it goes negative. The line 196 supplies the positive conditioning level to the gate circuits 1143 through 1148 in FIG. 32 and to the gate circuits 1204 through 1208 in FIG. 38. Also, the line 196 supplies a positive signal to the inverter 1309 in FIG. 36. The inverter 1309 normally supplies a negative signal to the AND circuits 1303 through 1308. When the shift requested is larger than the shift available, the inverter 1309 supplies a positive signal to condition the AND circuits 1303 through 1308 in FIG. 36 to provide a signal indicating what shift (that available) is to be made by the shifter 12. The line 196 also supplies a positive signal to the AND circuit 1278 in FIG. 41 normally. The line 198 normally supplies a positive signal to the AND circuits 1278.

The outputs from the adders 1173 through 1177 in FIG. 37 (which are respectively + − + − − which indicate the binary number 10100, or the decimal number twenty) are applied through the respective lines 1263 through 1267, the respective gates 1273 through 1277, the respective lines 1283 through 1287, and the respective OR circuits 1243 through 1247 in FIG. 40, to the inputs of the respective latch registers 1223 through 1227. Upon the occurrence of the next latch control signal on the line 230, the information at the inputs of the latch registers 1223 through 1227 are gated into these latch registers and made available at their outputs.

Should the shift requested be larger than the shift available, the line 196 from the adder 1173 in FIG. 37 applies a negative signal to the inverter 1309 which inverts this negative signal to a positive signal and applies it to the AND circuits 1303 through 1308 in FIG. 36 as noted before. One of the AND circuits 1303 through 1308 provides the positive shift request signal which, in this event, is the shift available. The inverter 1309 in FIG. 36 only supplies a positive signal to the AND circuits 1303 through 1308 when the shift available is five or less.

The AND circuits 1303 through 1308 in FIG. 36 along with the inverters 1293 through 1295 in FIG. 40 function to decode the binary number (which indicates the shift available) in the latch registers 1223 through 1227. For example, assume that a shift of three is available, the outputs from the latch registers 1223 through 1227 are respectively 00011. Hence, the outputs from the latch registers 1226 and 1227 are positive and the output of the latch register 1225 is negative. Assume also that the shift requested is larger than the shift available so that the inverter 1309 in FIG. 36 supplies a positive signal to the AND circuits 1303 through 1308 in FIG. 36. The latch register 1227 in FIG. 40 supplies a positive signal through the line 1257 to the AND circuits 1303, 1305 and 1307 in FIG. 36. The line 1257 also supplies a positive signal to the inverter 1293 in FIG. 40. The inverter 1293 supplies a negative signal to the AND circuits 1304, 1306 and 1308. The latch register 1226 in FIG. 40 supplies a positive signal through the line 1256 to the AND circuits 1304 and 1305 in FIG. 36. The line 1256 also supplies a positive signal to the inverter 1294 in FIG. 40. The inverter 1294 supplies a negative signal to the AND circuits 1303, 1306, 1307 and 1308. The latch register 1225 in FIG. 40 supplies a negative signal through the line 1255 to the AND circuits 1306 and 1307 in FIG. 36. The line 1255 also supplies a negative signal to the inverter 1295 in FIG. 40. The inverter 1295 supplies a positive signal to the AND circuits 1303, 1304, 1305 and 1308 in FIG. 36. Hence, the AND circuit 1305 in FIG. 36 is the only AND circuit in this group with all of its inputs positive. This AND circuit supplies a positive output signal which indicates a shift of three through the OR circuit 1165 to the line 1315.

Returning back to the operation of the divider during the first cycle as illustrated in FIG. 11, the X and the Y quotient bits are generated by the quotient generator shown within the dashed line box 104 in FIG. 39. These bits are generated in accordance with the condition set forth in Table I as described previously. Referring to the Table I, since the divisor used was the complement of the one times divisor and the result is complement, the X and Y bits to be generated are 01, respectively. The quotient generator in FIG. 39 senses the fact that the true value of the one times divisor was used and the fact that the partial dividend is complement.

The signal on the line 180 of the adder selector in FIGS. 34 and 38 which selects the outputs of the A adders supplies a positive signal to the AND circuits 1320 and 1321 in FIG. 39 to indicate that the one times divisor was used. The line 180 also supplies a positive signal to the inverter 1328. The inverter 1328 supplies a negative signal to the AND circuits 1329 and 1330 which in turn supply negative signals to the AND circuits 1322 through 1325. Hence, the AND circuits 1322 through 1325 supply negative outputs to the OR circuits 1326 and 1327. Since the partial dividend produced by the A adders was complement, the line 234 supplies a positive signal to the AND circuit 1321 and to the inverter 1332. The inverter 1332 supplies a negative signal to the AND circuits 1320. At this time the line 132 supplies a positive signal to the AND circuits 1320 through 1325. The line 234 is connected from the OR circuit 84 in FIG. 29. This OR circuit 84 serves to pass the true or complement partial dividend bit from either the A adder 840 in FIG. 28 or the B adder 850 in FIG. 30 depending upon which of the respective gates 58 or 76 in FIG. 29 is conditioned. In the present instance, the gate 58 is conditioned since the A adders were selected and, therefore, the adder 840 in FIG. 28 supplies a positive signal through the line 56, the gate 58 in FIG. 29, and the OR circuits 84 to the line 234.

All three inputs to the AND circuit 1321 in FIG. 39 are positive and, therefore its output is positive. This positive output signal is applied from the AND circuit 1321 and through the OR circuit 1327 to the Y quotient bit line 244. The AND circuits 1320, 1322 and 1324 in FIG. 39 supply negative signals to the OR circuit 1326. At this time the gate 1343 in FIG. 39 is deconditioned and, therefore, it also applies a negative signal to the OR circuit 1326. Hence, the OR circuit 1326 supplies a negative signal to the line 240. The gate 1343 is conditioned to supply the bits being shifted across to termination conditions or upon a shift request of greater than five. This operation of the gate 1343 will be described subsequently.

The Y bit (a one) is applied through the line 244 in FIG. 39 and through the OR circuit 482 in FIG. 16 to the latch register 532 in FIG. 20. The X bit (a zero) is applied through the line 240 in FIG. 39 to the gate 20 in FIG. 16. At this time the gate 20 is conditioned, and the X bit (zero) is applied through the line 242 and the OR circuit 481 in FIG. 16 to the latch register 531 in FIG. 20. Since a shift of three is indicated, three latch registers 530 through 532 will become vacant when the shift three is made. The X and the Y bits are applied to the latch registers 531 and 532. This leaves the latch register 530 in FIG. 19 vacant. However, when the shift three is made, the gate 661 in FIG. 21 will gate the bit in the latch register 501 (which bit is the same as those being shifted across) through the line $32a$ and the OR circuit 480 in FIG. 15 to the latch register 530 in FIG. 19. Hence three quotient bits will be entered into the respective latch registers 530 through 532 when the shift of three is made.

When the next latch control signal is applied to the line 230, it gates the partial dividend into the latch registers 500 through 508 in FIG. 17, gates the shift three request into the latch register 1092 in the shift control latch register in FIG. 33, gates the remaining shift available into the latch registers 1223 through 1227 in the shift counter latch register in FIG. 40, gates the quotient bits X and Y into the latch registers 531 and 532 in FIG. 20 and a zero shift is made. The shift three request signal is applied from the latch register 1092 in FIG. 33 through the line 792 and the cable 154 to the shift three gates 661 and 663 through 692 in FIGS. 21 through 24. When the shift three signal is applied to the gates 661 and 663 through 671 in FIGS. 21 and 22, a new portion of the dividend from the dividend-quotient latch registers 501 and 503 through 511 is applied through the cable $38c$ to the OR circuits 800 through 808 in FIGS. 25 and 26. Note that the placement of the gates 667 through 671 with respect to the latch registers 501 through 511 determines the amount of shift, i.e., depending upon which row of shift gates receives a positive signal, different bits from the latch registers 501 through 513 are supplied to the OR circuits 800 through 808 in FIGS. 25 and 26.

In the next cycle the shift of three will be made. The portion of the dividend available at the outputs of the latch registers 512 through 532 is gated through the respective shift three gates 672 through 692 in FIGS. 22 through 24, through the cable $34c$ and the respective OR circuits 459 through 479 to the respective latch registers 509 through 529 in FIGS. 18 and 19. This information appears at the input of the latch registers 509 through 529. A quotient bit also appears at the input to the latch register 530 in FIG. 19, and this quotient bit is the same as the bits being shifted across. This is accomplished by gating the output of the latch register 501 in FIG. 17 through the shift three gate 661 in FIG. 21, through the line $32a$, and through the OR circuit 480 to the latch register 530. When the latch control signal is applied to the line 230, through the gate 534 (FIG. 17), and through the line 535 to the latch registers 509 through 530 in FIGS. 18 and 19, the information applied to the input of these latch registers is available at their outputs.

The dividend bits applied to the OR circuits 800 through 808 in FIGS. 25 and 26 are applied to the A adders in FIG. 28 and to the B adders in FIG. 30 in the same manner as before. However, the low order dividend bit from the OR circuit 808 in FIG. 26 is applied directly to the input of the gate 878 in FIG. 29 so that in the event the output from the A adders is used, this bit will be preserved and returned to the dividend-quotient latch register 508 in FIG. 17.

Should a shift of greater than five be requested, a shift of five is made in the normal manner except no divisor is entered into the A adders or the B adders, and the quotient bits generated are the same as the bits being shifted across. After the shift of five is made in this manner, the remaining shift is made in the normal manner. If the output from the A adder indicates a shift greater than five, the AND circuit 1138 in FIG. 32 provides a positive output. If the A adders are selected by the adder selector 172 in FIG. 38, the positive output from the AND circuit 1138 in FIG. 32 is applied through the gate 1148 and the line 1158B to the line 168. The line 168 supplies a positive signal to the inverter 1348 within the suppress divisor control circuit shown within the dashed line box 130 in FIG. 34. The inverter 1348 supplies a negative signal to the AND circuit 1347 and this negative signal is stored in the latch register 1351 by the latch control signal on the line 230. In the next cycle, the latch register 1351 supplies a negative output on the line 132. The negative signal on the line 132 deconditions the gates 124 in FIG. 30 and the gates 108 in FIG. 31 to prevent the entry of any divisor into the A and B adders. The line 132 also supplies a negative signal to each of the AND circuits 1320 through 1325 thereby causing these AND circuits to provide negative outputs. The signal on the line 132 is inverted by the inverter 1341 and a positive signal is applied to the gate 1343 to condition this gate. In the meantime, the partial dividend from the A adders is gated into the dividend-quotient latch register 10 in FIG. 17. The output from the latch register 501 (which is the same as the bits being shifted across) in FIG. 17 is applied through the line 541 and the line 232 to the gate 1343 in FIG. 39. Since the gate 1343 is now conditioned by the output of the inverter 1341, this gate supplies X and Y quotient bits in agreement with the bits being shifted across through the OR circuits 1326 and 1327 to the respective lines 240 and 244. The next latch control signal on the line 230 gates these quotient bits into latch registers 531 and 532. The line 794 supplies a positive signal to the shift five gates, and the gate 741 in FIG. 21 supplies the bits being shifted across through the line 32*c* and the OR circuits 478 through 480 to the latch registers 528 through 530 in FIG. 19. The portion of the dividend appearing at the outputs in the latch registers 514 through 532 in FIGS. 18 through 20 is gated by the shift five gates 754 through the cable 43*e* and the respective OR circuits 459 through 477 in FIGS. 14 and 15 to the latch registers 509 through 527, respectively. As the latch control signal is applied through the line 535 to the latch registers 509 through 530, the information appearing at the inputs of these latch registers is gated into these latch registers.

During the shift of five in the case where a shift of greater than five was requested, the A and B adders perform no addition because they receive no divisor. However, the outputs from these adders is detected in the normal manner since, after the shift of five, the division progresses in the normal manner. The outputs also are applied to the latch registers 500 through 508. In the foregoing discussion of a shift request greater than five, the AND circuit 1198 in FIG. 38 would provide a positive output if the result of the addition of the B adders had indicated a shift greater than five. This output from the AND circuit 1198 would be applied through the gate 1208 and the line 1158 to the line 182. The line 182 is connected through the inverter 1346 to the AND circuit 1347 in FIG. 34, which is the input to latch register 1351. The output of latch register 1351 causes the deconditioning of the gates 124 in FIG. 30 and 108 in FIG. 31 during the next cycle in the same manner as described before.

As described previously, the quotient generator shown within dashed line box 104 in FIG. 39 generates quotient bits in accordance with Table I. In the first cycle shown in FIG. 11 the X and Y quotient bits were 01. respectively. The quotient generator in FIG. 39 senses whether the partial dividend is true or complement by means of the line 234. If this line is negative the remainder is true and if this line is positive the remainder is complement. The true/complement line 46 is negative if the divisor is true and positive if the divisor is complement. If the one times divisor is used (the A adders are used) the line 180 is positive, and if it is not used the line 180 is negative. If the one-half times divisor is selected, the line 983 is positive, and if the two times divisor is selected this line is negative. Hence, for example, if the output from the B adders is used and the one-half times divisor is used, the line 180 is negative and the inverter 1328 supplies a positive signal to the AND circuits 1329 and 1330, and the line 983 is positive. The AND circuit 1329 provides a positive output. The inverter 1331 inverts the positive signal on the line 983 and supplies a negative signal to the AND circuit 1330. The output from the AND circuit 1330 is negative in this instance. The AND circuits 1320 through 1325 sense the input conditions to the quotient generator in FIG. 39 and provide the X and Y quotient bits in the same manner as described previously.

Whenever the one-half times divisor is used in a cycle of operation (the outputs from the B adders are utilized and the one-half times divisor is employed), this fact is stored. When this occurs, the line 246 from the AND circuit 1329 in FIG. 39 is positive as previously described. The line 246 supplies this positive signal to the latch register 533 in FIG. 20. Upon the occurrence of the latch control signal on the line 230*a*, the latch register 533 stores the indication that the one-half times divisor was used. In the event that the use of the one-half times divisor in one cycle is followed by a shift of one in the next cycle, the AND circut 820 in FIG. 20 supplies a positive output on the line 821. The inputs to this AND circuit 820 are a signal on the line 26 from the latch register 533 which indicates that the one-half times divisor was used in the preceding cycle, and a shift one positive signal on the line 790. The positive output from the AND circuit 820 is applied through the line 821 to the gate 822. The gate 822 gates the previously stored Y bit from the latch register 532, through the line 572, the gate 612, the line 824, the gate 822, the line 36, and the OR circuit 481 in FIG. 16 to the latch register 531 in FIG. 20. At the same time, the positive signal on the line 821 is inverted by the inverter 823. The output of the inverter 823 is applied through the line 33 to decondition the gate 20 in FIG. 16. This prevents a newly generated X bit from being entered into the latch register 531 in FIG. 20.

The termination control circuit in FIG. 33 and the suppress divisor control circuit in FIG. 34 sense certain conditions in the present divider to control the termination. When the dividend is true, the true/complement line 46 connected to the inverter 1350 in FIG. 34 is positive, and when the shift requested is larger than the shift available the line 196 from the shift counter adder in FIG. 37 is negative. These conditions cause the divider to operate in a manner similar to the condition when a shift greater than five is requested. The line 196 is connected to the negative AND circuit 1349 and the output of the inverter 1350 is connected to this AND circuit. When these two conditions occur (two negative inputs), the output from the negative AND circuit 1349 is negative. This negative signal is applied to the AND circuit 1347. The latch register 1351 stores the negative signal and in turn supplies a negative signal on the line 132 to decondition the gates 124 in FIG. 30 and 108 in FIG. 31 during the next cycle. This action suppresses the entry of a divisor. The output from the latch register 1351 also is connected through the line 132 to the inverter 1341 in the quotient generator shown in FIG. 39. The output from the inverter 1341 in this case is positive, and this potential is applied to condition the gate 1343. The gate 1343 sets the X and Y quotient bits to agree with the bits being shifted across. The line 132 also is connected to each of the AND circuits 1320 through 1325. Thus, a negative signal is applied to each of the AND circuits 1320 through 1325 and these AND circuits provide negative outputs.

When the dividend is complement, the true/complement line 46 supplies a negative signal to the inverter 1352 in the termination control in FIG. 33. When the shift available is zero, the outputs from the latch registers 1223 through 1227 in FIG. 40 are zero (negative). These outputs are applied to the OR circuit 1358 in the zero detector in FIG. 41. The OR circuit 1358 supplies a negative signal to the inverter 1359 which in turn supplies a positive signal through the line 216 to the AND circuit 1353 in FIG. 33. This also receives a positive signal from inverter 1352. The output of AND circuit 252 supplies a positive signal through line 252 to the inverter 575 in FIG. 17. The inverter 575 supplies a negative signal to the gate 574 which in turn prevents the entry of the X and Y quotient bits into the dividend-quotient latch register 10 by not passing a latch control signal to the latch registers 531 and 532. The AND circuit 1353 in FIG. 33 also supplies a positive signal through line 252 to the line 222. The line 222 is connected to the OR circuit 1211 in FIG. 38 to select the A adders, and to the inverter 1214 in FIG. 38 to suppress the B adders.

If, on termination, the shift requested is equal to the shift available, the outputs from each of the adders 1173 through 1177 in FIG. 37 are zero, or negative. These negative outputs are connected through the lines 1263 through 1267 to the OR circuit 1362 in the equality detector in FIG. 41. The OR circuit 1362 supplies a negative signal to the inverter 1363 which in turn supplies a positive signal through the line 220 to the latch register 1355A, in FIG. 33. This, having a positive output during the next cycle, forces the use of the one times divisor and inhibits the division complete signal in the manner previously described.

When the shift available is zero, the zero detector shown within the dashed line box 214 in FIG. 41 supplies a positive signal through the line 216 to the AND circuit 1354 in FIG. 33. If the dividend is true, the true/complement line 46 supplies a positive signal to the AND circuit 1354. Also, if the latch register 1355A contains a zero the input to inverter 1352A will be negative and its output will supply a positive signal to AND circuit 1354. Under these conditions the AND circuit 1354 supplies a positive output on the line 254 which indicates that the division is complete.

The single adder divider example shown in block form in FIGS. 1, 5 and 6 is shown in FIGS. 13 through 27 and FIGS. 42 through 53 when arranged as illustrated in FIG. 4*d*. Many of the circuits in the one adder divider example are substantially identical to those in the double adder divider example. However, the single adder utilizes the multiple selector 350 (FIGS. 48 and 52) to select whether the one times, the one-half times, or the two times divisor will be used.

Figure 42:
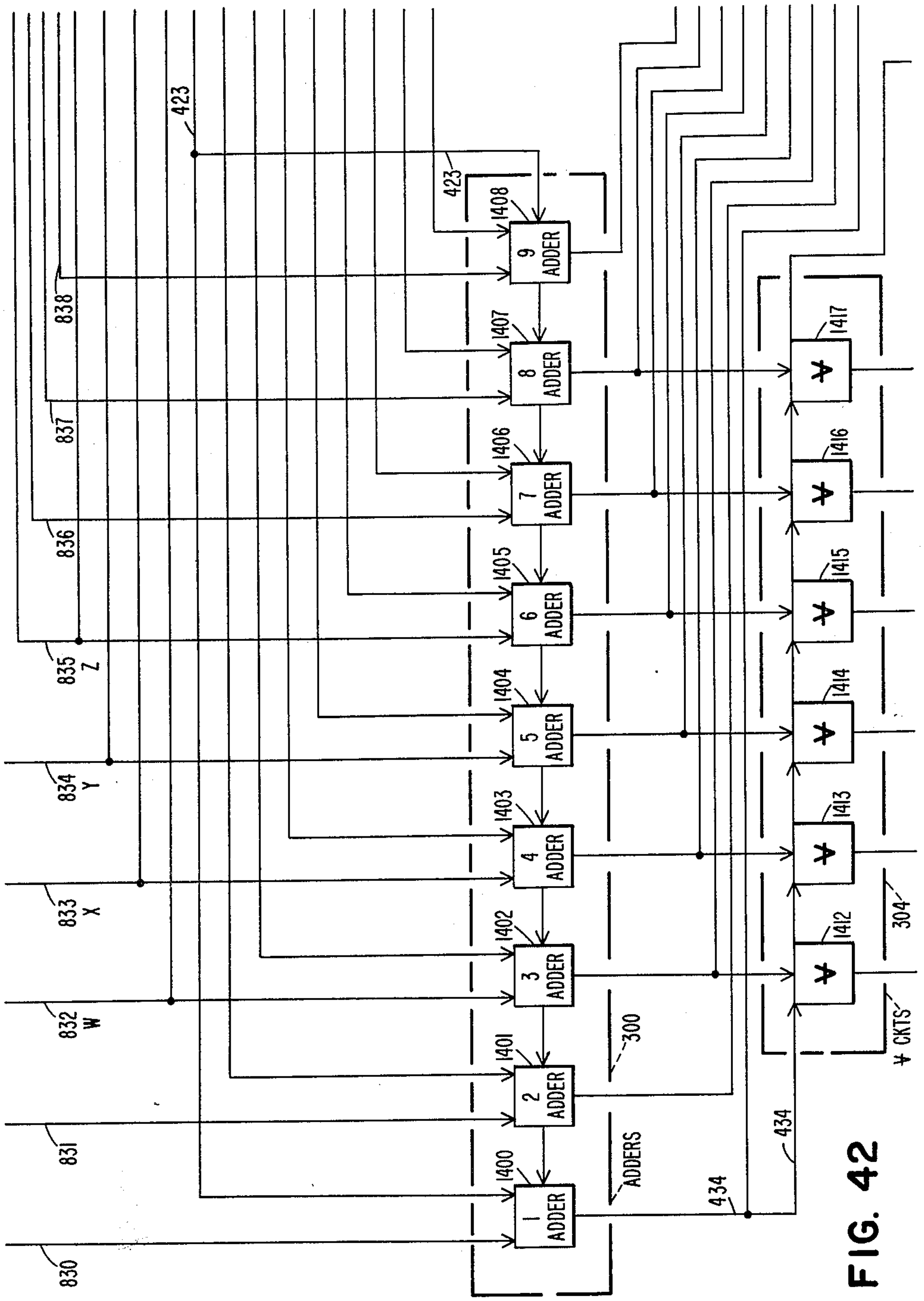

The OR circuits 800 through 808 in FIGS. 25 and 26 are connected through the respective lines 830 through 838 to adders 1400 through 1408 respectively, in FIG. 42. The true/complement line 46 is connected through the gate 421 (FIG. 44) and the line 423 to the adder 1408 to force a one into this adder when the complement of the divisor is used. The line 423 also is connected to the adder 1400. The output from the adder 1400 is connected to exclusive OR circuits 1412 through 1417. The outputs of adders 1402 through 1407 are connected to the respective exclusive OR circuits 1412 through 1417. The outputs from the adders 1400 through 1408 are connected to respective gates 1420 through 1428 in FIG. 43. A negative inhibit signal is applied through the line 310 to the gates 1420 through 1428 in FIG. 43 when initially entering data into the divider. The outputs of the gates 1420 through 1428 are connected through the respective lines 950 through 958, the cable 64, the respective OR circuits 810 through 818 in FIG. 13 to the latch registers 500 through 508, respectively, in FIG. 17.

Figure 44:
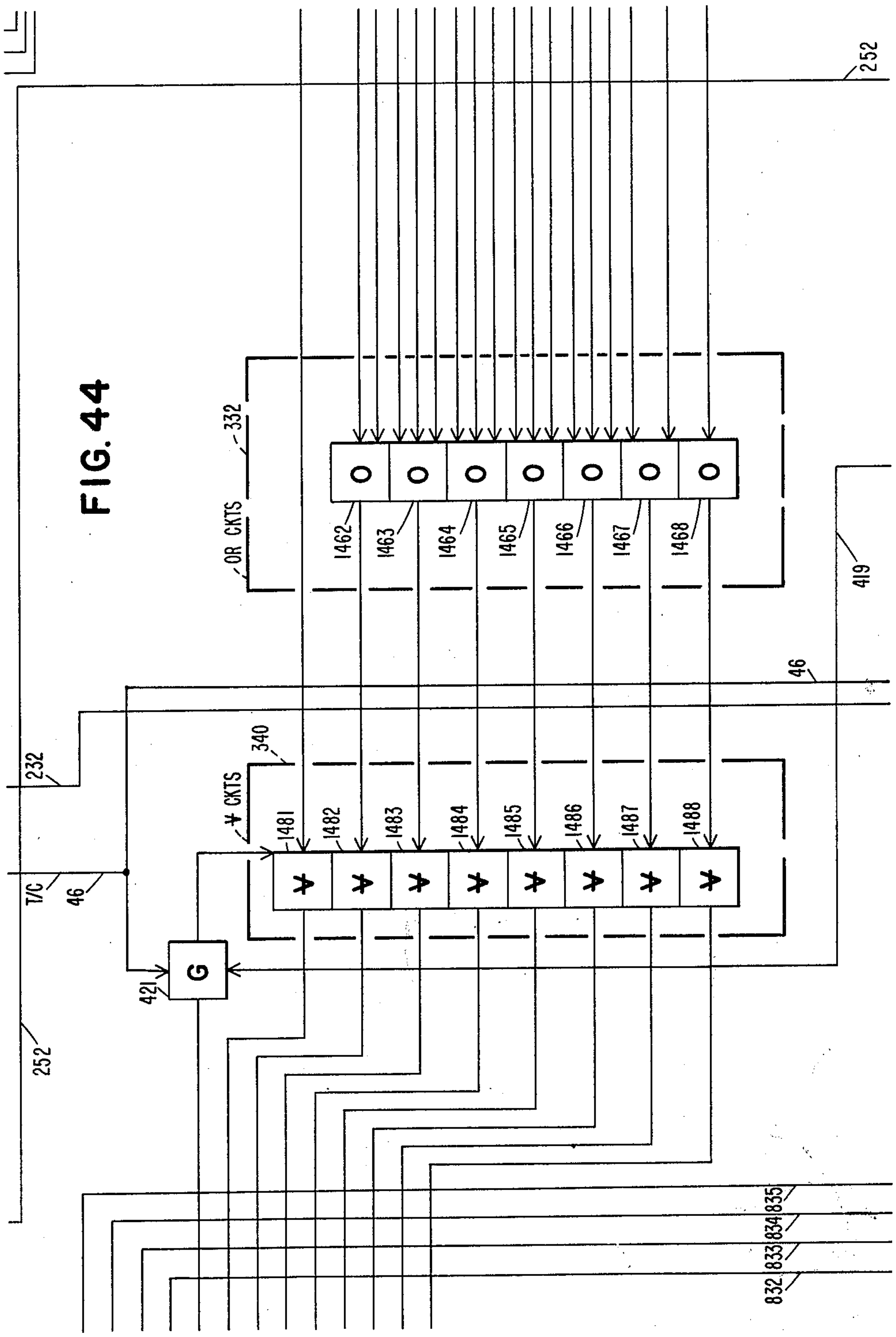
Figure 45:
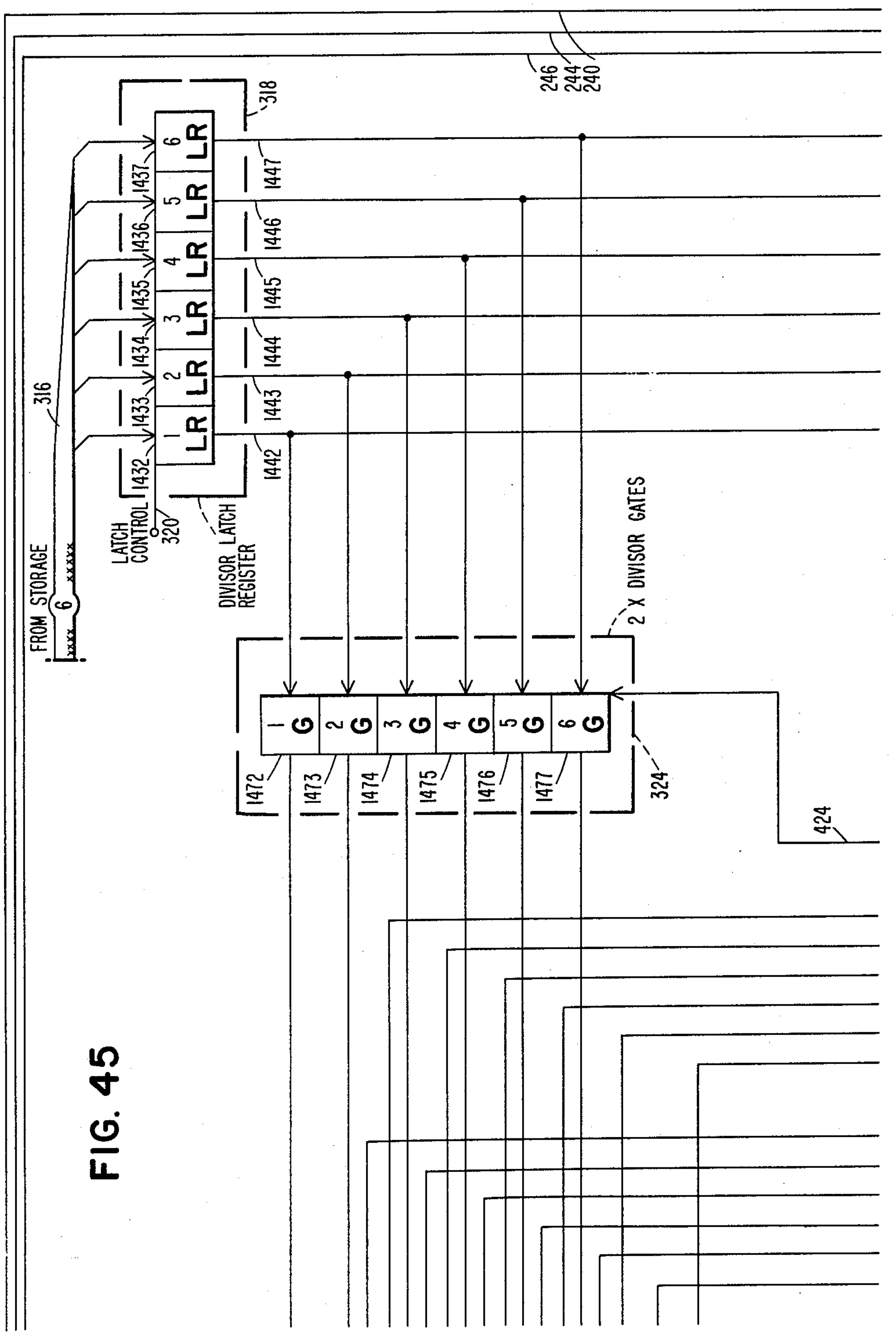

The divisor latch register is shown within the dashed line box 318 in FIG. 45. This register includes individual latch registers 1432 through 1437. The cable 316 supplies the true value of the one times divisor to the latch registers 1432 through 1437 from a storage device (not shown). The latch control line 320 is connected to each of the latch registers 1432 through 1437 to enter the divisor into these registers. The outputs from the divisor latch registers 1432 through 1437 are carried through respective lines 1442 through 1447 to one times divisor gates 1452 through 1457, respectively, in FIG. 49. The line 426 is connected from the gates shown within the dashed line box 408 in FIG. 49 to the one times divisor gates to condition or decondition these latter gates. The outputs from the one times divisor gates 1452 through 1457 are connected to respective OR circuits 1462 through 1467 in FIG. 44.

The lines 1442 through 1447 from the respective divisor latch registers 1432 through 1437 are connected to respective two times divisor gates 1472 through 1477. The line 424 is connected from the gates shown within the dashed line box 408 in FIG. 49 to condition or decondition the gates 472 through 477 in FIG. 45. The outputs from the two times divisor gates 1473 through 1477 are connected to the respective OR circuits 462 through 466 in FIG. 44. The output of the two times divisor gate 1472 is connected to an exclusive OR circuit 1461 in FIG. 44.

Figure 49:
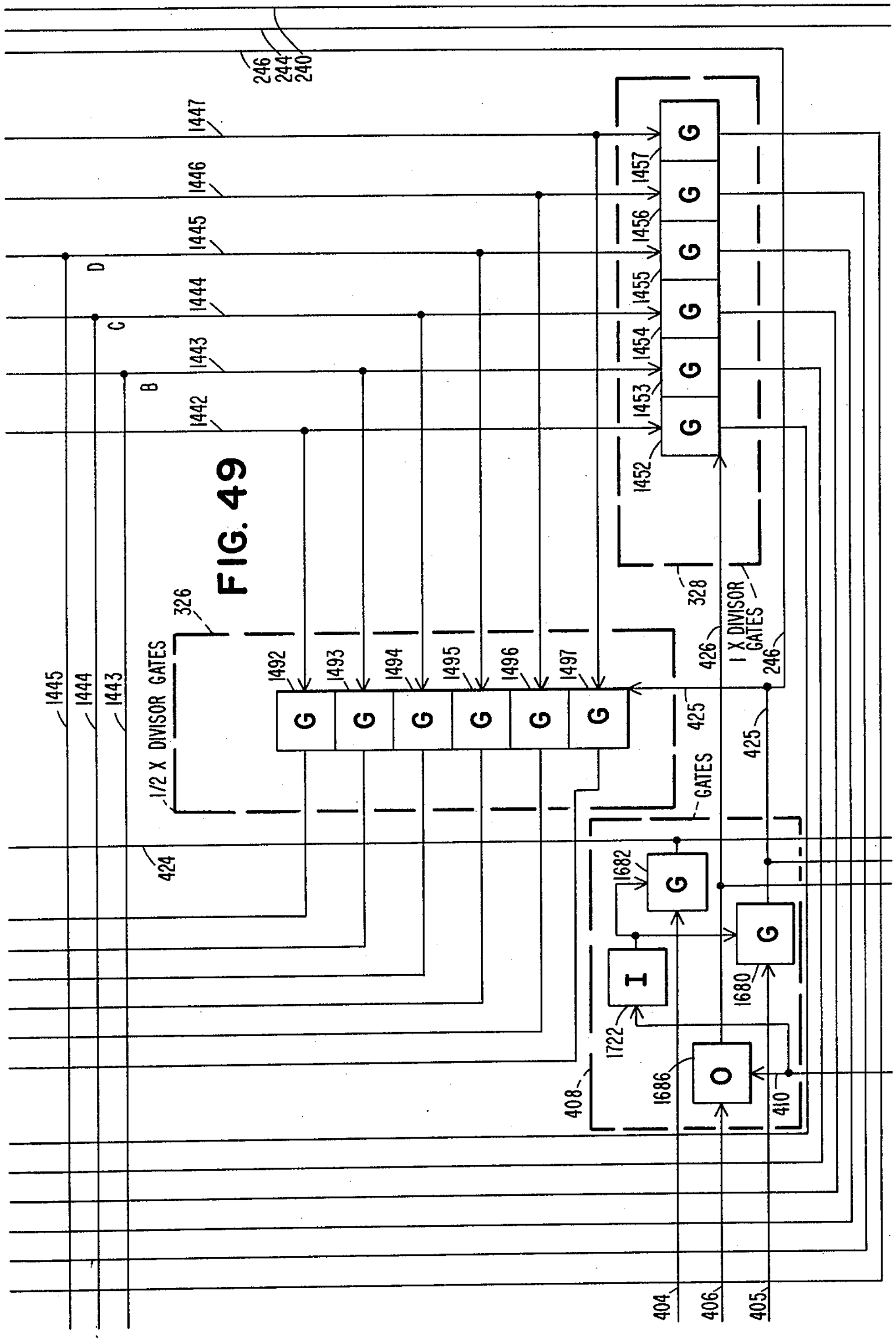

The lines 1442 through 1447 from the divisor latch registers 1432 through 1437 in FIG. 45 are connected to respective one-half times divisor gates 1492 through 1497 in FIG. 49. The line 425 is connected from the gates shown within the dashed line box 408 in FIG. 49 to condition or decondition the one-half times divisor gates 1492 through 1497. The outputs of the one-half times divisor gates 1492 through 1497 are connected to respective OR circuits 1463 through 1468 in FIG. 44. The OR circuits 1462 through 1468 in FIG. 44 serve to shift the one-half times or the two times divisor multiple to the right or to the left, respectively, with respect to the one times divisor multiple. The outputs from the OR circuits 1462 through 1468 are connected to respective exclusive OR circuits 1482 through 1488. The true/complement line 46 is connected from the shifter 12 through the gate 421 to each of the exclusive OR circuits 1481 through 1488 in FIG. 44. The gate 421 also is connected through the line 423 to the adders 1400 and 1408 at FIG. 42. The outputs of the exclusive OR circuits 1481 through 1488 in FIG. 44 are connected to the respective adders 1401 through 1408 in FIG. 42. The line 419 connected to the gate 421 in FIG. 44 serves to decondition that gate on the occasions where no divisor is to be entered into the adders 1400 through 1408 in FIG. 42.

Figure 46:
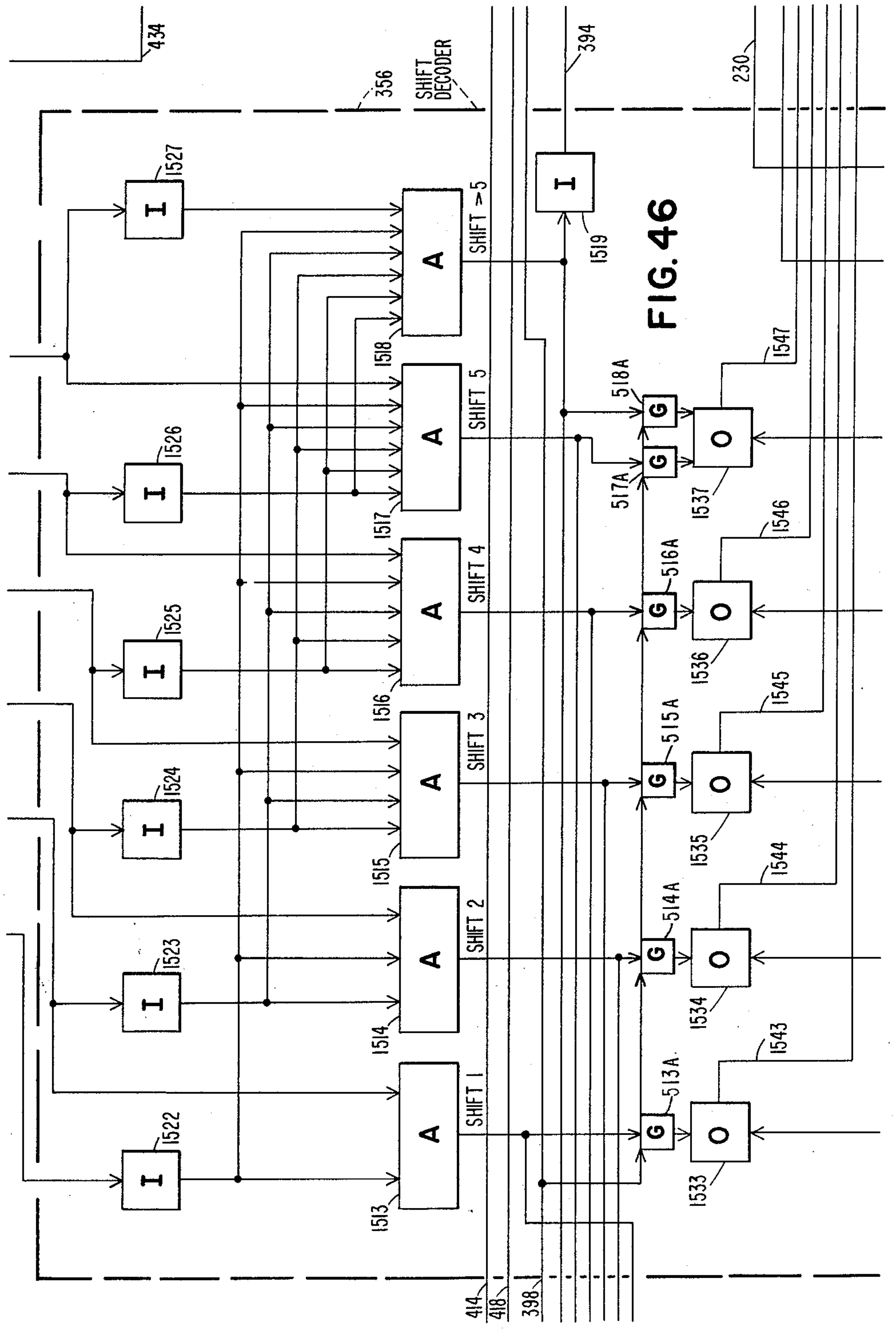
Figure 50:
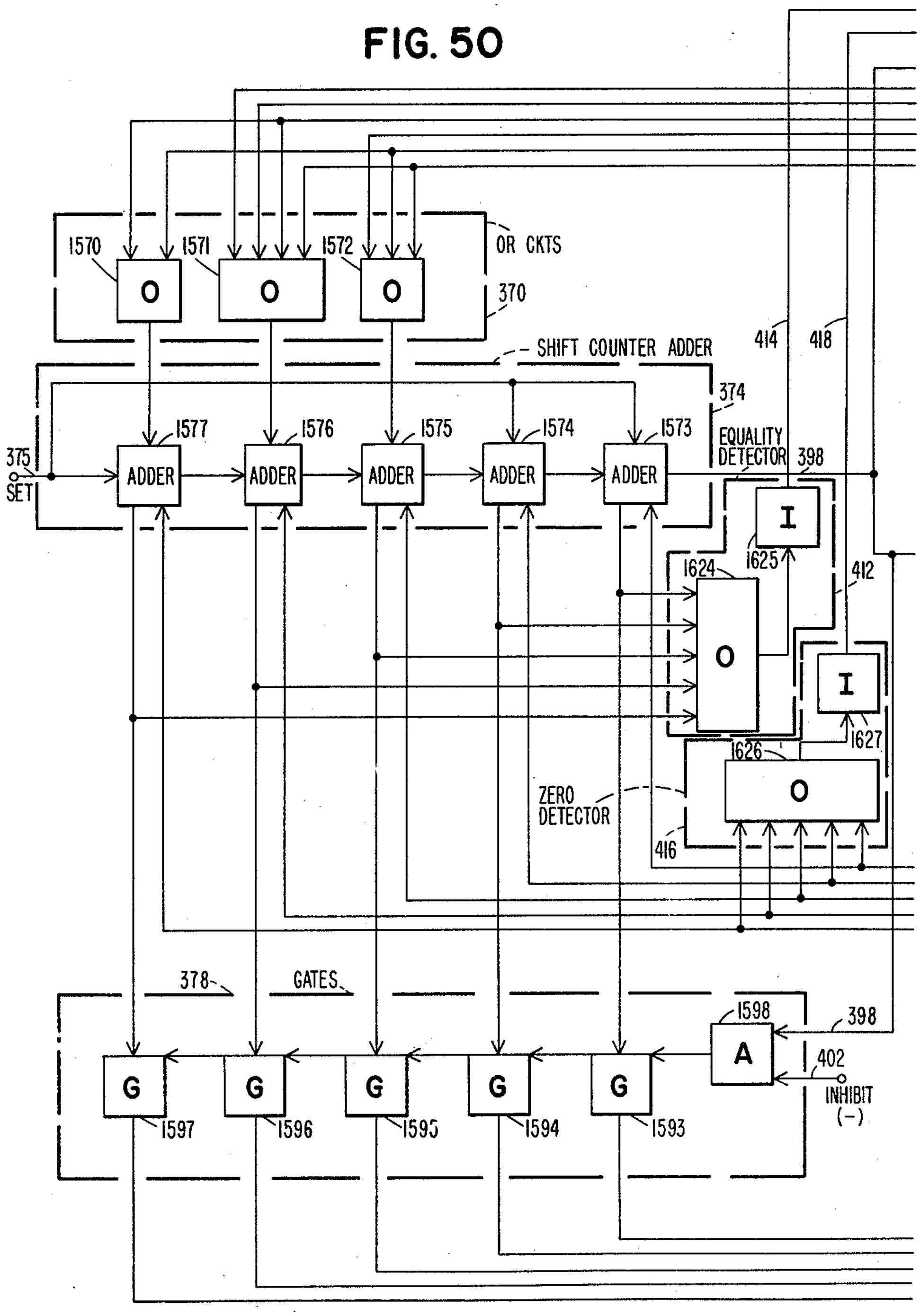
Figure 51:
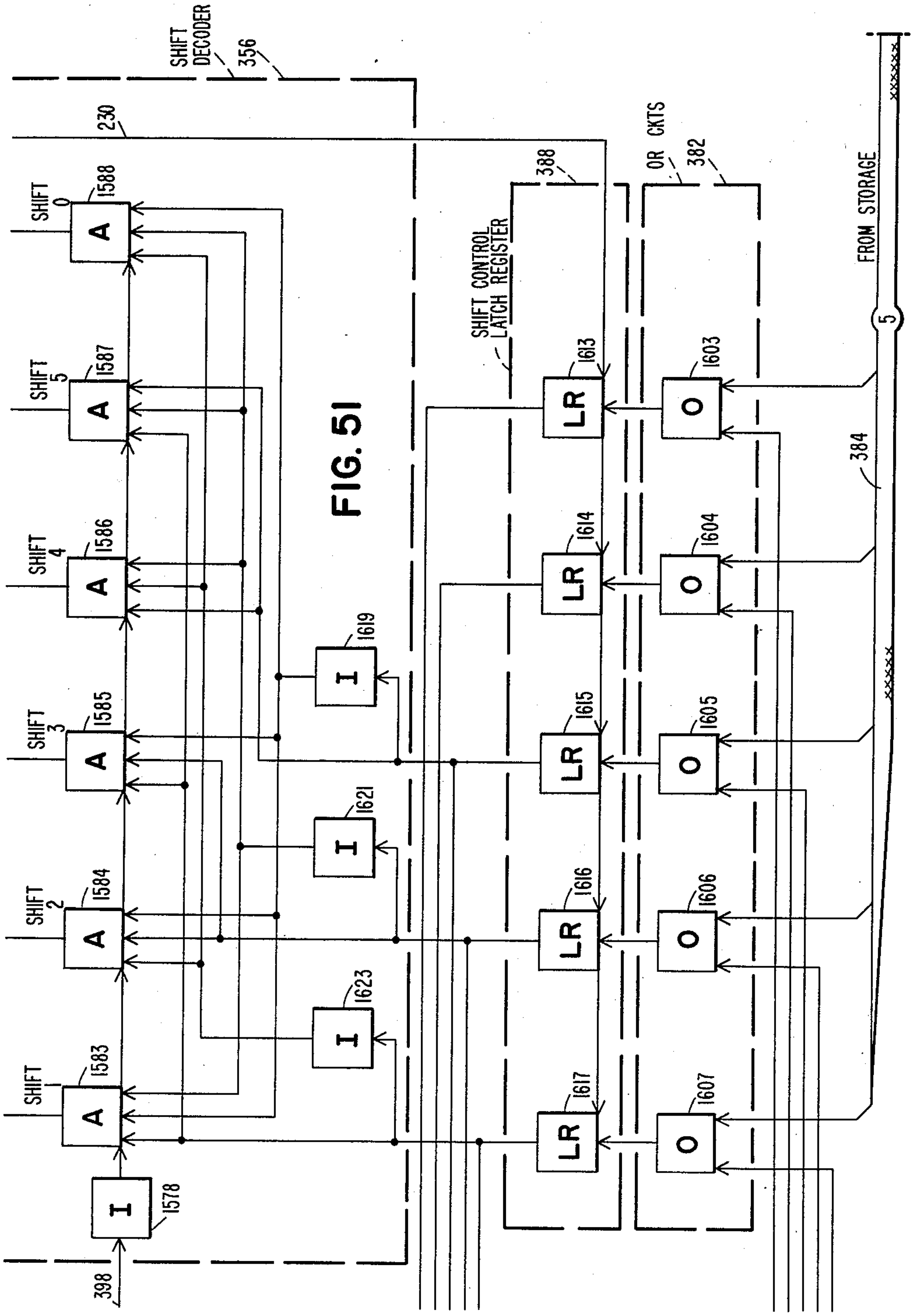

The outputs from the exclusive OR circuits 1413 through 1417 in FIG. 42 are applied to AND circuits 1513 through 1517, respectively, in the shift decoder shown within the dashed line box 356 in FIGS. 46 and 51. The outputs from the exclusive OR circuits 1412 through 1417 in FIG. 42 are connected to respective inverters 1522 through 1527 in FIG. 46. The inverters 1522 through 1527 and the AND circuits 1513 through 1518 in FIG. 46 are interconnected to provide an output indicating the shift requested in the same manner as the equivalent circuits in the shift decoder of the double added divider example. The line 398 is connected to each of the gates 513A through 518A from the shift counter adder shown in the dashed line box 374 in FIG. 50. The outputs from the AND circuits 1513 through 1518 in FIG. 46, which respectively indicate shift one, two, three, four, five or greater than five, are connected to respective gates 513A through 518A, which in turn are connected to respective OR circuits 1533 through 1537 in FIG. 46. The outputs of the OR circuits 1533 through 1537 are connected through respective lines 1543 through 1547 and respective OR circuits 1553 through 1557 in FIG. 47 to latch registers 1563 through 1567.

Figure 47:
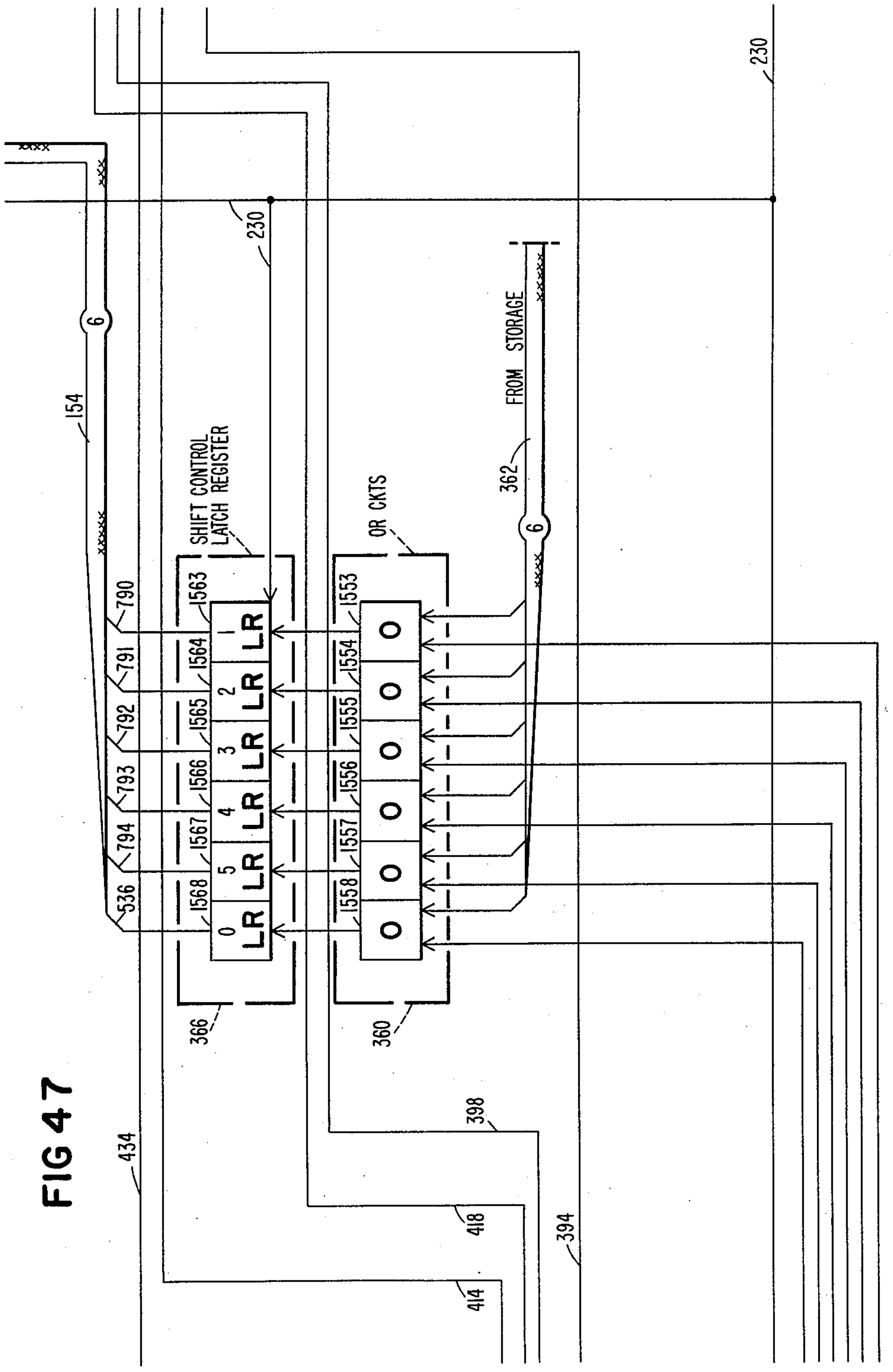

The cable 62 is connected from a storage device (not shown) to the OR circuits 1553 through 1558 in FIG. 47. The OR circuit 1558 is connected to a latch register 1568. The outputs from the latch registers 1563 through 1568 are connected through respective lines 790 through 794 and 536, and the cable 154 to the shifter 12.

The outputs of the gate circuits 1513A through 1518A in FIG. 46 are connected to the OR circuits 1570 through 1572 in the same manner as the equivalent circuits in the double adder divider example. The output of the AND circuit 1518 in FIG. 46 is connected through an inverter 1519 and the line 394 to the multiple selector shown within the dashed line box 350 in FIGS. 48 and 52, and to the quotient generator shown within the dashed line box 396 in FIG. 53.

The shift counter adder shown in the dashed line box 374 in FIG. 50 includes five individual adders 1573 through 1577. This shift counter adder serves to subtract the shift requested from the shift available. The OR circuits 1570 through 1572 are connected to respective adders 1577, 1576 and 1575. The set line 375 is connected to the adders 1573, 1574 and 1577. The line 398 is connected from the adder 1573 is connected to each of the gate circuits 1513A through 1518A in FIG. 46, and through an inverter 1578 to AND circuits 1583 through 1588 in FIG. 51. The line 398 also is connected to the termination control circuit shown within the dashed line box 400 in FIG. 53. The outputs from the adders 1573 through 1577 are connected through respective gates 1593 through 1597 in FIG. 50, respective OR circuits 1603 through 1607 in FIG. 51 to respective latch registers 1613 through 1617. An AND circuit 1598 is connected to each of the gates 1593 through 1597 in FIG. 50. The line 398 from the adder 1573 is connected to the AND circuit 1598. Also, an inhibit line 402 is connected to the AND circuit 1598 to decondition the gates 1593 through 1597 when initially entering the available shift number into the shift counter latch register shown within the dashed line box 388 in FIG. 51.

The cable 384 is connected from a storage device (not shown) to the OR circuits 1603 through 1607 in FIG. 51. The outputs from the latch registers 1613 through 1617 are connected to the respective adders 1573 through 1577 in FIG. 50. The outputs of the latch registers 1615 through 1617 are connected to respective inverters 1619, 1621 and 1623. The latch registers 1615 through 1617 also are connected to certain of the AND circuits 1583 through 1588 in FIG. 51. The inverters 1619, 1621 and 1623 are connected to certain of the AND circuits 1583 through 1588, and the interconnection of these inverters and these AND circuits serve to decode the shift available, and upon the occurrence of a shift request larger than the shift available provide a shift indication in the same manner as the equivalent circuits in the double adder example.

The equality detector shown within the dashed line box 412 in FIG. 50 includes an OR circuit 1624 and an inverter 1625. The output from the adders 1573 through 1577 are connected to the OR circuit 1624. The output of the OR circuit 1624 is connected through the inverter 1625 and through the line 414 to the termination control circuit shown within the dashed line box 400 in FIG. 53. The zero detector shown within the dashed line box 416 in FIG. 50 includes an OR circuit 1626 and an inverter 1627. The outputs of the latch registers 1613 through 1617 in FIG. 51 are connected to the OR circuit 1626. The output from the OR circuit 1626 is connected through the inverter 1627 to the line 418. The line 418 is connected to the termination control circuit in FIG. 53.

Figure 48:
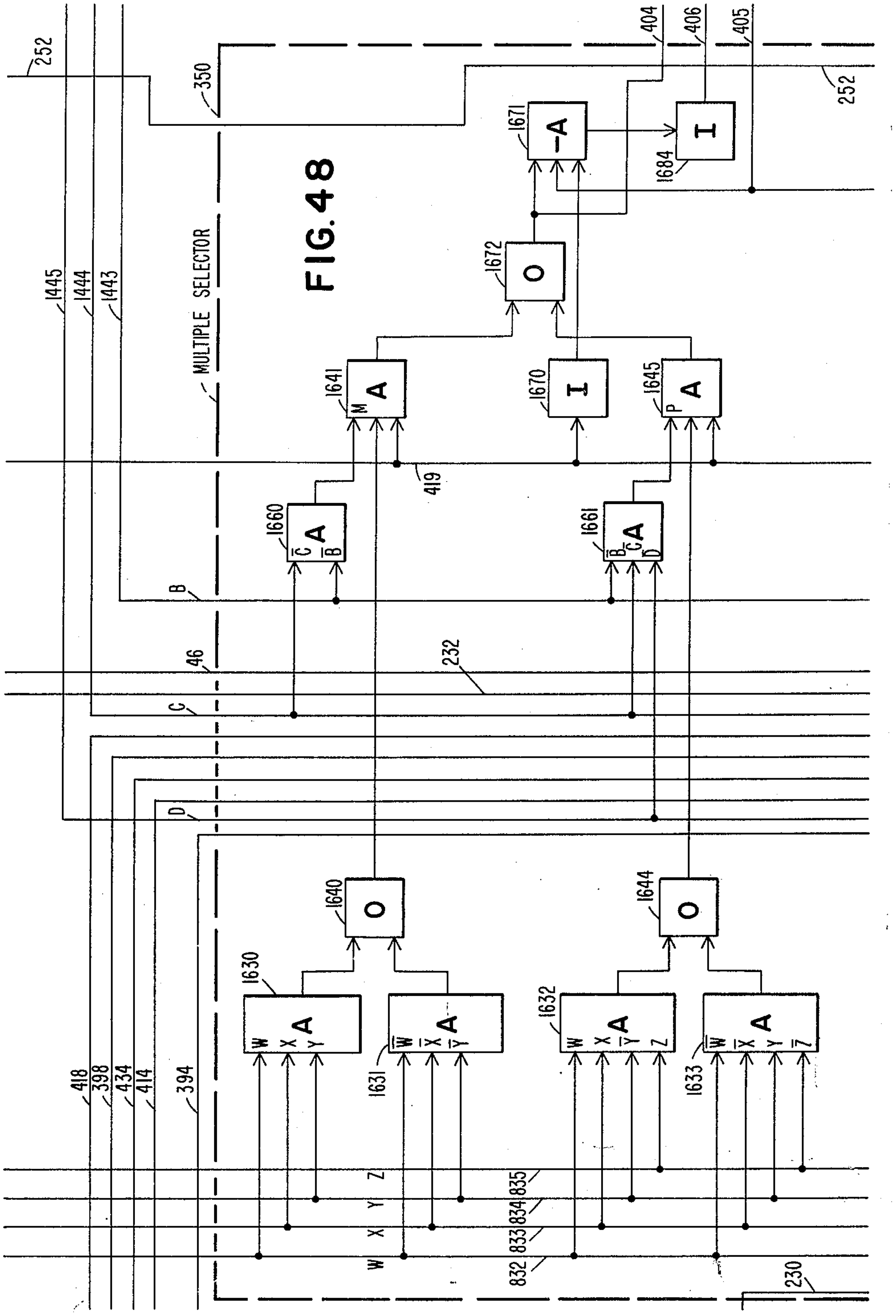
Figure 52:
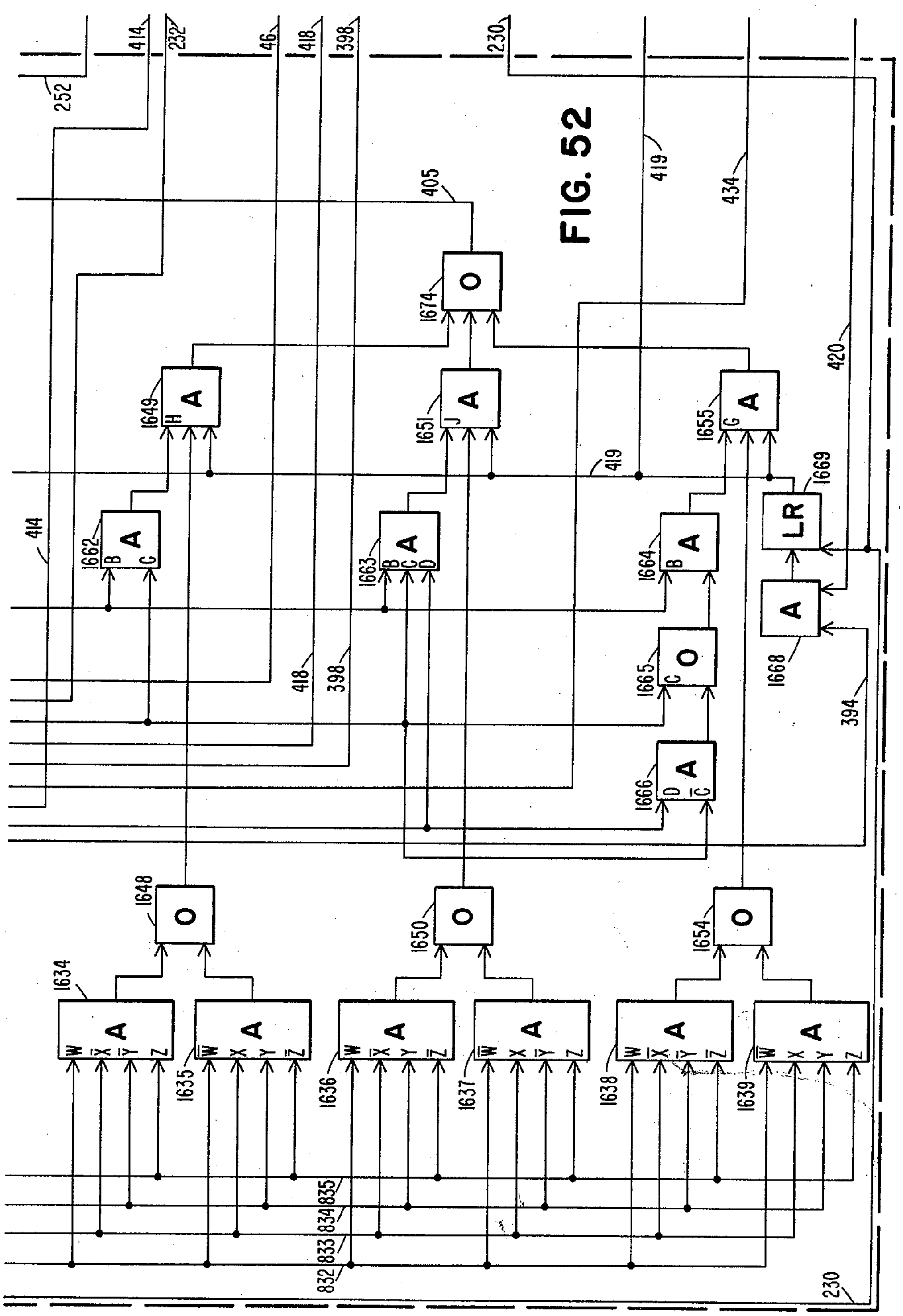

The multiple selector is shown within the dashed line box 350 in FIGS. 48 and 52. This circuit includes a number of AND and OR circuits which sense certain divisor bits and certain dividend bits after they are shifted to select either the one times, the one-half times or the two times divisor multiple. This decoder operates to provide the decoding indicated by the dashed lines in FIG. 10. The following is the mathematical basis for the decoder:

The high order divisor bits=A B C D E . . .
The high order dividend bits after shift=W X Y Z . . .

$G=B\ (C \vee \overline{C}\ D)$ $\qquad M=\overline{B}\ \overline{C}$ $H=B\ C$ $\qquad P=\overline{B}\ \overline{C}\ \overline{D}$ $J=B\ C\ D$ Use the one-half times divisor multiple if $$[(W\ \overline{X}\ \overline{Y}\ \overline{Z} \vee \overline{W}\ \overline{X}\ Y\ \overline{Z})G] \vee [(W\ \overline{X}\ \overline{Y}\ Z \vee \overline{W}\ X\ Y\ \overline{Z})H] \vee [(W\ \overline{X}\ Y\ \overline{Z} \vee \overline{W}\ X\ \overline{Y}\ Z)J]$$

Use the two times divisor multiple if $$[(W\ X\ \overline{Y}\ Z \vee \overline{W}\ X\ Y\ Z)P] \vee [(W\ X\ Y \vee \overline{W}\ \overline{X}\ \overline{Y})M]$$

Use the one times divisor multiple if neither of the above conditions obtains.

The W, X, Y and Z inputs to the multiple selector in FIGS. 48 and 52 are respective lines 832 through 835 from the OR circuits 802 through 805 in FIGS. 25 and 26. The inputs B, C and D to the multiple selector are the respective lines 1443 through 1445 from the respective latch registers 1433 through 1435 in FIG. 45. The multiple selector in FIGS. 48 and 52 includes AND circuits 1630 through 1639. The letter shown within the boxes designating these AND circuits indicate the conditions to which they respond to provide a positive output. For example, the AND circuit 1630 provides a positive output when the lines W, X and Y are not positive. This operation may be accomplished by including an inverter internally for each of the "not" ($\overline{W}$, $\overline{X}$, etc.) inputs. These inverters are not shown for simplicity of illustration.

The AND circuits 1630 and 1631 in FIG. 48 are connected through an OR circuit 1640 to an AND circuit 1641. The AND circuits 1632 and 1633 are connected through an OR circuit 1644 to an AND circuit 1645. The AND circuits 1634 and 1635 in FIG. 52 are connected through an OR circuit 1648 to an AND circuit 1649, and the AND circuits 1636 and 1637 are connected through an OR circuit 1650 to an AND circuit 1651. The AND circuits 1638 and 1639 are connected through an OR circuit 1654 to an AND circuit 1655. The respective W, X, Y and Z input lines 832 through 835 are connected to the AND circuits 1630 through 1639 as illustrated.

The B input line 1443 is connected to AND circuits 1660 through 1664 in FIGS. 48 and 52. The C input line 1444 is connected to the AND circuits 1660 through 1663, an AND circuit 1666, and to an OR circuit 1665. The D input line 1445 is connected to the AND circuits 1661, 1663, and 1666. The line 394 (which supplies a negative signal when a shift greater than five is requested) is connected to an AND circuit 1668 in FIG. 52. The line 420, which is connected from the termination control circuit in FIG. 53 is connected to the AND circuit 1668. The output of the AND circuit 1668 is connected to a latch register 1669 which is connected through the line 419 to the AND circuits 1641, 1645, 1649, 1651 and 1655, and to the gate 421 in FIG. 44. The line 419 also is connected through an inverter 1670 to a negative AND circuit 1671.

The output of the AND circuit 1660 in FIG. 48 is connected to the AND circuit 1641. The output of the AND circuit 1661 is connected to the AND circuit 1645. The outputs of the AND circuits 1641 and 1645 are connected to an OR circuit 1672. The output of the OR circuit 1672 is connected to the negative AND circuit 1671.

The output of the AND circuit 1662 in FIG. 52 is connected to the AND circuit 1649. The output of the AND circuit 1663 is connected to the AND circuit 1651. The output of the AND circuit 1666 is connected to the OR circuit 1665, and the output of this OR circuit is connected to the AND circuit 1664. The output of the AND circuit 1664 is connected to the AND circuit 1655. The outputs from the AND circuits 1649, 1651 and 1655 are connected to an OR circuit 1674. The output of the OR circuit 1674 is connected to the negative AND circuit 1671 in FIG. 48.

When the output of the OR circuit 1674 in FIG. 52 is positive, it supplies a select one-half times divisor signal through the line 405, through a gate 1680 in FIG. 49 and through the line 425 to the one-half times divisor gates 1492 through 1497. When the output from the OR circuit 1672 in FIG. 48 is positive, it supplies a select two times divisor signal through the line 404, a gate 1682 in FIG. 49, and the line 424 to the two times divisor gates 1472 through 1477 in FIG. 45. When the output of the latch register 1669 in FIG. 52 is positive and, therefore, the output from the inverter 1670 of FIG. 48 is negative, and the output from the OR circuit 1674 in FIG. 52 is negative (no select one-half times divisor signal), and the output from the OR circuit 1672 in FIG. 48 is negative (no select two times divisor signal), the output from the negative AND circuit 1671 is negative. This negative output from the AND circuit 1671 is inverted by an inverter 1684. The inverter 1684 supplies a positive select one times divisor signal through the line 406, an OR circuit 1686 in FIG. 49 and the line 426 to select the one times divisor gates 1452 through 1457 in FIG. 49. In the event that either of the inputs to the AND circuit 1668 in FIG. 52 are negative, the latch register 1669 causes each of the lines 404, 405 and 406 to be negative thus suppressing the entry of any divisor.

FIG. 53 illustrates the quotient generator within a dashed line box 396. This quotient generator is substantially identical to the one employed in the double adder divider example, and the quotient generator 396 operates to generate the quotient bits shown in Table I. The quotient generator 396 in FIG. 53 includes six AND circuits 1690 through 1695. The outputs from the AND circuits 1690, 1692 and 1694 are connected to an OR circuit 1696. The outputs from the AND circuits 1691, 1693 and 1695 are connected to an OR circuit 1697. The outputs from the OR circuits 1696 and 1697 are connected to the respective X and the Y quotient bit lines 240 and 244.

The select one times divisor line 426 is connected to the gates shown within the dashed line box 408 in FIG. 49 and to the AND circuits 1690 and 1691 in FIG. 53. The select one-half times divisor line 425 is connected to the AND circuits 1692 and 1693 in FIG. 53. The select two times divisor line 424 is connected to the AND circuits 1694 and 1695. The line 419 from the multiple selector in FIG. 52 is connected to each of the AND circuits 1690 through 1695 in FIG. 53. The line 434, which is connected from the adder 1400 in FIG. 42 and supplies an indication of whether the partial dividend is true or complement, is connected to inverters 1702 and 1704, and to the AND circuits 1691, 1694 and 1695. The inverter 1702 is connected to the AND circuit 1690, and the inverter 1704 is connected to the AND circuit 1693. The true/complement line 46 is connected through an inverter 1706 to the AND circuit 1692.

The inverter 1708 is connected to a gate 1710 in FIG. 53. The line 419 from the multiple selector is connected through an inverter 1708 to the gate 1710. The line 232 is connected to the gate 1710, and the output of the gate 1710 is connected to each of the OR circuits 1696 and 1697. The gate 1710, when conditioned, serves to supply the bits being shifted across to the OR circuits 1696 and 1697.

The termination control circuit is shown within the dashed line box 400 in FIG. 53. The true/complement line 46 is connected through an inverter 1716 to an AND circuit 1717 and to a negative AND circuit 1718. The line 418 from the zero detector in FIG. 50 is connected to the AND circuit 1717 and to an AND circuit 1719. The line 398 from the shift counter adder in FIG. 50 is connected to the negative AND circuit 1718 in FIG. 53. The output of the AND circuit 1717 is connected to an OR circuit 1720. The output of the AND circuit 1717 also is connected through the line 252, and the inverter 575 to the gate 574 (FIG. 17) in the dividend-quotient latch register. The line 414 from the equality detector in FIG. 50 is connected to the latch register 1720A. The output of latch register 1702A is an input to OR circuit 1720 and to inverter 1716A. The output of inverter 1716A is an input to AND circuits 1717 and 1719. Latch register control signal on line 230 is also a control to latch register 1720A. The output of the OR circuit 1720 is connected through the line 410 to the OR circuit 1686 in FIG. 49. The output of the OR circuit 1720 in FIG. 53 also is connected through an inverter 1722 to the gates 1680 and 1682 in FIG. 49.

The output of the negative AND circuit 1718 in FIG. 53 is connected through the line 420 to the AND circuit 1668 in FIG. 52. The output of the AND circuit 1719 in FIG. 53 is connected to the line 422 which, when positive, indicates that the division is complete. The termination control shown circuit in FIG. 53 operates in response to certain conditions to provide termination control functions in the same manner as the termination control circuit illustrated in the double adder divider example. Therefore, the termination procedure will not be reiterated.

The gates shown within the dashed line box 408 in FIG. 49 are controlled from the output of the termination control circuit 53. These gates 408 operate in response to a positive signal on the input line 410 to suppress the selection of the one-half times and the two times divisor, and to supply a positive signal on the output line 426 to select the one times divisor gates 1452 through 1457 in FIG. 49.

The operation of the single adder divider shown in detail in FIGS. 13 through 27 and FIGS. 42 through 53 is substantially identical to the operation of the double adder divider previously described. The basic differences between the operation of the two dividers occurs in multiple selection and division suppression. Instead of selecting one of two adders, the multiple selector shown within the dashed line box 350 in FIGS. 48 and 52 senses certain divisor bits and certain dividend bits (after shifting) to select one of the three multiples. The entry of any divisor multiple is suppressed, when necessary, by the multiple selector by applying a negative signal to the AND circuit 1668 in FIG. 52. The portion of the one adder divider example shown in FIGS. 13 through 27, which includes the dividend-quotient latch register, the shifter, etc., operates in the same manner for both the double adder divider and the single adder. Hence, a detailed description of the operation of the circuits in the FIGS. 13 through 27 will not be reiterated at this point.

A portion of the dividend is supplied to the adders 1400 through 1408 in FIG. 42 from the OR circuits 800 through 808 in FIGS. 25 and 26. The multiple selector 350 in FIG. 48 senses the dividend bits W, X, Y and Z by means of the respective lines 832 through 835. The one times divisor bits B, C and D are sensed by the multiple selector through the lines 1443 through 1445. Assuming that the W, X, Y and Z bits are respectively 1011 (row 2, columns 3 through 6 in the table in FIG. 12) and the B, C and D bits are respectively 101, the conditions the prevail are W, $\overline{X}$, Y and Z, and B, $\overline{C}$ and D. These conditions do not satisfy the respective input conditions of any of the AND circuits 1630 through 1639. Hence, these AND circuits do not provide positive outputs and, therefore, the AND circuits 1641, 1645, 1649, 1651 and 1655 and the OR circuits 1672 and 1674 do not provide positive outputs. The lines 394 and 420 connected to the AND circuit 1668 in FIG. 52 are positive (the line 394 is positive unless a shift of greater than five is requested, and the line 420 is positive unless the dividend is true and the shift requested is larger than the shift available. The latch register 1669 supplies a positive signal to the inverter 1670 in FIG. 48 which inverts this signal to a negative signal. The negative signal from the inverter 1670 is applied to the negative AND circuit 1671. The OR circuits 1672 and 1674 also apply negative signals to the negative AND circuit 1671. The negative AND circuit 1671 supplies a negative output to the inverter 1684. The inverter 1684 supplies a positive output signal through the line 406, the OR circuit 1686 in FIG. 49, and the line 426 to condition the one times divisor gates 1452 through 1457. These one times divisor gates supply the divisor from the divisor latch register in FIG. 45 to the OR circuits 1462 through 1468 in FIG. 44. The divisor is applied to the exclusive OR circuits 1482 through 1488. The exclusive OR circuits 1481 through 1488 supply the true value of the divisor if the dividend is complement, or the complement value of the divisor if the dividend is true to the adders in FIG. 42. The high order adder position 1400 in FIG. 42 receives the divisor bit from the true/complement line 46, the gate 421 and the line 423. In this instance, the exclusive OR circuit 1481 supplies a signal (bit) like that on the line 46. Whenever the complement divisor is used the line 423 supplies a positive signal also to the adder 1408 to force a one into that adder in order to provide the two's complement of the divisor.

Figure 43:
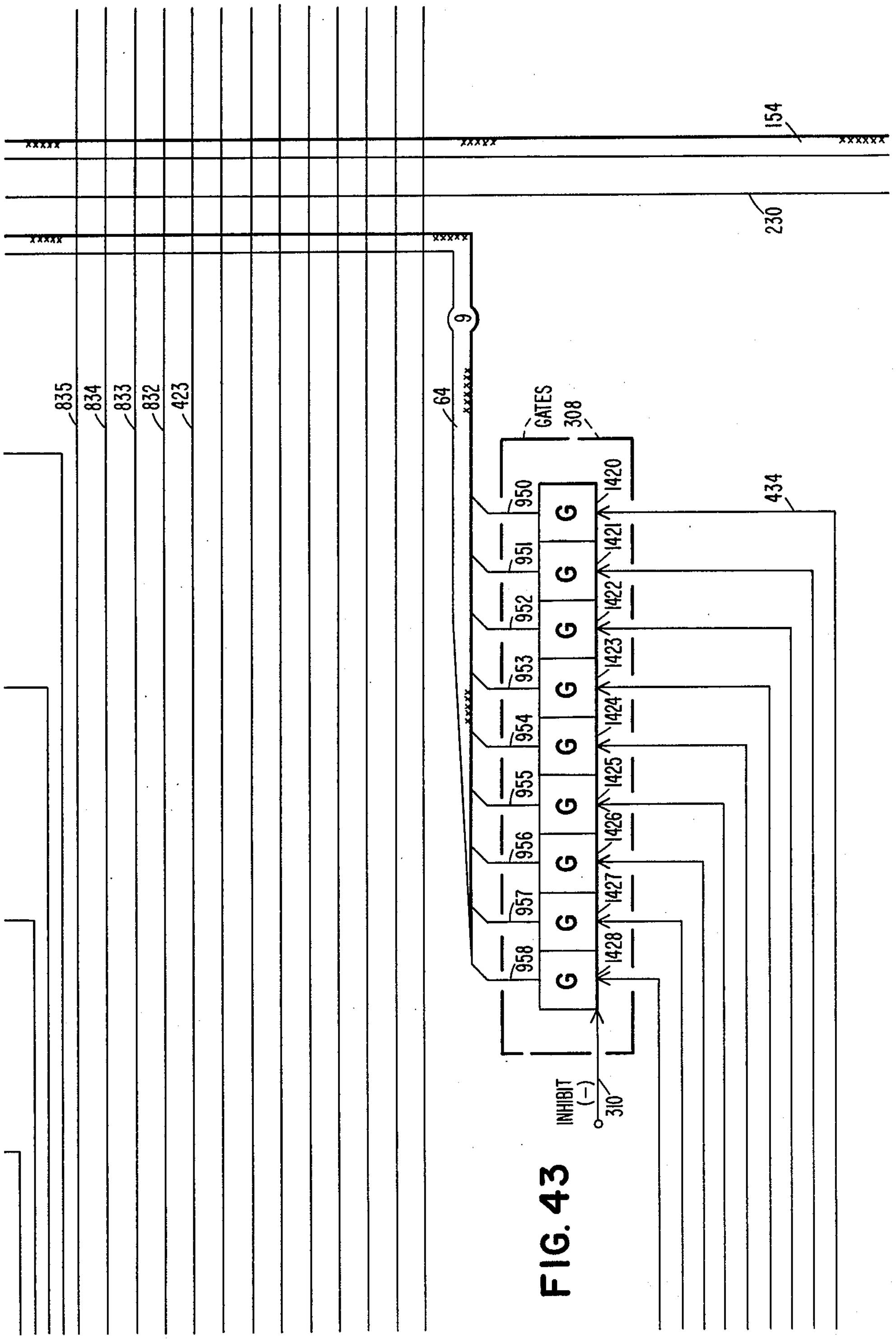

The portion of the dividend and the divisor are added by the adders 1400 through 1408 in FIG. 42, and the result is applied through the gates 1420 through 1428 in FIG. 43, the respective lines 950 through 958, the cable 64, the respective OR circuits 450 through 458 in FIG. 13 to the latch register 500 through 508, respectively, in FIG. 17. A portion of the outputs of the adders are applied to the shift decoder shown within the dashed line box 356 in FIGS. 46 and 51 and decoded to indicate the requested shift in the same manner as in the double adder divider example. The indicated shift is applied through one of the OR circuits 1533 through 1537 in FIG. 46 to one of the respective OR circuits 1553 through 1557 in FIG. 47. Subsequently, the indicated shift is supplied to and from the shift control latch register shown within the dashed line box 366 in FIG. 47 through the cable 154 to the shifter 12.

The shift counter adder shown within the dashed line box 374 in FIG. 50 functions to subtract the shift requested from the shift available in the same manner as in the double adder divider example. The shift requested is applied from one of the AND circuits 1513 through 1518 in FIG. 46 to certain of the OR circuits 1570 through 1572 in FIG. 50. The outputs from these OR circuits 1570 through 1572 are applied to the adders 1575 through 1577. The shift available is supplied from the latch registers 1613 through 1617 in FIG. 51 to the respective adders 1573 through 1577 in FIG. 50. The result of the addition is applied through the gates 1593 through 1597, and the OR circuits 1603 through 1607 in FIG. 51 to the latch registers 1613 through 1617.

Referring to the quotient generator shown within the dashed line box 396 in FIG. 53, when the one times divisor is used the line 426 supplies a positive signal to the AND circuits 1690 and 1691. When the one-half times divisor is used, the line 425 supplies a positive signal to the AND circuits 1692 and 1693. When the two times divisor is used, the line 424 supplies a positive signal to the AND circuits 1694 and 1695. The line 419 supplies a positive signal to the AND circuits 1690 through 1695 normally unless the shift requested is greater than five, or, upon termination, the dividend is true and the shift requested is larger than the shift available. The input line 434 supplies a negative signal when the partial dividend is true, and a positive signal when the partial dividend is complement. The true/complement line 46 supplies a negative signal to the quotient generator when the divisor used is true and a positive signal when the divisor used is complement. The AND circuits 1690 through 1695 and the OR circuits 1696 and 1697 provide the X and Y quotient bits to the latch registers 531 and 532 in FIG. 20. These bits are entered into these latch registers upon the occurrence of a latch control signal on the line *230a*.

It was previously explained how the multiple selector 350 in FIGS. 48 and 52 selected the one times multiple in a particular instance. The other multiples are selected in a similar manner. For example, if the dividend bits W, X, Y and Z are respectively 0111, and the divisor bits B, C and D are respectively 101, the conditions are $\overline{W}$, X, Y and Z, and B, $\overline{C}$, and D. These conditions will cause the one-half times divisor to be selected. The $\overline{W}$, X, Y and Z inputs to the AND circuit 1639 in FIG. 52 cause this AND circuit to provide a positive output. This positive output is applied through the OR circuit 1654 to the AND circuit 1655. The $\overline{C}$ and D inputs to the AND circuit 1666 cause this AND circuit to provide a positive output which is applied through the OR circuit 1665 to the AND circuit 1664. This input, along with a B input to the AND circuit 1664 causes the AND circuit 1664 to provide a positive output to the AND circuit 1655. At this time the latch register 1669 supplies a positive output to the AND circuit 1655. Hence, the AND circuit 1655 supplies a positive signal through the OR circuit 1674, the line 405, the gate 1680 in FIG. 49 and the line 425 to select the one-half times divisor gates 1492 through 1497 in FIG. 49. As indicated by the foregoing equations the one-half times divisor may be selected with other combinations of inputs. The multiple selector in FIGS. 48 and 52 operates in a similar manner upon different input conditions to select the two times divisor multiple. Although the multiple selector illustrated decodes as indicated by the dashed lines in FIG. 10, a similar decoding circuit may be utilized to decode (optimum) as indicated by the heavy stepped lines in FIG. 10. If desired, simpler decoding (simpler than indicated by the dashed lines) may be used, but operating efficiency would be reduced.

In addition to using different decoding arrangements (simple, complex, etc.) or double adders, the efficiency of operation also is effected by the size of the shifter. The larger the shifter the greater the efficiency, but the efficiency does not increase greatly when using a shifter capable of shifts larger than five, six, etc. The Table II below gives examples which approximately indicate the relative differences in efficiencies between the use of different length shifters, and between the use of the three multiples versus the use of only the one times multiple.

TABLE II

*Average bits shifted across per shift cycle*

| Shifter Limit | 1X only | 1X, ½X and 2X: Double Adders or Optimum Decoding |
|---|---|---|
| None | 2.66 | 2.94 |
| 8 | 2.64 | 2.92 |
| 6 | 2.54 | 2.86 |
| 5 | 2.54 | 2.82 |
| 4 | 2.39 | 2.61 |

Whenever the one-half times divisor multiple is used, the line 425 in FIG. 49 supplies a positive signal to the line 246. The line 246 supplies this positive signal to the latch register 533 in FIG. 20 to store the fact that the one-half times divisor was used. In the event that the one-half times divisor is used in one cycle and a shift of one is indicated in the following cycle, the AND circuit 820, the gates 612 and 822 and the inverter 823 in FIG. 20 operate in the manner described in the double adder divider example to shift the previously generated Y quotient bit into the X quotient bit position (latch register 531 in FIG. 20).

The AND circuits, the OR circuits, the exclusive OR circuits, the gates and the inverter circuits employed in the illustrative dividers of the present invention may be any one of various suitable types, and a detailed consideration of them is not considered necessary since they are quite widely known.

FIG. 54*a* shows the block symbol of a latch register which is shown in detailed logic block form in FIG. 54*b*. Latch registers such as the one shown in FIG. 54*b* are utilized throughout the various figures, such as, the dividend-quotient latch register shown in detail in FIGS. 17 through 20. A latch register is a device having two inputs which are a data signal input and a latch control input. The latch register accepts information at the time the latch control signal changes from a de-energized condition to an energized condition. The data signal input must maintain its desired condition for a small interval of time immediately preceding, during and following the application of the latch control signal, this interval of time being measurable in terms of circuit transit times. At all other times, regardless of whether the latch control signal is energized or de-energized, the output from the latch register is not controlled by the state of the data input signal which signal may be changed at will.

The latch register shown in FIG. 54*b* includes circuits 1740 through 1745 which constitute a first latch 1749, and circuits 1751 through 1755 which constitute a second latch 1759. By "latch" is meant a circuit having a control input and a data input, the output of which follows the data input when the control input is de-energized. The output remains constant at the state it had when the control input changed so long as the control input is energized regardless of any changes in the data input during this time. A latch register differs from a flip-flop since a flip-flop is a bistable device which, when set to one state, retains that state until set to the other state.

The two latch circuits 1749 and 1759 in FIG. 54*b* are connected in series; that is, the output of the first latch circuit 1749 is connected as the input to the second latch circuit 1759. The data input signal is applied to the first latch 1749 through a line 1737, and the latch control signal is applied to the latch circuit 1749 through an input line 1738. The output from the second latch circuit 1759 is taken through a line 1739. The latch control signals are connected in opposition; that is, when the first latch circuit 1749 is locked, the second latch circuit 1759 is free, and when the second latch circuit 1759 is locked, the first latch circuit 1749 is free.

The AND circuits 1744 and 1754, and the OR circuits 1741 through 1743 and 1751 through 1753 are assumed to be constructed with diodes, and the level setters 1740, 1745 and 1755 are constructed with transistors. The signal on the lower output of the level setters has the same polarity as the signal applied to the level setters, and the polarity of the signal on the upper output is opposite to the polarity of the input signal. For example, if the input line A to the level setter 1740 in FIG. 54*b* is positive, the output line B is positive and the output line C is negative. For purposes of description, the transit time through one level setter is considered to represent one unit of time. The transit time through the ANDS and the OR circuits is assumed to be zero. The logic is assumed to be positive.

In order to illustrate the operation of the latch register 1736 shown in FIG. 54*b*, various points of the circuit are designated by various letters of the alphabet, and the signals at these points change their potential in a manner indicated in FIG. 55. FIG. 55 is a timing sequence diagram illustrating how the waveforms change at various points in the circuit of FIG. 54*b*. When the latch control signal on the line 1738 is negative, the first latch circuit 1749 is free and the second latch circuit 1759 is locked. The dashed arrows indicate circuit conditions when the latch control signal is negative. The point C is positive which causes the output of the OR circuit 1743 to be positive, thereby making U positive. This leaves points R and T to determine the condition of point H. Since B is negative (the opposite polarity of C), R is controlled only by G, and T is positive whenever G is positive. The potential of G is determined by the data input applied through the line 1737. Therefore, the potential at point H will follow the potential at point G and the potential at J will follow the potential at H, though the changes at J will lag one unit of time behind the corresponding change at H.

When the control signal at A is positive, the first latch circuit 1749 is locked and the second latch circuit 1759 is free. The solid arrows indicate circuit conditions when the control signal is negative. In this case, the condition of the signals at points J and K will not change even though the signals at G do change. Since the signal at B is positive in this case, the signal at R will remain positive. The signal at T will be positive if the signal at J is positive, though the signal at T will not be negative necessarily if G is negative. Since the signal at C is negative, the signal at U is controlled only by the condition of the signal at J. Therefore, if the signal at J is positive, it will be held positive by the feedback through the points U and T. If the signal at J is negative, there is no path by which the signal at G can being the signal level at U positive.

In order to set a signal into the latch register, the data signal at G (input line 1737) must be held at its desired condition sufficiently long in advance of changing the signal at B and C for the signal at J to acquire the same condition as the signal at G, and the signal at G must maintain this condition until the switching of the signals at B and C is complete. The second latch circuit 1759 operates in the same manner as the first latch circuit 1749 except that the input to the former uses the signal level at K instead of the signal level at G, and the connections of the input lines of the level setter 1740 are reversed with respect to the OR circuits 1751 through 1753, i.e., the signals at B and C are inverted in the second latch circuit 1759 when compared with the first latch circuit 1749.

The sequence time chart is FIG. 55 illustrates that although the latch control signal locks the second latch circuit 1759 at the same time that it frees the first latch circuit 1749, the change in the output of the first latch circuit 1749 does not occur until one unit of time later. This operation allows sufficient time for the locking action of the second latch circuit 1759 to be completed. An overlap must be maintained here to assure reliable operation.

The use of the signal level at K as an input to the second latch circuit 1759 was selected to make the signal level at N, which has no other load on it, agree with the signal level at G. This also serves to reduce the effect of any skew between signals on lines B and C. However, if desired, the signal level at J may be used as the input to the second latch circuit 1759 as well as for feedback. If this were done, the signal level at P would be set to agree with the signal level at G.

The level setters 1740, 1745 and 1755 illustrated in block form in FIG. 54*b* may be any one of various suitable types, and one suitable arrangement is illustrated in detail in FIG. 56. The level setter in FIG. 56 includes interconnected transistors 1761 and 1762. When a signal of one polarity is applied to input line 1763, a signal of the same polarity appears on an output line 1764. The output line 1765 has a signal of a polarity which is opposite to the polarity of the signal on the output line 1764.

In operation, a positive signal applied to the input line 1763 causes the transistor 1761 to be conductive and the transistor 1762 to be nonconductive. Accordingly, the potential on the output line 1764 approaches a value toward positive six volts. When a signal level of approximately zero volts is applied to the input terminal 1763, the transistor 1761 is rendered nonconductive and the transistor 1762 becomes conductive. Consequently, the potential on the output line 1764 approaches ground for the zero level. A zero level is more negative than the positive six volt level, and the zero level accordingly is referred to as a down or negative level.

The level setter in FIG. 56 serves to accept signal levels on the input line 1763 which signals vary within limits around plus six volts or zero volts, and provides output signals on the output line 1764 which are fixed in amplitude within certain precise limits. When the signal on the output line 1764 is six volts positive, a signal on the output line 1765 is approximately zero volts. When the signal on the output line 1764 is approximately zero volts, the signal on the output line 1765 is approximately six volts positive.

The adder circuit employed within the dividers of the present invention may be any one of many suitable types. One suitable adder circuit is illustrated in FIG. 57. This adder circuit includes exclusive OR circuits 1771 and 1772, AND circuits 1773 and 1774, and an OR circuit 1775 connected as shown. Three binary inputs to the adder in FIG. 57 are labeled $A_n$, $B_n$, and $C_n$. The outputs, which represent a sum and a carry from the addition of the quantity $A_n$, $B_n$ and $C_n$, are designated $S_n$ and $R_n$. A positive signal on the input lines represents a binary one and a negative signal represents a binary zero. A positive signal on the output line $S_n$ represents a sum of one, and a positive signal on the output line $R_n$ represents a carry of one.

Whenever the $A_n$ and the $B_n$ inputs are unlike, the exclusive OR circuit 1771 supplies a positive signal to the exclusive OR circuit 1772. Whenever the signal supplied by the exclusive OR circuit 1771 to the exclusive OR circuit 1772 is unlike $C_n$, a positive signal is supplied on the output line $S_n$ and this positive signal represents a binary sum of one. For all other conditions the output signal on the line $S_n$ is a negative signal representing a binary sum of zero.

The exclusive OR circuit 1771 supplies a signal to the AND circuit 1773, and the input line $C_n$ supplies a signal to the AND circuit 1773. When ever both of these lines are positive, the AND circuit 1773 provides a positive signal through the OR circuit 1775 to the output line $R_n$. A positive signal on the line $R_n$ represents a carry of one. The lines $A_n$ and $B_n$ are connected to the AND circuit 1774 which in turn is connected through the OR circuit 1775 to the output line $R_n$. Whenever both the $A_n$ and the $B_n$ inputs are positive, the output line $R_n$ is rendered positive, thereby indicating a carry of one. When neither of the AND circuit 1773 nor the AND circuit 1774 provides a positive signal to the OR circuit 1775, a negative signal appears on the output line $R_n$ representing a carry of zero. Accordingly, the adder circuit 1770 in FIG. 57 responds to signals on the input lines $A_n$, $B_n$ and $C_n$ and provides signals on the output lines $S_n$ and $R_n$ representative of a sum and a carry, respectively.

It now should be apparent that the present invention provides a divider which, through the selection of multiples of the divisor, affects the bit distribution of the dividend in a manner such that certain variable length groups of dividend bits may be skipped. By skipping dividend bits the number of add cycles necessary to complete a division problem is reduced. Since the speed of division generally is proportional to the number of addition steps necessary to complete the division, the present dividers operate at substantially higher speeds than dividers heretofore.

While the invention has been particularly shown and described with reference to preferred embodiments thereof, it will be understood by those skilled in the art that various changes in form and details may be made therein without departing from the spirit and scope of the invention.

What is claimed is:

1. A binary divider comprising means to store bits of a divisor, first means to store bits of a dividend and a quotient as the quotient is developed, second means coupled to the first means for shifting bits of the dividend and the quotient, third means coupled to the first means and the means to store bits of a divisor which responds to certain dividend and divisor bits to generate and select multiples of the divisor, and fourth means coupled to said first means and said third means for adding given bits of the dividend with bits of multiples of the divisor, and means coupled to the second means which responds to bits in the highest orders of the dividend for shifting the dividend a plurality of positions and to supply different bits of the dividend to the fourth means.

2. A binary divider as defined in claim 1 wherein the third means generates divisor multiples of one, two and one-half times.

3. A binary divider as in claim 2 including fifth means responsive to conditions of the third means the fourth means, and a combination thereof, to generate quotient bits.

4. A binary divider as in claim 3 wherein the second means provides quotient bits to said first means.

5. A divider for dividing a dividend by a divisor to produce a quotient comprising first means to combine bits of a dividend or a partial dividend and bits of a multiple of a divisor to produce a partial dividend or a remainder, second means responsive to bits of the dividend or the partial dividend and bits of multiple of a divisor to select a multiple of the divisor to be combined with the dividend or the partial dividend and third means responsive to the high order bits of the dividend or partial dividend to provide quotient bits which are always the same as certain of the high order bits of the dividend or partial dividend.

6. A divider for dividing a dividend by a divisor to produce a quotent comprising a dividend-quotent register in which the dividend may be stored and in which a quotient may be stored as the quotient is developed, a shifter for shifting the contents of the dividend-quotient register, first means to generate the one times, the one-half times and the two times multiples of the divisor, second means to select multiples of the divisor, a quotient generator for applying quotient bits to the dividend-quotient register, and third means to add bits of the dividend with bits of divisor multiples and to supply the resultant of the addition to the dividend-quotient register, and forth means responsive to the third means to cause the shifter to shift the contents of the dividend-quotient register.

7. A binary divider comprising first means to store a dividend and a quotient as the quotient is developed, second means coupled to the first means to shift periodically the dividend and the quotient, third means coupled to the first means to generate the one times, the one-half times and the two times multiples of the divisor, fourth means coupled to the first and second means to receive and add bits of the dividend with bits of multiples of the divisor, and fifth means coupled to the third means to select the multiples of the divisor which will provide the greatest shift by the second means.

8. In an arithmetic device, a binary divider comprising first means to store and shift a dividend, second means to store a divisor, third means responsive to the second means to generate multiples of the divisor, fourth means responsive to the first and second means to add selected bits of the dividend to bits of the divisor, fifth means coupled to the second and third means to select a multiple of the divisor in said third means, sixth means coupled to the second and third means to add selected bits of the dividend to the selected multiple of the divisor, seventh means coupled to the fourth and sixth means to select one of the two results obtained from the fourth and sixth means, and eighth means responsive at least to the divisor multiple selected in said third means to generate a portion of a quotient.

9. A divider including first means to store signals representative of a dividend or partial dividend, second means coupled to the first means for shifting each partial dividend a variable number of positions, third means responsive to signals representative of a divisor for providing signals representative of the multiples of one-half times the divisor, one times the divisor and two times the divisor, fourth means coupled to said first, said second and said third means which selects one of the multiples of the divisor and combines it with a partial dividend to provide a result representing a new partial dividend that is the difference between the two quantities combined, and fifth means coupled to said fourth means for providing a plurality of quotient orders.

10. The device of claim 9 wherein said fourth means includes first and second adders, means coupling the partial dividend to said first adder and second adders, means coupling one times the divisor to said first adder, means coupling a selected one of the multiples of one-half times the divisor and two times the divisor to said second adder whereby two different partial dividends are supplied by said first and second adders, and means coupled to said fourth means for selecting as the next partial dividend that partial dividend having the greatest number of successive zeros or radix-minus-one digits in the high orders.

11. A divider including first means to store signals representative of a dividend or partial dividend, second means coupled to the first means for shifting each partial dividend a variable number of positions, third means responsive to signals representative of a divisor for providing signals representative of the multiples of one-half times the divisor, one times the divisor and two times the divisor, first and second adders, means coupling the partial dividend to said first adder and second adders, means coupling one times the divisor to said first adder, means coupling a selected one of the multiples of one-half times the divisor and two times the divisor to said second adder whereby two different partial dividends are supplied by said first and second adders, means coupled to said first and second adders for selecting as the next partial dividend that partial dividend having the greatest number of successive zeros or radix-minus-one digits in the high orders, and means responsive to the selected partial dividend for providing a plurality of quotient orders.

12. A divider including a dividend register for storing signals representing a dividend or a partial dividend having a plurality of orders, a divisor register for storing signals representing a divisor having a plurality of orders, first means coupled to the divisor register for providing signals representing one-half times the divisor and two times the divisor, an arithmetic device, second means coupled to said divisor register and said first means for selectively supplying to said arithmetic device signals representing the divisor, one-half times the divisor and two times the divisor, third means coupling the dividend from the dividend register to said arithmetic device, said arithmetic device being operated in successive cycles for finding during each cycle the difference between the dividend and a selected one of the quantities of the divisor, one-half times the divisor and two times the divisor for thereby determining the next partial dividend, shift means coupled to the dividend register for selectively shifting the content thereof, said divider having further means coupled thereto which includes a first means having a decoder coupled to said shift means for operating said shift means to shift the content of the dividend register as many orders as there are successive zeros or radix-minus-one digits in a string in a partial dividend and a second means for providing a quotient including a first circuit coupled to the high orders of the dividend register for providing $N-2$ quotient digits whenever a string of N successive zeros or radix-minus-one digits are in the high orders of a partial dividend, where N is an integer equal to or greater than two, and a second circuit responsive to at least the result in the arithmetic device for providing quotient digits for the two lowest orders of a string of N successive zeros or radix-minus-one digits in the high orders of a partial dividend.

13. A divider including a dividend register for storing signals representing a dividend or a partial dividend having a plurality of orders, first means responsive to signals representing a divisor having a plurality of orders for providing signals representing the quantities of one-half times the divisor, one times the divisor and two times the divisor where each quantity has a plurality of orders, an arithmetic device, means coupling the dividend from said dividend register to said arithmetic device, second means coupling a selected one of the quantities of one-half times the divisor, one times the divisor and two times the divisor from said first means to said arithmetic device, said arithmetic device being operated in successive cycles for finding during each cycle the difference between the dividend and a selected one of the quantities of one-half times the divisor, one times the divisor and two times the divisor thereby to determine the next partial dividend, third means coupled to the dividend register for selectively shifting the content thereof, said divider including further means coupled thereto for operating said third means to shift the content of the dividend register as many orders as there are successive zeros or radix-minus-one digits in a string in a partial dividend and to provide N quotient digits whenever a string of N successive zeros or radix-minus-one digits are in the high orders of the dividend register, where N is any integer equal to or greater than two.

14. A binary divider circuit including a dividend storage register, an arithmetic device, means coupling the dividend storage register to said arithmetic device, first means responsive to signals representative of a divisor which provides signals representative of one-half times the divisor, one times the divisor, and two times the divisor, second means selectively supplying one of the quantities of one-half times the divisor, one times the divisor, and two times the divisor from said first means to said arithmetic device for thereby providing the next partial dividend, said binary divider circuit having further means coupled thereto for determining N quotient bits for each series of N zeros or N ones disposed in the highest successive orders of any partial dividend, where N is any integer equal to or greater than two.

15. A divider circuit including first means for storing signals representative of a partial dividend, second means for storing signals representative of one-half times a divisor, one times a divisor, and two times a divisor, an arithmetic device coupled to the first means and the second means for determining the difference between the dividend and a selected one of the quantities one-half times the divisor, one times the divisor, and two times the divisor, said divider circuit including further means for skipping over a series of zeros or radix-minus-one digits in a partial dividend and for providing a plurality of quotient digits for the series of zeros or radix-minus-one digits skipped over.

16. The apparatus of claim 15 wherein said further means provides quotient digits identical to the string of zeros or radix-minus-one digits skipped over in the partial dividend except at least the last two digits in the string for which quotient digits are determined by still another means responsive to at least the result from said arithmetic device.

17. A binary divider circuit including a dividend register for storing signals representative of a dividend, an arithmetic device, means coupling the dividend register to said arithmetic device, first means responsive to signals representative of a divisor for providing signals representative of one-half times the divisor, one times the divisor, and two times the divisor, second means coupling a selected one of the quantities one-half times the divisor, one times the divisor, and two times the divisor from said first means to said arithmetic device, said arithmetic device being operated in successive cycles to provide the next partial dividend by finding the difference between the present partial dividend and one of the quantities one-half times the divisor, one times the divisor and two times the divisor, said binary divider circuit having means coupled thereto to provide a plurality of quotient bits during one cycle of operation of said arithmetic device whenever a series of zeros or ones are disposed in the highest orders of the present partial dividend.

18. In an arithmetic device, a binary divider comprising first means to store and shift bits of a dividend, second means to store bits of a divisor, third means responsive to said second means to generate multiples of the divisor, fourth means responsive to bits in the dividend and to bits in the divisor to select multiples of the divisor generated in said third means, fifth means for performing an add operation by adding selected bits of the dividend to bits of a multiple of the divisor, and sixth means responsive to at least the multiple selected to generate a quotient, said third means generating multiples of the divisor which are one, two and one-half times the divisor.

References Cited by the Examiner

UNITED STATES PATENTS

| | | | |
|---|---|---|---|
| 2,493,862 | 1/50 | Durfee | 235—158 |
| 3,028,086 | 4/62 | Sierra | 235—160 |

MALCOLM A. MORRISON, *Primary Examiner.*

DARYL W. COOK, *Examiner.*